(12) United States Patent
Yuki et al.

(10) Patent No.: US 9,933,563 B2
(45) Date of Patent: Apr. 3, 2018

(54) LIGHTING DEVICE AND DISPLAY DEVICE

(71) Applicant: Sharp Kabushiki Kaisha, Sakai, Osaka (JP)

(72) Inventors: Ryuzo Yuki, Sakai (JP); Takeshi Ishida, Sakai (JP); Mitsuhiro Murata, Sakai (JP); Hirotoshi Yasunaga, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/311,854

(22) PCT Filed: May 15, 2015

(86) PCT No.: PCT/JP2015/064003
§ 371 (c)(1),
(2) Date: Nov. 17, 2016

(87) PCT Pub. No.: WO2015/178302
PCT Pub. Date: Nov. 26, 2015

(65) Prior Publication Data
US 2017/0090113 A1    Mar. 30, 2017

(30) Foreign Application Priority Data

May 23, 2014    (JP) .................... 2014-107350

(51) Int. Cl.
*F21V 8/00*     (2006.01)
*G02F 1/1339*   (2006.01)
(Continued)

(52) U.S. Cl.
CPC ......... *G02B 6/0088* (2013.01); *G02B 6/0021* (2013.01); *G02F 1/1339* (2013.01);
(Continued)

(58) Field of Classification Search
CPC ........................... G02B 6/0088; G02B 6/0021
See application file for complete search history.

(56) References Cited

U.S. PATENT DOCUMENTS

2005/0088586 A1* 4/2005 Mori .................... G02B 6/0021
                                                        349/62
2011/0128756 A1* 6/2011 Cho ..................... G02B 6/0068
                                                        362/606
(Continued)

FOREIGN PATENT DOCUMENTS

| CN | 102192448 A | 9/2011 |
| JP | 09-90361 A | 4/1997 |
| JP | 2012-164507 A | 8/2012 |

*Primary Examiner* — Jessica M Merlin
(74) *Attorney, Agent, or Firm* — Keating & Bennett, LLP

(57) ABSTRACT

A backlight unite 12 includes LEDs 17, an optical member 16, a positioning portion 23, and a rotation restricting portion 24. The optical member 16 includes at least a curved end surface 16C having a curved shape in a plan view included in a periphery of the optical member 16. The positioning portion 26 includes a positioning hole 25 that opens through a thickness direction of the optical member 16 and a positioning protrusion 26 that is inserted in the positioning hole 25 and is in contact with an inner wall of the positioning hole 25. The rotation restricting portion 24 includes an optical member recess 27 that is a portion of the periphery of the optical member 16 recessed along a circumferential direction and a contact portion 28 that is in contact with the optical member recess 27.

13 Claims, 26 Drawing Sheets

(51) Int. Cl.
*B60K 37/02* (2006.01)
*B60K 35/00* (2006.01)

(52) U.S. Cl.
CPC .............. *B60K 35/00* (2013.01); *B60K 37/02* (2013.01); *B60K 2350/1056* (2013.01); *B60K 2350/2039* (2013.01)

(56) References Cited

U.S. PATENT DOCUMENTS

2012/0170311 A1   7/2012  Huang et al.
2015/0219838 A1*  8/2015  Jang .................... G02B 6/0088
                                              349/65

* cited by examiner

LIGHTING DEVICE AND DISPLAY DEVICE

TECHNICAL FIELD

The present invention relates to a lighting device and a display device.

BACKGROUND ART

A liquid crystal panel included in a liquid crystal display device does not emit light. Therefore, a backlight unit is required as a separate lighting device. In general, backlight units are roughly classified into a direct type and an edge-light type according to their mechanisms. An example of the edge-light type is disclosed in Patent Document 1. Patent Document 1 discloses a configuration including a case, a light guide plate, alight source, and a holding member. The light guide plate having a rectangular overall shape is held inside the case. The light source is disposed opposite and close to a side surface of the light guide plate. The holding member is for positioning the light guide plate disposed inside the case. The light guide plate is held inside the case such that an end of the light guide plate is freely movable. According to Patent Document 1, with a cutout formed in the light guide plate at a proper position to reduce thermal expansion of the light guide plate toward the light source, a force of holding the light guide plate is maintained at a proper level and thus move of the light guide plate caused by thermal deformation is controlled.

RELATED ART DOCUMENT

Patent Document
Patent Document 1: Japanese Unexamined Patent Application Publication No. 2012-164507

Problem to be Solved by the Invention

The technology disclosed in Patent Document 1 is based on the premise that the light guide plate is rectangular. Such a light guide plate includes two sides that are perpendicular to each other in a periphery of the light guide plate. To position the light guide plate relative to a direction along a plate surface of the light guide plate with high accuracy, the two sides may be used as references for the positioning of the light guide plate. If the periphery includes a curved surface, it is difficult to use the curved end surface as a reference for the positioning and thus accuracy of the positioning tends to be low.

Disclosure of the Present Invention

The technology disclosed in this description was made in view of the above circumstances. An object is to suppress a reduction in accuracy of positioning of an optical member.

Means for Solving the Problem

A lighting device according to the present invention includes a light source, an optical member, a positioning portion, and a rotation restricting portion. The optical member is for adding an optical effect to light from the light source and has a sheet shape. The optical member includes a periphery that includes at least a curved end surface having a curved shape in a plan view. The positioning portion is for positioning the optical member relative to a direction along a plate surface of the optical member. The positioning portion includes a positioning hole and a positioning protrusion. The positioning hole opens through the optical member in a thickness direction of the optical member. The positioning protrusion is inserted in the positioning hole and in contact with an inner wall of the positioning hole. The rotation restricting portion is for restricting a rotation of the optical member about the positioning portion. The rotation restricting portion includes an optical member recess or an optical member projection. The optical member recess is a portion of the periphery of the optical member recessed along a circumferential direction. The optical member projection projects from the periphery of the optical member along the circumferential direction. The rotation restricting portion further includes a contact portion that is in contact with the optical member recess or the optical member projection.

According to the configuration, the light emitted by the light source and with the optical effect added by the optical member having the sheet shape exits to the outside. The optical member is positioned relative to the direction along the plate surface with the positioning protrusion inserted in the positioning hole of the positioning portion.

If the positioning portion has a round shape or a clearance is created between the positioning hole and the positioning protrusion, the optical member may rotate about the positioning portion and displacement thereof may occur. Because the contact portion of the rotation restricting portion is in contact with the optical member recess or the optical member projection, the rotation of the optical member about the positioning portion is restricted. Therefore, the displacement is less likely to occur.

The optical member includes the curved end surface included in the periphery. It is difficult to use the curved end surface as a reference for the positioning of the optical member. Therefore, accuracy in the positioning tends to be low. The positioning of the optical member is performed with the positioning portion and the rotation of the optical member is restricted by the rotation restricting portion. Therefore, even though the periphery of the optical member includes the curved end surface, a decrease in accuracy of the positioning is less likely to occur.

The following is preferable configurations for embodiments of the present invention.

(1) The periphery of the optical member may include a linear end surface having a linear shape in a plan view in addition to the curved end surface. The positioning portion and the rotation restricting portion may be arranged in areas of the optical member divided by a normal line that crosses a middle of the linear end surface with respect to an extending direction in which the linear end surface extends, respectively. In comparison to a configuration in which the positioning portion and the rotation restricting portion are arranged in one of areas of the optical member divided by the normal line with respect to the extending direction of the linear end surface, a longer distance is achieved between a center of the positioning portion and the rotation restricting portion. According to the configuration, the rotation is restricted by the rotation restricting portion with further higher accuracy and thus the decrease in accuracy of the positioning of the optical member is further less likely to occur.

(2) The rotation restricting portion may be arranged at an end of the linear end surface of the optical member. In comparison to a configuration in which the rotation restricting portion is arranged closer to the normal line that the end of the linear end surface of the optical member, a further larger distance is achieved between the center of the positioning portion and the rotation restricting portion. According to the configuration, the rotation is restricted by the rotation restricting portion with further higher accuracy and thus the decrease in accuracy of the positioning of the optical member is further less likely to occur.

(3) The positioning protrusion may include a communicating hole that is communicated with the positioning hole. When the positioning protrusion included in the positioning portion includes the communication hole that is communicated with the positioning hole, an object disposed on a side opposite from the light exiting side relative to the lighting device can be properly viewed through the positioning hole that opens through the optical member in the thickness direction of the optical member and the communicating hole that is communicated with the positioning hole.

(4) The optical member may include at least a light guide plate that includes a light entering surface and a light exiting surface. The light entering surface may be included in the periphery of the optical member and the light from the light source may enter through the light entering surface. The light entering surface may have a linear shape in a plan view. The light extending surface may be included in one of plate surfaces of the optical member and the light may exit through the light exiting surface. The light guide plate may include the positioning hole and the optical member recess or the optical member projection. With the positioning protrusion inserted in the positioning recess of the light guide plate and the contact portion in contact with the optical member recess or the optical member projection of the light guide plate, the light guide plate is positioned and the rotation of the light guide plate is restricted. According to the configuration, the decrease in accuracy of the positioning of the light guide plate is further less likely to occur. Therefore, light use efficiency of light from the light source and entering the light guide plate through the light entering surface is stable and uneven brightness is less likely to occur in light exiting through the light exiting surface.

(5) The light guide plate may include the optical member recess that is a portion of the light entering surface which may be recessed. Because the optical member recess is the recessed portion of the light entering surface, the light entering surface is positioned relative to the light source with high accuracy. According to the configuration, the light use efficiency of the light from the light source and entering the light guide plate through the light entering surface is more stable.

(6) The light source may include light sources arranged at intervals along an extending direction of the light entering surface. The light guide plate may include the optical member recess that may be a portion of the light entering surface located closer to an end with respect to the extending direction than the light source at an end and recessed. With the optical member recess, the light from the light source at the end among the light sources arranged at intervals along the extending direction of the light entering surface and entering through the light entering surface is less likely to be blocked. Therefore, proper light use efficiency is achieved. An amount of light from the light source and entering an end of the light guide plate with respect to the extending direction of the light entering surface tends to be small. As described above, the proper use efficiency of light from the light source at the end and entering through the light entering surface is achieved. Therefore, the end of the light guide plate with respect to the extending direction of the light entering surface is less likely to have a dark spot and the uneven brightness is less likely to occur.

(7) The optical member may include at least a light guide plate and an optical sheet. The light guide plate may include a light entering surface and a light exiting surface. The light entering surface may be included in the periphery of the optical member and through which the light from the light source may enter. The light exiting surface may be included in one of plate surfaces of the light guide plate and through which the light exits. The optical sheet may be disposed to overlap the light guide plate on the light exiting side. The light guide plate and the optical sheet may include the optical member recess or the optical member projection. With the positioning protrusion inserted in the positioning hole of the light guide plate and the optical sheet and the contact portion in contact with the optical member recess or the optical member projection of the light guide plate and the optical sheet, the light guide plate and the optical sheet are positioned and the rotations of the light guide plate and the optical sheet are restricted. The decreases in accuracy of the positioning of the light guide plate and the optical sheet are less likely to occur. Therefore, the entering efficiency of light from the light source and entering the light guide plate through the light entering surface is stable and the uneven brightness is less likely to occur in the light exiting through the light exiting surface. Furthermore, the light exited light guide plate through the light exiting surface efficiently enters the optical sheet and thus high light use efficiency is achieved.

(8) The lighting device may further include a fixing portion for fixing an opening edge of the positioning hole of the optical member to the positioning protrusion. With the opening edge of the positioning hole of the optical member fixed to the positioning protrusion with the fixing member, a portion of the optical member around the positioning hole is less likely to be warped or wrinkled even if the optical member expands or contracts due to thermal expansion or thermal contraction. Therefore, the uneven brightness is less likely to occur in exiting light around the positioning hole of the light guide plate.

(9) The lighting device may further include a holding member for holding the optical member from a side opposite from the light exiting side. The holding member may include the positioning protrusion and the contact portion. With the positioning protrusion of the holding member inserted in the positioning hole of the optical member and the contact portion of the holding member in contact with the optical member recess or the optical member projection of the optical member, the optical member is positioned relative to the holding member and the rotation of the optical member is restricted.

Next, to solve the problem described earlier, a display device according to the present invention includes the lighting device described above and a display panel for displaying images using light from the lighting device. The display panel is disposed on the light exiting side relative to the lighting device.

According to the display device having such a configuration, the decrease in accuracy of the positioning of the optical member in the lighting device is less likely to occur. Therefore, optical performances of the optical member are properly exerted and thus images are displayed with high display quality.

The following is preferable configurations for embodiments of the present invention.

(1) The positioning protrusion may include a communicating hole that is communicated with the positioning hole. The display panel may include a panel through hole that opens through the display panel in a thickness direction of the display panel. The panel through hole may be communicated with the positioning hole and the communicating hole. Because the panel through hole that opens through the display panel along the thickness direction of the display panel is communicated with the positioning hole of the optical member and the communicating hole of the positioning protrusion, an object disposed on the side opposite from the display panel relative to the lighting device can be viewed through the panel through hole, the positioning hole, and the communicating hole from the light exiting side with respect to the display panel.

(2) The display panel may include at least a pair of substrates, a liquid crystal layer, an outer sealing member, and a through hole-side sealing member. The substrates may include the panel through hole. The liquid crystal layer may be held between the substrates. The outer sealing member may surround the liquid crystal layer. The outer sealing member may be disposed between the peripheral portions of the substrates to seal the liquid crystal layer. The through hole-side sealing member may surround the panel through hole. The through hole-side sealing member may be disposed between opening edges of the panel through hole to seal the liquid crystal layer. According to the configuration, the liquid crystal layer sandwiched between the substrates of the display panel is sealed with the outer sealing member between the peripheral portions of the substrates. Although the panel through hole is formed in the substrates, the liquid crystal layer is sealed with the through hole-side sealing member between the opening edges of the panel through hole in the substrates.

(3) The display device may further include an outer holding member and a through hole-side holding member. The outer holding member may be for sandwiching a peripheral portion of the display panel between the lighting device and the outer holding member and hold. The through hole-side holding member may be for sandwiching the opening edge of the panel through hole of the display panel between the lighting device and the through hole-side holding member. The through hole-side holding member may include at least a surface having a light blocking property. With the peripheral portion of the display panel sandwiched between the lighting device and the outer holding member and the opening edge of the panel through hole sandwiched between the lighting device and the through hole-side holding member, the display panel is held. Furthermore, with the through hole-side holding member including at least the surface having the light blocking property, the opening edge of the panel through hole of the display panel is less likely to be directly viewed from the light exiting side. Therefore, images displayed around the panel through hole of the display panel are less likely to have defectives.

(4) The display panel may include a panel protrusion or a panel recess at a position overlapping the optical member projection or the optical member recess in a plan view. The contact portion may include an optical member contact portion and a panel contact portion. The optical member contact portion may be in contact with the optical member projection or the optical member recess. The panel contact portion may be in contact with the panel protrusion or the panel recess. The positioning protrusion may include an optical member-side inserting portion and a panel-side inserting portion. The optical member-side inserting portion may be inserted in the positioning hole. The panel-side inserting portion may be inserted in the panel through hole. With the optical member-side inserting portion of the positioning protrusion inserted in the positioning hole of the optical member and the panel-side inserting portion of the positioning protrusion inserted in the panel through hole, the optical member and the display panel are positioned. With the optical member contact portion of the contact portion in contact with the optical member projection or the optical member recess and the panel contact portion of the contact portion in contact with the panel protrusion or the panel recess, the rotations of the optical member and the display panel are restricted. Therefore, the decreases in accuracy of the positioning of the optical member and the display panel are less likely to occur. The light with the optical effects added by the optical member efficiently enter the display panel and thus high display quality is achieved.

Advantageous Effect of the Invention

According to the present invention, the decrease in accuracy of the positioning of the optical member is less likely to occur.

MODE FOR CARRYING OUT THE INVENTION

<First Embodiment>

Figure 1:
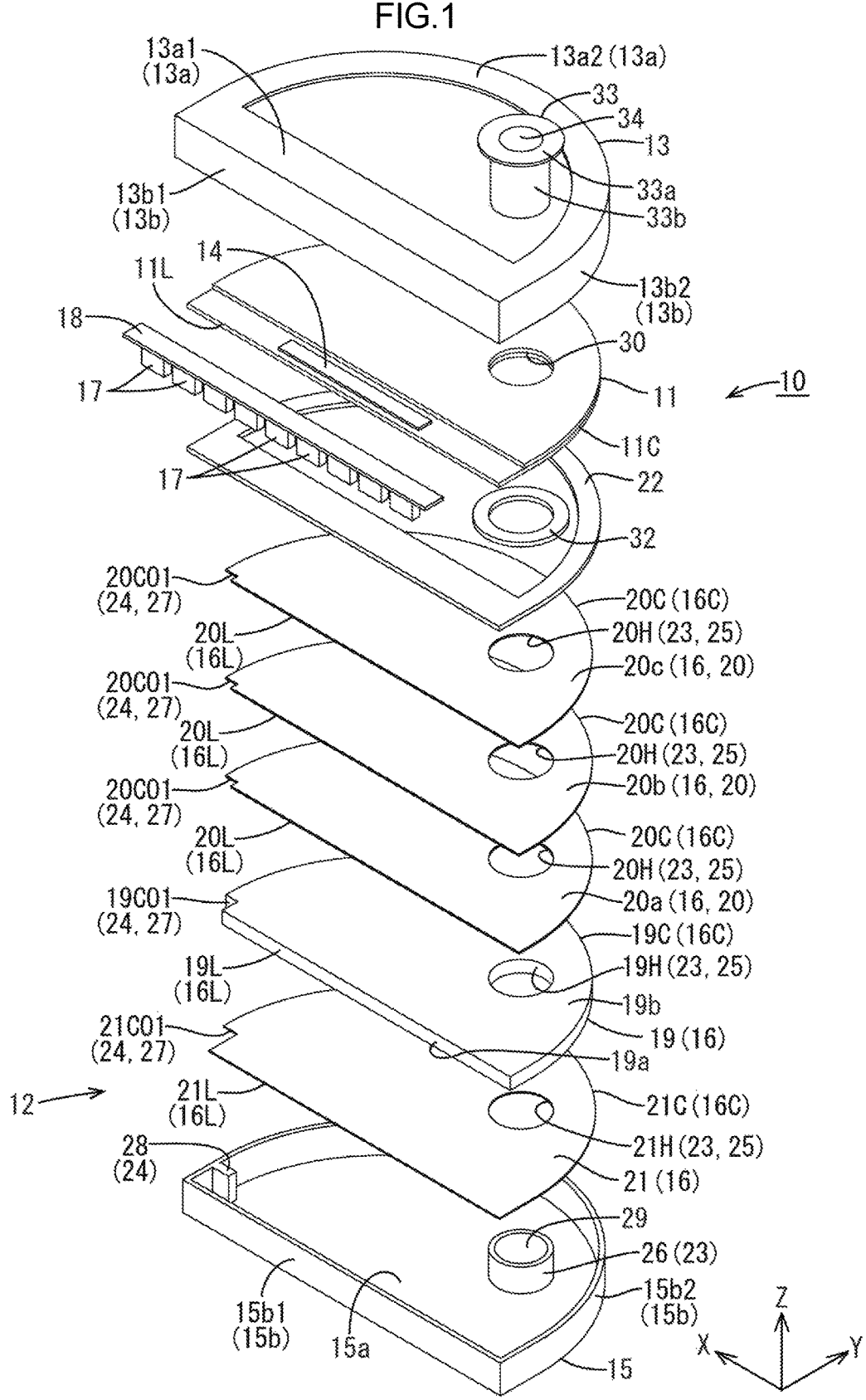
FIG. 1 is an exploded perspective view of a liquid crystal display device according to a first embodiment of the present invention.

A first embodiment of the present invention will be described with reference to FIGS. 1 to 5. In this embodiment section, a liquid crystal display device (a display device) 10 including a liquid crystal panel 11 as a display panel will be described. X-axes, Y-axes, and Z-axes may be present in the drawings. The axes in each drawing correspond to the respective axes in other drawings. The vertical direction is defined based on FIGS. 3 to 5. An upper side in FIGS. 3 to 5 corresponds to a front side. A lower side in FIGS. 3 to 5 corresponds to a rear side.

The liquid crystal display device 10 has a substantially semicircular overall shape. As illustrated in FIG. 1, the liquid crystal display device 10 includes at least the liquid crystal panel (a liquid crystal panel) 11, a backlight unit (a lighting device) 12, and a bezel (an outer holding member) 13. The liquid crystal panel 11 is configured to display images. The backlight unit 12 is disposed behind the liquid crystal panel 11 for supplying light to the liquid crystal panel 11 for displaying images. The bezel 13 holds a peripheral portion of the liquid crystal panel 11 together with the backlight unit 12. The liquid crystal display device 10 according to this embodiment may be mounted in a dashboard of a vehicle, that is, a component of an instrument panel. The liquid crystal display device 10 is configured to display various warning message images, graphic images in a car navigation system, and captured images recorded by an onboard camera.

Figure 3:
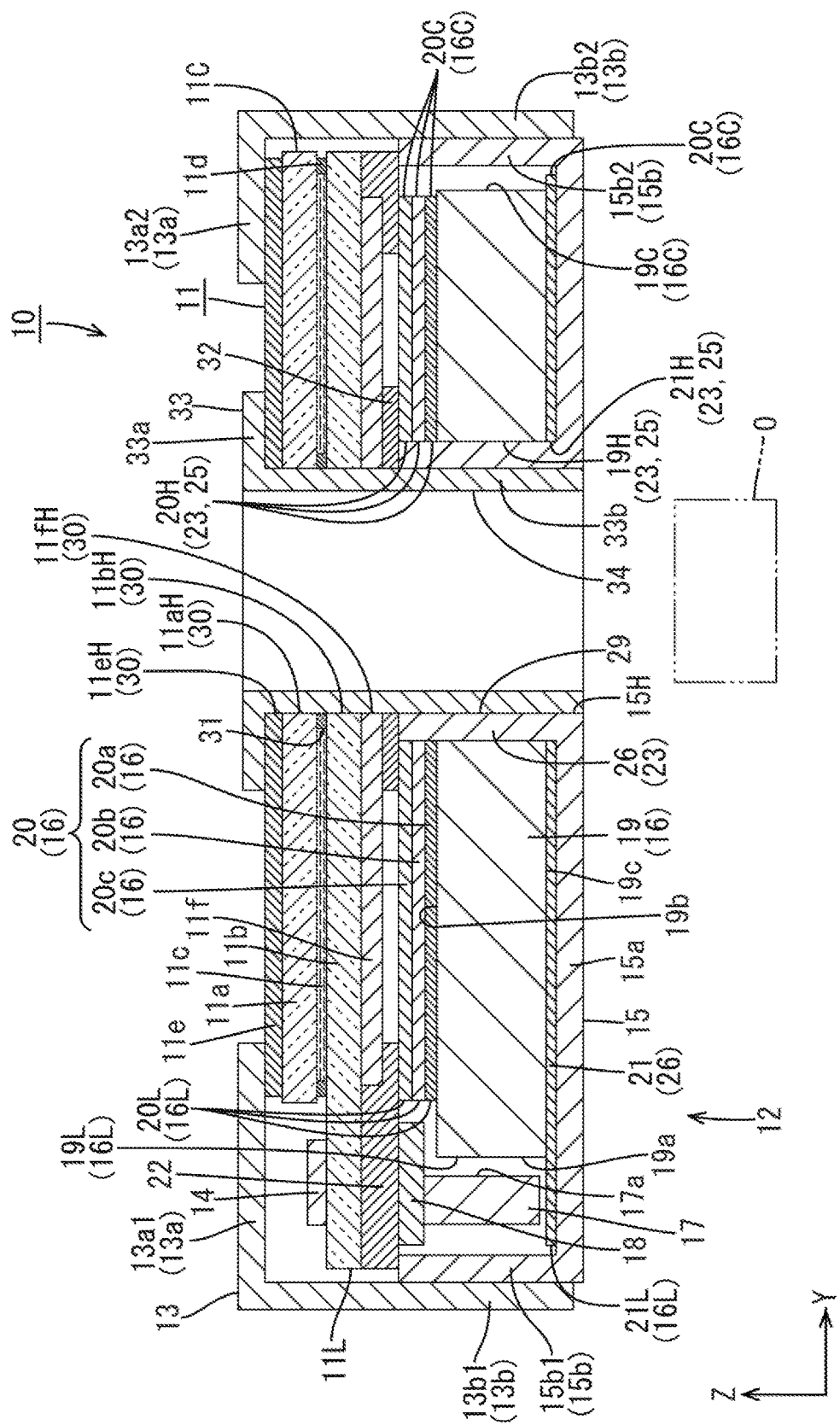
FIG. 3 is a cross-sectional view along line A-A in FIG. 2.

The liquid crystal panel 11 will be described in detail. As illustrated in FIG. 1, the liquid crystal panel 11 has a substantially semicircular overall shape (a fan shape with a central angle of about 180 degrees) in a plan view. As illustrated in FIG. 3, the liquid crystal panel 11 includes at least a pair of substrates 11a and 11b, a liquid crystal layer 11c, an outer sealing member 11d, and a pair of polarizing plates 11e and 11f. The substrates 11a and 11b and the polarizing plates 11e and 11f have substantially semicircular shapes in a plan view. The outer sealing member 11d has a substantially semicircular frame shape in a plan view along an outline of the pair of the substrates 11a and 11b.

As illustrated in FIG. 1, the liquid crystal panel 11 includes a linear end surface 11L and a curved end surface (an arc end surface) 11C included in a periphery of the liquid crystal panel 11. The linear end surface 11L has the linear shape that linearly extends along the X-axis direction. The curved end surface 11C has a shape of arc of a semicircle connecting an end of the linear end surface 11L to another end in a plan view. The ends of the linear end surface 11L are away from each other in an extending direction in which the linear end surface 11L extends. The linear end surface 11L has a length substantially equal to a diameter of the liquid crystal panel 11 having the substantially semicircular shape. The curved end surface 11C has a length substantially equal to a value calculated by multiplying a half of the length of the linear end surface 11L (or the diameter of the liquid crystal panel 11) by $\pi$ (pi). The liquid crystal panel 11 includes a display area (an active area) having a substantially semicircular shape and a non-display area (a non-active area) having a substantially semicircular frame shape. The display area is an area at a center of a screen in which images are displayed. The non-display area is an area at a periphery of the screen surrounding the display area in which images are not displayed. The liquid crystal panel 11 is configured to display images in the display area using light supplied by the backlight unit 12. A front side of the liquid crystal panel 11 is a light exiting side. The extending direction of the linear end surface 11L of the liquid crystal panel 11 corresponds with the X-axis direction and a direction normal to the linear end surface 11L corresponds with the Y-axis direction. A thickness direction of the liquid crystal panel 11 (perpendicular to the plate surface) corresponds with the Z-axis direction.

One of the substrates 11a and 11b of the liquid crystal panel 11 on the front side is a CF substrate 11a and the other on the rear side (the back side) is an array board 11b. As illustrated in FIGS. 1 and 3, the array substrate 11b includes a curved end along the curved end surface 11C and a liner end along the linear end surface 11L. The curved end and a curved end of the CF substrate 11a are on the same plane. The linear end projects more outward than a linear end of the CF substrate 11a. A driver (a panel driver) 14 for driving the liquid crystal panel 11 and a flexible printed circuit board, which is not illustrated, for supplying various signals to the driver 14 are mounted to the liner end that projects outward. The driver 14 is directly mounted on the linear end of the array substrate 11b through chip on glass (COG) mounting. The driver 14 is configured to process various input signals supplied by a panel driver circuit board, which is not illustrated, via the flexible printed circuit board and supply them to TFTs in the display area, which will be described later.

Internal configurations (not illustrated) in the display area of the liquid crystal panel 11 will be described. On an internal surface of the array substrate 11b (on the liquid crystal 11c side, a side opposed to the CF substrate 11a), the TFTs (thin film transistors), which are switching components, and pixel electrodes are disposed in a matrix. Furthermore, gate lines and source lines are routed in a grid to surround the TFTs and the pixel electrodes. Signals related to images are supplied to the gate lines and the source lines by the driver 14. Each of the pixel electrodes disposed in the corresponding rectangular area surrounded by the gate lines and the source lines may be a transparent electrode made of ITO (indium tin oxide) or ZnO (zinc oxide).

On an internal surface of the CF substrate 11a, color filters are disposed at positions corresponding to the electrodes, respectively. The color filters include three colors (R, G, B) which are alternately arranged. A light blocking layer (a black matrix) is formed among the color filters for reducing color mixture. A counter electrode is disposed on surfaces of the color filters and the light blocking layer. The counter electrode is opposed to the pixel electrodes on the array substrate 11b. The CF substrate 11a is slightly smaller than the array substrate 11b. Alignment films (not illustrated) are formed on the internal surfaces of the substrates 11a and 11b for aligning liquid crystal molecules in the liquid crystal layer 11c.

Figure 4:
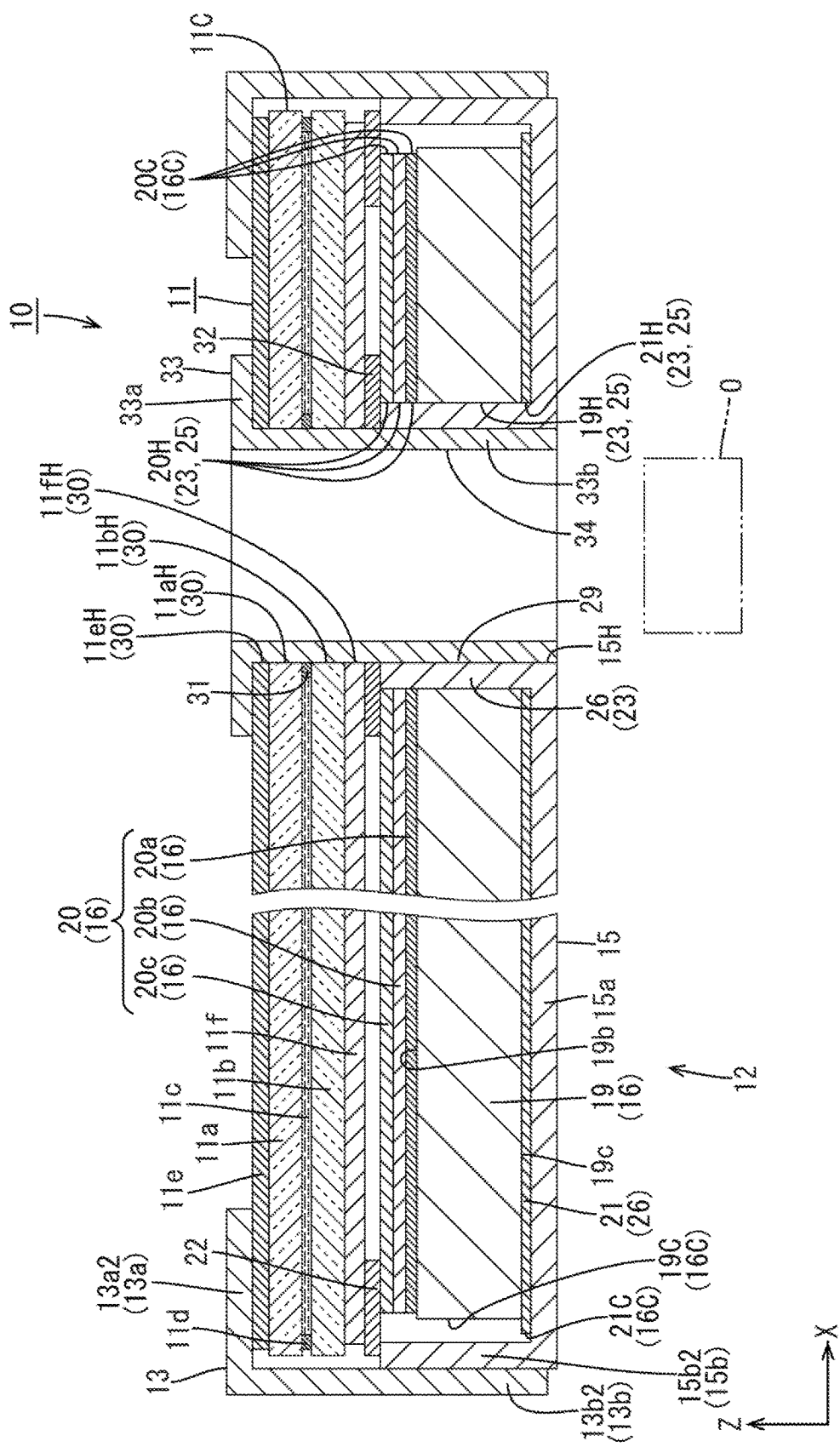
FIG. 4 is a cross-sectional view along line B-B in FIG. 2.

Next, the bezel 13 will be described prior to the backlight unit 12. The bezel 13 is made of metal (e.g., aluminum). As illustrated in FIG. 1, the bezel 13 has a substantially semicircular frame overall shape. As illustrated in FIGS. 3 and 4, the bezel 13 includes a panel holding portion 13a and an outer covering portion 13b. The panel holding portion 13a presses the entire periphery of the liquid crystal panel 11 from the front side. The outer covering portion 13b projects from a periphery of the panel holding portion 13a toward the rear side and surrounds the backlight unit 12 from an outer side. The panel holding portion 13a has a substantially semicircular frame shape in a plan view. The panel holding portion 13a includes a linear portion 13a1 having a linear shape in a plan view and a curved portion (an arc portion) 13a2 having a curved shape (an arc shape) in a plan view. The linear portion 13a1 has the linear shape that linearly extends along the X-axis direction. The curved portion 13a2 has a shape of arc of a semicircle connecting an end of the linear portion 13a1 to another end in a plan view. The ends are away from each other in an extending direction in which the linear portion 13a1 extends. The extending direction of the linear portion 13a1 of the panel holding portion 13a corresponds with the X-axis direction. A direction normal to the linear portion 13a1 corresponds with the Y-axis direction. The outer covering portion 13b includes a linear portion 13b1 having a linear shape in a plan view and a curved portion (an arc portion) 13b2 having a curved shape (an arc shape) in a plan view. The linear portion 13b1 has the linear shape that linearly extends along the X-axis direction. The curved portion 13b2 has the curved shape that has a shape of arc of a semicircle connecting an end of the linear portion 13a1 to another end in a plan view. The ends are away from each other in the extending direction of the linear portion 13a1. The liquid crystal panel 11 is sandwiched between the bezel 13 and the backlight unit 12 and held. The liquid crystal panel 11 is fixed to the backlight unit 12 with a panel fixing tape (a panel fixing member) 22, which will be described later. The panel fixing tape 22 is made of synthetic resin. The panel fixing tape 22 includes a base having a substantially semicircular frame shape along the periphery of the liquid crystal panel and adhesives applied to both surfaces of the base. The surfaces of the base of the panel fixing tape 22 are in black, that is, the surfaces having light blocking properties. With the surfaces, leaking light from the backlight unit 12 is less likely to transmit through the non-display area of the liquid crystal panel 11. The panel fixing tape 22 includes a linear portion having a linear shape in a plan view and a curved portion having a curved shape in a plan view similar to the panel holding portion 13a of the bezel 13.

Figure 2:
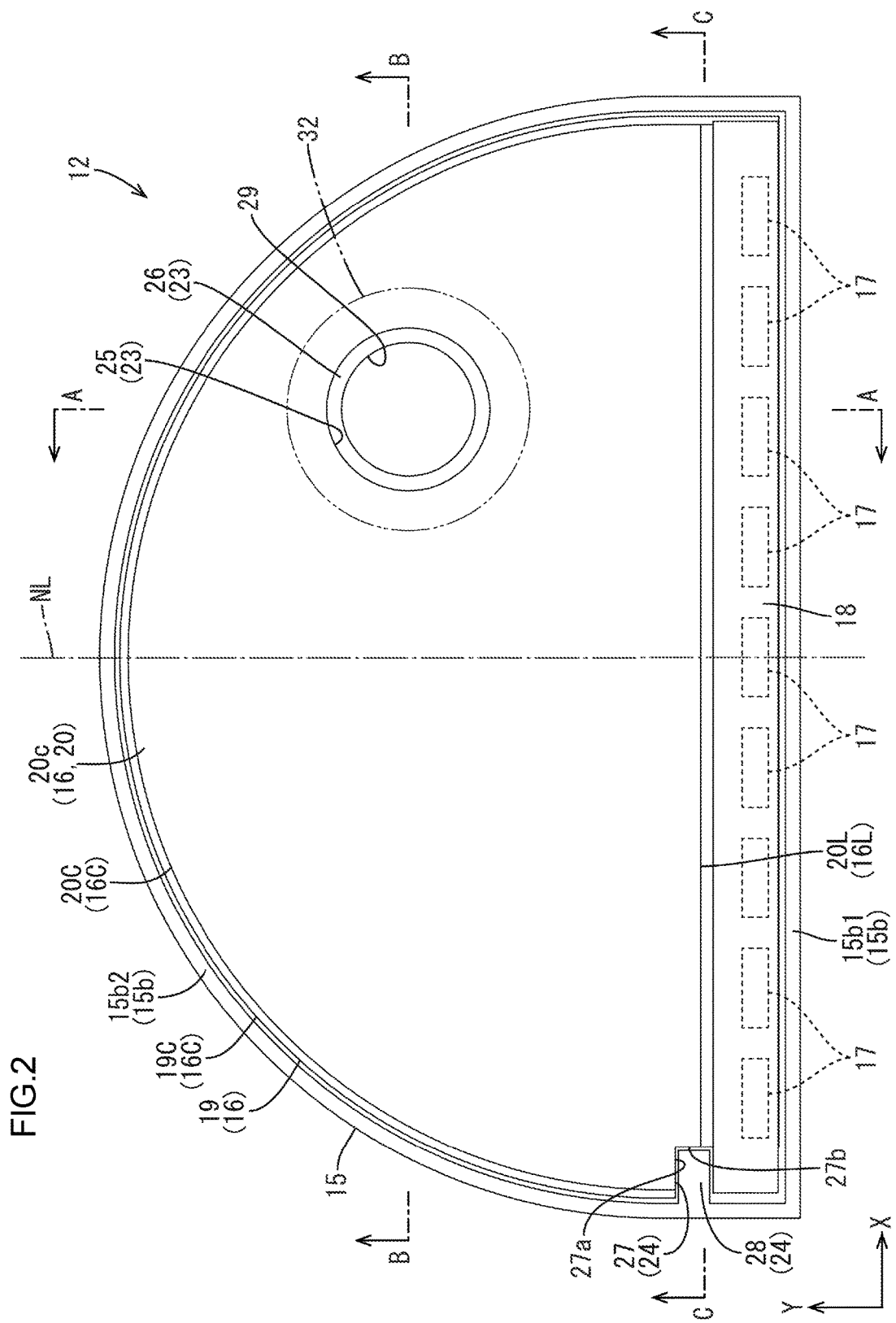
FIG. 2 is a plan view of a backlight unit included in the liquid crystal display device.

Next, a configuration of the backlight unit 12 will be described. The backlight unit 12 has a substantially block overall shape with a substantially semicircular shape in a plan view similar to the liquid crystal panel 11. As illustrated in FIGS. 1 to 3, the backlight unit 12 includes at least a chassis (a holding member) 15, LEDs (light emitting diodes) 17, an LED board (a light source board) 18, and an optical member 16. The chassis 15 has a substantially box shape with an opening on the liquid crystal panel 11 side. The LEDs 17 are light sources. The LEDs 17 are mounted on the LED board 18. The optical member 16 is for adding optical effects on light from the LEDs 17 and directing the light toward the liquid crystal panel 11. The optical member 16 includes a light guide plate (an optical member) 19, optical sheets (an optical member) 20, and a reflecting sheet (an optical member, a reflecting member) 21. The light guide plate 19 guides light from the LEDs 17. The optical sheets 20 are laid in layers on the front side of the light guide plate 19. The reflecting sheet 21 is laid on the rear side of the light guide plate 19. The LEDs 17 (or the LED board 18) is disposed closer to the linear ends of the backlight unit 12 and the liquid crystal panel 11 including the linear end surface 11L. The light enters one side of the light guide plate 19. Namely, the backlight unit 12 is an edge-light type (a side-light type). The backlight unit 12 is configured to convert the light from the LEDs 17 into a planar light with the optical effects of the optical member 16 and direct the light toward the liquid crystal panel 11 on the front side through the opening of the chassis 15. Namely, the front side of the backlight unit 12 is the light exiting side. Components of the backlight unit 12 will be described in sequence.

The chassis 15 is made of metal (e.g., aluminum). As illustrated in FIGS. 1 to 3, the chassis 15 has the substantially box shape with the opening on the front side. According to the configuration, the chassis 15 holds the LED board 18 and the optical member 16 therein. The chassis 15 includes a bottom plate 15a and side plates 15b. The bottom plate 15a has a substantially semicircular shape in a plan view similar to the liquid crystal panel 11. The side plates 15b project a periphery of the bottom plate 15a to the front side. The bottom plate 15a includes a plate surface parallel to plate surfaces of the liquid crystal panel 11 and the optical member 16. The bottom plate 15a supports the optical member 16 held in the chassis 15 from the rear side. An extending direction in which the linear end portion of peripheral portions of the bottom plate 15a having a linear shape in a plan view extends corresponds with the X-axis direction. A direction normal to the linear end portion corresponds with the Y-axis direction. The side plates 15b surround the optical member 16 held inside the chassis 15 from the outer side. The side plates 15b form a substantially semicircular frame shape as a whole. The side plates 15b includes a linear side plate 15b1 having a linear shape in a plan view and a curved side plate (an arc side plate) 15b2 having a curved shape (an arch shape) in a plan view. The linear side plate 15b1 has the linear shape that linearly extends along the X-axis direction. The curved side plate 15b2 has a shape of arch of a semicircle in a plan view connecting one end of the linear side plate 15b1 to another end. The ends are away from each other in the extending direction of the linear side plate 15b1. The side plates 15b are surrounded by the outer covering portions 13b of the bezel 13 from the outer side. The side plates 15b and the outer covering portion 13b include holding structures that are not illustrated. With the holding structures, the chassis 15 and the bezel 13 are held together when they are assembled. Furthermore, a portion of the rear surface of the periphery of the panel fixing tape 22 is fixed to tops of the side plates 15b.

As illustrated in FIGS. 1 to 3, the LEDs 17 includes LED chips (LED components), which is semiconductor light emitting components, disposed on boards and sealed with resins. The boards are fixed to the plate surface of the LED board 18. Each of the LED chip mounted on the board has one kind of main light emission wavelength, specifically, the LED chip emits blue light. The resin that seals the LED chip contains phosphors that emit light in a specific color when excited by the blue light emitted by the LED chip, resulting in emission of substantially white light as a whole. The LED 17 includes a side surface adjacent to a mounting surface that is fixed to the LED board 18 and configured as a light exiting surface 17a. Namely, the LED 17 is a so-called side emitting type LED. An optical axis of the LED 17 is parallel to a direction normal to the light exiting surface 17a, that is, the Y-axis direction. The "optical axis" corresponds to a direction in which a ray of light having the highest light emitting intensity in the light emitted by the LED 17 (distribution of light) travels.

As illustrated n FIGS. 1 to 3, the LED board 18 includes a base board (a base member) made of insulating material formed in a film shape (a sheet shape) with flexibility. Plate surfaces of the base board are parallel to the plate surfaces of the liquid crystal panel 11 and the optical member 16. On a plate surface of the LED board 18 on the backside (the plate surface on a side opposite from the liquid crystal panel 11, the plate surface facing the light guide plate 19), the LEDs 17 are surface-mounted and a pattern of lines for supplying power to the LEDs 17 is formed by patterning. The LED board 18 has a rectangular shape that extends along the extending direction of the linear end of the bottom plate 15a of the chassis 15 (the X-axis direction). The LEDs 17 are arranged at intervals along the direction and mounted on the LED board 18. The LED board 18 has a long dimension smaller than the length of the linear end of the bottom plate 15a and a short dimension larger than a distance between the linear side plate 15b of the side plates 15b and the light guide plate 19. Therefore, a portion of the LED board 18 on the light guide plate 19 side with respect to the short-side direction (the Y-axis direction) is placed on the front side of the light guide plate 19. As illustrated in FIG. 3, the LED board 18 is disposed behind the liquid crystal panel 11 with respect to the Z-axis direction and fixed to the liquid crystal panel 11 with the panel fixing tape 22.

Next, the common structure of the optical member will be described. As illustrated in FIGS. 1 and 2, the optical member 16 has a substantially semicircular sheet shape in a plan view. Plate surfaces of the optical member 16 are parallel to the plate surfaces of the liquid crystal panel 11 and the bottom plate 15a of the chassis 15. The optical member 16 includes a linear end surface 16L and a curved end surface (an arc end surface) 16C on peripheries thereof. The linear end surface 16L has a linear shape in a plan view. The curved end surface 16C has a curved shape (an arc shape) in a plan view. The linear end surface 16L linearly extends along the X-axis direction. The curved end surface 16C has a semicircular arc shape in a plan view such that ends of the linear end surface 16L away from each other in the extending direction of the linear end surface 16L are connected by the curved end surface 16C. The linear end surface 16L has a long dimension about equal to the diameter of the optical member 16 having the semicircular shape. The curved end surface 16C has a long dimension about equal to a value calculated by multiplying a half of the long dimension of the linear end surface 16L (a radius of the optical member 16) by $\pi$ (pi). The extending direction of the linear end surface 16L of the optical member 16 corresponds with the X-axis direction. The direction normal to the linear end surface 16L corresponds with the Y-axis direction. Furthermore, a thickness direction of the optical member (a direction perpendicular to the plate surface) corresponds with the Z-axis direction. In FIG. 2, a normal line NL that crosses the middle of the linear end surface 16L with respect to the extending direction of the linear end surface 16L is indicated with a chain line.

As illustrated in FIGS. 1 and 3, the light guide plate 19 included in the optical member 16 has a semicircular plate shape slightly smaller than the bottom plate 15a of the chassis 15. The light guide plate 19 is held inside the chassis 15 such that the light guide plate 19 is surrounded by the side plates 15b. Furthermore, the light guide plate 19 is disposed directly below the liquid crystal panel 11 and the optical sheets 20. The light guide plate 19 includes a light guide plate linear end surface 19L and a light guide plate curved end surface (a light guide plate arc end surface) 19C on the peripheries thereof. The light guide plate linear end surface 19L is included in the linear end surface 16L. The light guide plate curved end surface 19C is included in the curved end surface 16C. The light guide plate linear end surface 19L of peripheral surfaces of the light guide plate 19 is opposed to the LEDs 17 and configured as a light entering surface (a light source opposed end surface) through which the light from the LEDs 17 enters. The light guide plate curved end surface of the peripheral surfaces of the light guide plate 19 is an LED non-opposed surface (a light source non-opposed surface) which is not opposed to the LEDs 17. The light guide plate curved end surface 19C is included in an end surface (an opposite end surface) of the peripheral surfaces of the light guide plate 19 opposite from the light entering surface 19a. The light guide plate 19 includes a pair of plate surfaces, one on the front side and the other on the rear side. The front plate surface (on the liquid crystal 11 side) is a light exiting surface 19b through which the light exits toward the liquid crystal panel 11. The rear plate surface of the light guide plate 19 is an opposite plate surface 19c on the opposite side from the light exiting surface 19b. According to the configuration, an arrangement direction in which the LEDs 17 and the light guide plate 19 are arranged corresponds with the Y-axis direction, and an arrangement direction in which the optical sheets 20 (or the liquid crystal panel 11) and the light guide plate 19 are arranged corresponds with the Z-axis direction. The arrangement directions are perpendicular to each other. The light guide plate 19 receives the light emitted by the LEDs 17 substantially along the Y-axis direction through the light entering surface 19a and transmits the light therethrough. The light guide plate 19 guides the light toward the optical sheets 20 (the front side, the light exiting side) so that the light exits from the light exiting surface 19b, which is the front plate surface. A light reflecting pattern (not illustrated) is formed on an opposite plate surface 19c of the light guide plate 19. The light reflecting pattern includes light reflecting portions for reflecting rays of light inside the light guide plate 19 toward the light exiting surface 19b to promote emission of light through the light exiting surface 19b. With proper optical design of the light reflecting pattern, evenness in intensity of exiting light from the light guide plate 19 through the light exiting surface 19b is properly achieved. The light guide plate 19 includes the light guide plate curved end surface 19C. The LEDs 17 are arranged along the X-axis direction. Therefore, a direct distance between the light exiting surface 17a of each LED 17 and the light guide plate curved end surface 19C with respect to the Y-axis direction varies from LED 17 to LED 17. In comparison to a conventional light guide plate having a rectangular shape, the optical design of the light reflecting pattern is more complex.

As illustrated in FIGS. 1 and 3, the optical sheets 20 included in the optical member 16 have a substantially semicircular sheet shape in a plan view similar to the light guide plate 19. The optical sheets 20 are plated on the light exiting surface 19b of the light guide plate 19 on the front side between the liquid crystal panel 11 and the light guide plate 19. According to the configuration, the optical sheets 20 transmit the light exiting from the light guide plate 19 and direct the transmitted light with predefined optical effects added thereto toward the liquid crystal panel 11. Each of the optical sheets 20 includes an optical sheet linear end surface 20L and an optical sheet curved end surface (an optical sheet arc end surface) 20C. The optical sheet linear end surface 20L is included in the linear end surface 16L and the optical sheet curved end surface 16C is included in the curved end surface 16C. The optical sheets 20 according to this embodiment include three sheets: one diffusing sheet 20 and two prism sheets 20b and 20c (a first prism sheet 20b and a second prism sheet 20c). The diffusing sheet 20a includes a substantially transparent base member made of synthetic resin and a large number of diffusing particles dispersed in the base member for diffusing light. The diffusing sheet 20a is placed on the light guide plate 19, that is, the closest to the light guide plate among the optical sheets 20. Each of the prism sheets 20b and 20c includes unit prisms that extend along a first direction parallel to the plate surface of the substantially transparent base member made of synthetic resin. The unit prisms are arranged on one of the plate surfaces of the base member along a second direction perpendicular to the first direction. The prism sheets 20b and 20c selectively add light collecting effects (anisotropic light collecting effects) to the exiting light with respect to the second direction corresponding with the direction in which the unit prisms are arranged. One of the prism sheets 20b and 20c placed on the diffusing sheet 20a is the first prism sheet 20b. The other one of the prism sheets 20b and 20c placed on the first prism sheet 20b and arranged the closest to the liquid crystal panel 11 is the second prism sheet 20c. The back surface of the panel fixing tape 22 is fixed to a peripheral portion of the second prism sheet 20c.

As illustrated in FIGS. 1 and 3, the reflecting sheet 21 included in the optical member 16 is disposed on the back side of the light guide plate 19 to cover the opposite plate surface 19c opposite from the light exiting surface 19b. The reflecting sheet 21 is a synthetic resin sheet including a surface with high light reflectivity. The reflecting sheet 21 efficiently directs light exiting through the opposite plate surface 19c after transmitting through the light guide plate 19 toward the front side (the light exiting surface 19b). The reflecting sheet 21 has a substantially semicircular sheet shape in a plan view similar to the light guide plate 19 and the optical sheets 20. The reflecting sheet 21 includes a reflecting sheet linear end surface 21L and a reflecting sheet curved end surface (a reflecting sheet arc end surface) 21C included in a periphery of the reflecting sheet 21. The reflecting sheet linear end surface 21L is included in the linear end surface 16L and the reflecting sheet curved end surface 21C is included in the curved end surface 16C. A large portion of the reflecting sheet 21 located in the middle is sandwiched between the light guide plate 19 and the bottom plate 15a of the chassis 15. The periphery of the reflecting sheet 21 projects outer than the periphery of the light guide plate 19. Especially, a portion of the periphery of the reflecting sheet 21 on the LED board 18 side projects from the light entering surface 19a of the light guide plate 19 to a point farther than the LEDs 17. The light from the LEDs 17 is efficiently reflected by the projecting portion so that the light enters through the light entering surface 19a.

The backlight unit included in the conventional liquid crystal display device includes the optical member having the rectangular shape and the peripheral surfaces that include two sides perpendicular to each other. To position the optical member relative to the direction along the plate surface of the optical member, the side may be used as references. According to the configuration, the optical member can be easily positioned with high accuracy. However, the peripheral surfaces of the optical member 16 in this embodiment include the curved end surface 16C, which is difficult to use as a reference for the positioning. Therefore, the accuracy in positioning tends to be low. Furthermore, in the backlight unit 12 including the optical member 16 that includes the curved end surface 16C, the optical design for maintaining the evenness in intensity of exiting light (e.g., optical design of the light reflecting pattern) is complicated. Therefore, when the accuracy in positioning of the optical member 16 decreases and the displacement occurs, the evenness in intensity of exiting light tends to largely decrease.

As illustrated in FIGS. 1 and 2, the backlight unit 12 in this embodiment includes a positioning portion 23 and a rotation restricting portion 24. The positioning portion 23 is for positioning the optical member 16 relative to the direction along the plate surface of the optical member 16. The rotation restricting portion 24 is for restricting the optical member 16 from rotating about the positioning portion 23. The positioning portion 23 includes a positioning hole 25 and a positioning protrusion 26. The positioning hole 25 opens in the thickness direction of the optical member 16. The positioning protrusion 26 is inserted in the positioning hole 25 and in contact with an inner wall of the positioning hole 25. In the positioning portion 23, the positioning protrusion 26 is in the positioning hole 25. Therefore, the optical member 16 is positioned relative to the direction along the plate surface of the optical member 16. The positioning hole 25 has a round shape in a plan view and an annular edge without any beak. The positioning protrusion 26 has a substantially round tubular shape with a round plan-view shape. Therefore, the optical member 16 may rotate about the positioning portion 23 resulting in displacement. The displacement may occur when a clearance is created between the positioning protrusion 26 and the positioning hole 25.

As illustrated in FIGS. 1 and 2, the rotation restricting portion 24 includes an optical member recess 27 and a contact portion 28. The optical member recess 27 is a portion of the periphery of the optical member 16 recessed along the circumferential direction thereof. The contact portion 28 is in contact with the optical member recess 27. In the rotation restricting portion 24, the contact portion 28 is in contact with the optical member recess 27. According to the configuration, a rotation of the optical member 16 about the positioning portion 23 is less likely to occur and thus displacement of the optical member 16 is less likely to occur. The optical member 16 is positioned with high accuracy by the positioning portion 23 and the rotation restricting portion 24. A decrease in accuracy of the positioning due to the curved end surface 16C included in the periphery of the optical member 16 is less likely to occur. Next, detailed configurations of the positioning portion 23 and the rotation restricting portion 24 will be described.

As illustrated in FIG. 2, the positioning portion 23 and the rotation restricting portion 24 are arranged in areas of the optical member 16 divided by a normal line NL that passes the middle of the linear end surface 16L of the optical member 16 with respect to the extending direction of the linear end surface 16L, respectively. Specifically, the positioning portion 23 is arranged on the right to the normal line NL with respect to the X-axis direction in FIG. 2. The rotation restricting portion 24 is arranged on the left to the normal line NL with respect to the X-axis direction in FIG. 2, that is, on the opposite side to the positioning portion 23. With the positioning portion 23 and the rotation restricting portion 24 arranged as above, a larger distance from the center of the positioning portion 23 to the rotation restricting portion 24 is achieved in comparison to a configuration the positioning portion and the rotation restricting portion are on the same side relative to the normal line NL (on the right side or the left side). Therefore, the rotation is restricted by the rotation restricting portion 24 with higher accuracy and thus the decrease in accuracy in positioning of the optical member 16 is further less likely to occur. Furthermore, the rotation restricting portion 24 is arranged at the edge of the linear end surface 16L of the optical member 16. Specifically, the optical member 16 includes two corners defined by the edges of the linear end surface 16L and the edges of the curved end surface 16C. The rotation restricting portion 24 is arranged at the corner opposite from the positioning portion 23 relative to the normal line NL. With the rotation restricting portion 24 arranged as such, a larger distance from the center of the positioning portion 23 to the rotation restricting portion 24 is achieved in comparison to a configuration in which the rotation restricting portion is arranged closer to the normal line NL rather than the edge of the linear end surface 16L of the optical member 16. According to the configuration, the rotation is restricted by the rotation restricting portion 24 with further higher accuracy and thus the decrease in accuracy in the positioning of the optical member 16 is further less likely to occur. The positioning portion 23 and the rotation restricting portion 24 do not overlap the normal line NL.

As illustrated in FIG. 2, with respect to the X-axis direction, the positioning portion 23 is arranged at about the middle between the normal line NL and the edge of the linear end surface 16L (the right edge in FIG. 2). With respect to the Y-axis direction, the positioning portion 23 is arranged closer to an intersection of the normal line NL and the curved end surface 16C than an intersection of the normal line NL and the linear end surface 16L. The positioning hole 25 included in the positioning portion 23 has a round shape in a plan view and an annular inner wall without any break. As illustrated in FIGS. 3 and 4, the positioning hole 25 opens through the light guide plate 19, the optical sheets 20, and the reflecting sheet 21 of the optical member 16 in the thickness direction (the Z-axis direction). Specifically, the positioning hole 25 includes a light guide plate positioning hole 19H, optical sheet positioning holes 20H, and a reflecting sheet positioning hole 21H. The light guide plate positioning hole 19H is a through hole that opens through the light guide plate 19. The optical sheet positioning holes 20H are through holes that open through the respective optical sheets 20. The reflecting sheet positioning hole 21H is a through hole that opens through the reflecting sheet 21. The light guide plate positioning hole 19H, the optical sheet positioning holes 20H, and the reflecting sheet positioning hole 21H have diameters about equal to one another. The light guide plate positioning hole 19H, the optical sheet positioning holes 20H, and the reflecting sheet positioning hole 21H are concentrically arranged. The inner walls of the light guide plate positioning hole 19H, the optical sheet positioning holes 20H, and the reflecting sheet positioning hole 21H are flush with one another.

As illustrated in FIGS. 1 and 2, the positioning protrusion 26 included in the positioning portion 23 has the round tubular shape corresponding to the plan-view shape of the positioning hole 25. The outer periphery of the positioning protrusion 26 is parallel to the inner wall of the positioning hole 25. The positioning protrusion 26 has an outer diameter smaller than the diameter of the positioning hole 25 and thus the positioning protrusion 26 can be inserted in the positioning hole 25. When the positioning protrusion 26 is in the positioning hole 25, the outer periphery of the positioning protrusion 26 is in contact with the inner wall of the positioning hole 25. The positioning protrusion 26 has a communicating hole 29 at the center thereof. The communicating hole 29 is a through hole that opens through the positioning protrusion 26 in an axial direction of the positioning protrusion 26 (the Z-axis direction). The communicating hole 29 is communicated with the positioning hole 25. The communicating hole 29 is defined by an inner periphery of the positioning protrusion 26. The communicating hole 29 has a substantially round plan-view shape similar to the positioning hole 25. The bottom plate 15a of the chassis 15 includes a chassis through hole 15H that opens through the bottom plate 15a in the thickness direction of the bottom plate 15a. The chassis through hole 15H is communicated with the positioning hole 25. As illustrated in FIGS. 3 and 4, the positioning protrusion 26 is integrally formed with the bottom plate 15a to protrude from an opening edge of the chassis through hole 15H in the Z-axis direction toward the front side. The communicating hole 29 of the positioning protrusion 26 is communicated with the chassis through hole 15H that is a through hole in the bottom plate 15a. The height of the positioning protrusion 26 is about equal to a sum of the thicknesses of the light guide plate 19, three optical sheets 20, and the reflecting sheet 21 of the optical member 16. A distal end surface of the positioning protrusion 26 is substantially flush with the front plate surface of the second prism sheet 20c arranged at the foremost in the optical member 16.

Figure 5:
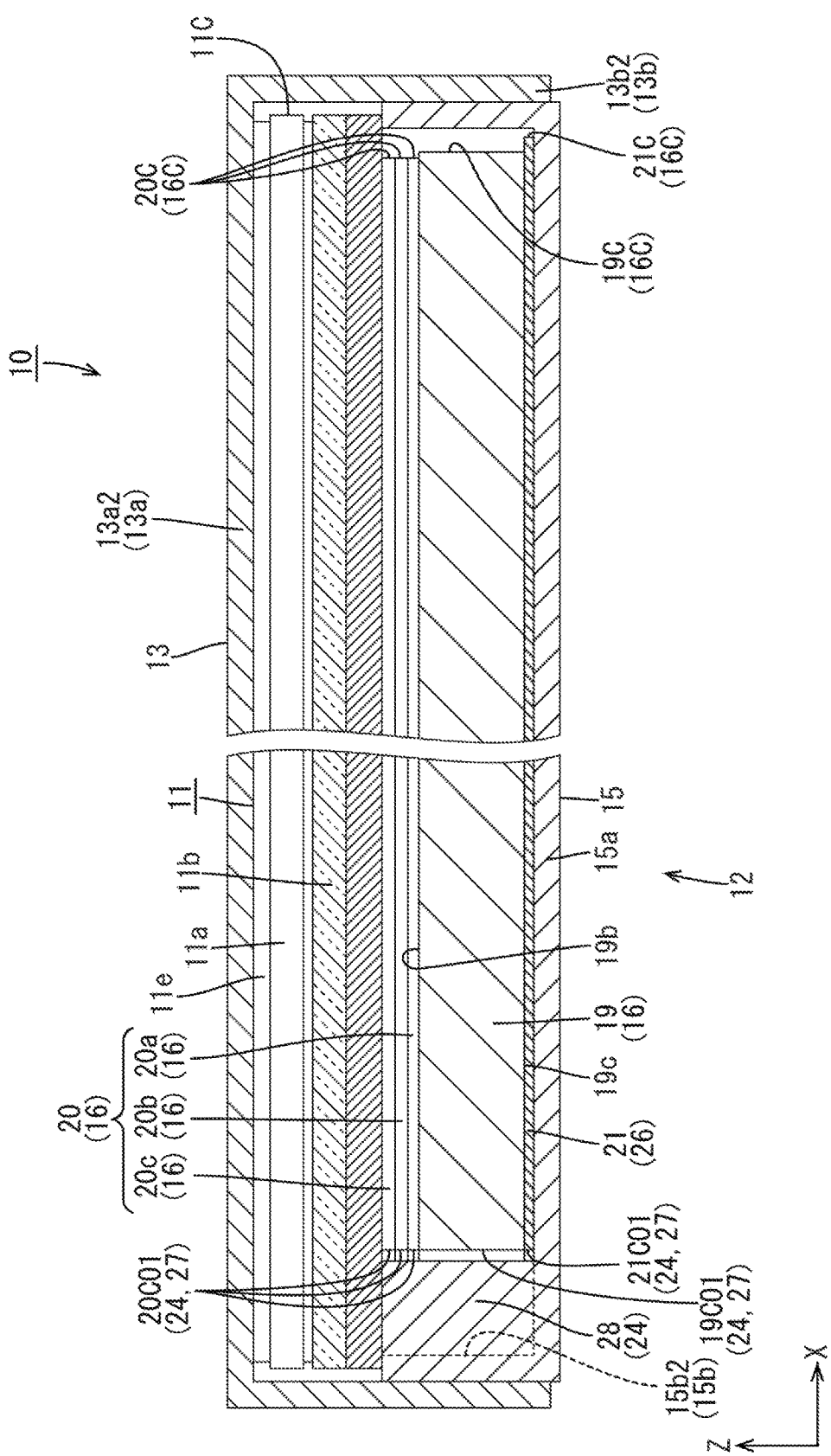
FIG. 5 is a cross-sectional view along line C-C in FIG. 2.

As illustrated in FIGS. 1 and 2, the optical member recess 27 included in the rotation restricting portion 24 is formed by cutting the left corner of the optical member 16 in FIG. 2 (the corner farther from the positioning protrusion 23) in a substantially rectangular shape. As illustrated in FIG. 2, the optical member recess 27 is defined by two sides that form an L shape in a plan view. The sides include a first side 27a parallel to the linear end surface 16L and a second side 27b parallel to the normal line NL. The optical member recess 27 opens through the optical member 16 in the thickness direction of the optical member 16 (the Z-axis direction) and opens in the X-axis direction and the Y-axis direction. As illustrated in FIGS. 1 and 5, the optical member recess 27 includes a light guide plate recess 19CO1, optical sheet recesses 20CO1, and a reflecting sheet recess 21CO1. The light guide plate recess 19CO1 is a portion by cutting a corner of the light guide plate 19. Each of the optical sheet recesses 20CO1 is formed by cutting a corner of the corresponding optical sheet 20. The reflecting sheet recess 21CO1 is formed by cutting a corner of the reflecting sheet 21. When inner walls of the positioning holes 19H, 20H, and 21H of the light guide plate 19, the optical sheets 20, and the reflecting sheet 21 are flush with one another, the first sides 27a of the light guide plate recess 19CO1, the optical sheet recesses 20CO1, and the reflecting sheet recess 21CO1 are aligned (see FIG. 2). Furthermore, the second sides 27b of the light guide plate recess 19CO1, the optical sheet recesses 20CO1, and the reflecting sheet recess 21CO1 are aligned. The light guide plate recess 19CO1 is a recessed portion of the light entering surface 19a of the light guide plate 19. The light guide plate recess 19CO1 is arranged closer to the edge of the light entering surface 19a (the light guide plate linear end surface 19L) of the light guide plate 19 with respect to the extending direction of the light entering surface 19a than the LED 17 arranged the closest to the edge among the LEDs 17 arranged along the extending direction. According to the configuration, the light entering surface 19a of the light guide plate 19 is positioned relative to the LEDs 17 with high accuracy. With the light guide plate recess 19CO1, light traveling from the LED 17 at the closest to the edge toward the light entering surface 19a is less likely to be blocked. This provides a proper level of light use efficiency.

As illustrated in FIGS. 1 and 2, the contact portion 28 included in the rotation restricting portion 24 has a rectangular column shape with a plan-view shape corresponding to the plan-view shape of the optical member recess 27. Outer surfaces of the contact portion 28 are parallel to the sides 27a and 27b of the optical member recess 27. When the positioning protrusion 26 is in the positioning holes 19H, 20H, and 21H of the light guide plate 19, the optical sheets 20, and the reflecting sheet 21, the outer surfaces of the contact portion 28 are in contact with the sides 27a and 27b of the light guide plate recess 19CO1, the optical sheet recesses 20CO1, and the reflecting sheet recess 21CO1. According to the configuration, the light guide plate 19, the optical sheets 20, and the reflecting sheet 21 are less likely to rotate about the positioning portion 23. The contact portion 28 is a protrusion that protrudes from an inner surface of the side plate 15b of the chassis 15. The contact portion 28 continues from a portion of the curved side plate 15b2 of the side plate 15b closer to the left end in FIG. 2. The contact portion 28 continues from not only the side plate 15b but also the bottom plate 15a. Namely, the contact portion 28 projects from the bottom plate 15a in the Z-axis direction. A height of the contact portion 28 is about equal to the sum of the thicknesses of the light guide plate 19, three optical sheets 20, and the reflecting sheet 21 of the optical member 16. Therefore, a distal end surface of the contact portion 28 is substantially flush with the front plate surface of the second prism sheet 20 at the foremost of the optical member 16. The distal end surface of the contact portion 28 is fixed to the back surface of the panel fixing tape 22.

As illustrated in FIGS. 3 and 4, the liquid crystal panel 11 includes a panel through hole 30 communicated with the positioning hole 25, the communicating hole 29, and the chassis through hole 15H described above. The panel through hole 30 is formed in a portion of the liquid crystal panel 11 overlapping the positioning hole 25, the communicating hole 29, and the chassis through hole 15H in a plan view. The panel through hole 30, the positioning hole 25, the communicating hole 29, and the chassis through hole 15H are located at the rear of the liquid crystal display device 10 and at a position overlapping an object O in a plan view. The object O may be a mechanical instrument installed in an instrument panel. According to the configuration, the object O is visible from the front side of the liquid crystal display device 10 through the panel through hole 30, the positioning hole 25, the communicating hole 29, and the chassis through hole 15H. In FIGS. 3 and 4, the object O is indicated with a two-dot chain line. The panel through hole 30, the positioning hole 25, the communicating hole 29, and the chassis through hole 15H opens through the liquid crystal display device 10 in the thickness direction. In comparison to a configuration in which at least one of the components of the liquid crystal display device 10 having light transmissivity (e.g., the substrates 11a and 11b, the polarizing plates 11e and 11f of the liquid crystal panel 11, the optical member 16 of the backlight unit 12) does not include a through hole, the object is more clearly and more properly recognizable. Furthermore, the object O can be directly inserted in the panel through hole 30, the positioning hole 25, the communicating hole 29, and the chassis through hole 15H.

As illustrated in FIGS. 3 and 4, the panel through hole 30 has a round shape in a plan view similar to the positioning hole 25 and an annular inner wall without any break. The panel through hole 30 opens through a pair of the substrates 11a and 11b and a pair of the polarizing plates 11e and 11f in the thickness direction. Specifically, the panel through hole 30 includes substrate through holes 11aH and 11bH and polarizing plate through holes 11eH and 11fH communicated with one another. The substrate through holes 11aH and 11bH open through the substrates 11a and 11b, respectively. The polarizing plate through holes 11eH and 11fH open through the polarizing plates 11e and 11f, respectively. A through hole-side sealing member 31 is sandwiched between opening edges of the substrate through holes 11aH and 11bH of the substrates 11a and 11b. The liquid crystal layer 11c is sealed with the through hole-side sealing member 31.

As illustrated in FIGS. 3 and 4, the backlight unit 12 includes a fixing tape (a fixing member) 32 for fixing the opening edge of the positioning hole 25 of the optical member 16 to the positioning protrusion 26. The fixing tape 32 includes a base made of synthetic resin and adhesives applied to surfaces of the base. A back surface of the fixing tape 32 is fixed to the opening edge of the positioning hole 25 of the optical member 16 and the positioning protrusion 26. A front surface of the fixing tape 32 is fixed to the opening edge of the panel through hole 30 of the liquid crystal panel 11. As illustrated in FIGS. 1 and 2, the fixing tape 32 has an annular ring shape (a doughnut shape) in a plan view. A width of the fixing tape 32 is larger than the thickness of the positioning protrusion 26. In FIG. 2, the fixing tape 32 is indicated with a two-dot chain line. Specifically, the fixing tape 32 has an inner diameter about equal to the diameter of the positioning hole 25 and the inner diameter of the positioning protrusion 26. Furthermore, the fixing tape 32 has an outer diameter larger than the outer diameter of the positioning protrusion 26. The fixing tape 32 is fixed to the entire area of the distal end surface of the positioning protrusion 26 and the opening edge of the optical sheet positioning hole (the positioning hole 25) of the second prism sheet 20c, which is located the foremost of the optical member 16. The base of the fixing tape 32 includes a black surface having light a blocking property. If light leaks from the inner periphery of the positioning hole 25 of the optical member 16, the leaking light is absorbed by the fixing tape 32. Therefore, the opening edge of the positioning hole 25 is less likely to be recognized as a bright spot and thus uneven brightness is less likely to occur although the positioning hole 25 is provided.

As illustrated in FIGS. 3 and 4, the liquid crystal display device 10 further includes a cap (a through hole-side holding member) 33 for holding the opening edge of the panel through hole 30 of the liquid crystal panel 11 between the backlight unit 12 and the cap 33. The cap 33 is made of metal like the bezel 13. The cap 33 includes a cap communicating hole (a holding member communicating hole) 34 at the center thereof to open through the cap 33 in the Z-axis direction. The cap communicating hole 34 is communicated with the panel through hole 30 and the positioning hole 25. The cap 33 includes a holding portion 33a and an inserting portion (a shaft) 33b. The holding portion 33a is in contact with the opening edge of the panel through hole 30 from the front side, that is, a side opposite from the backlight unit 12. The inserting portion 33b is inserted in the panel through hole 30 and the communicating hole 29 of the positioning protrusion 26. The holding portion 33a has an annular shape (a doughnut shape) in a plan view. The holding portion 33a has a width about equal to the width of the fixing tape 32. The inserting portion 33b has a substantially round tubular shape with an outer diameter smaller than the diameter of the panel through hole 30 and the diameter of the communicating hole 29 of the positioning protrusion 26. According to the configuration, the inserting portion 33b can be inserted in the panel through hole 30 and the communicating hole 29. The inserting portion 33b of the cap 33 includes an outer periphery that is in contact with the inner periphery of the positioning protrusion 26. The inserting portion 33b and the positioning protrusion 26 that are in contact with each other include holding structures, which are not illustrated. With the holding structures, the cap 33 and the chassis 15 including the positioning protrusion 26 are fitted together and held in that condition. The inserting portion 33b has a height about equal to the thickness of the liquid crystal display device 10. Because the cap 33 is made of metal and the surface thereof has the light blocking property, the opening edge of the panel through hole 30 of the liquid crystal panel 11 that is covered with the holding portion 33a is less likely to be directly viewed from the light exiting side. Therefore, display images in a portion of the liquid crystal panel 11 around the panel through hole 30 are less likely to have defects.

The liquid crystal display device 10 according to this embodiment has the configurations described above. Next, functions of the liquid crystal display device 10 will be described. Assembly of the liquid crystal display device 10 is performed after the liquid crystal panel 11 and the components of the backlight unit 12 are produced. The optical sheets 20 among the components of the backlight unit 12 are produced by stamping a base member with a die. The base member may be rolled up. By using a die including portions corresponding to the optical sheet positioning hole 20H and the optical sheet recesses 20CO1 for transcription, the optical sheet positioning hole 20H and the optical sheet recesses 20CO1 are easily formed with low cost in the production of the optical sheets 20. The reflecting sheet 21 is produced similarly to the optical sheets 20. The light guide plate 19 among the components of the backlight unit 12 is produced by injection molding. By using a mold with a surface including patterns of light guide plate positioning hole 19H and the light guide plate recess 19CO1 for transcription, the light guide plate positioning hole 19H and the light guide plate recess 19CO1 are formed in the production of the light guide plate 19.

In the assembly of the liquid crystal display device 10, the reflecting sheet 21, the light guide plate 19, and the optical sheets 20 of the optical member 16 are placed in a predefined sequence in the chassis 15 (FIG. 1). Specifically, when the reflecting sheet 21 is placed in the chassis 15, the positioning protrusion 26 is inserted in the reflecting sheet positioning hole 21H and the contact portion 28 is inserted in the reflecting sheet-side recess 21CO1 (FIGS. 3 to 5). With the outer periphery of the positioning protrusion 26 in contact with the inner wall of the reflecting sheet positioning hole 21H, the reflecting sheet 21 is positioned relative to the chassis 15 with respect to the X-axis direction and the Y-axis direction. With the outer surfaces of the contact portion 28 in contact with the sides 27a and 27b of the reflecting sheet recess 21CO1, the rotation of the reflecting sheet 21 about the reflecting sheet positioning hole 21H and the positioning protrusion 26 is restricted. Namely, the rotation of the reflecting sheet 21 is restricted. Although the reflecting sheet 21 includes the reflecting sheet curved end surface 21C, the reflecting sheet 21 is positioned with sufficiently high accuracy.

When the light guide plate 19 is placed in the chassis 15, the positioning protrusion 26 is inserted in the light guide plate positioning hole 19H and the contact portion 28 is inserted in the light guide plate recess 19CO1 (FIGS. 3 to 5). With the outer periphery of the positioning protrusion 26 in contact with the inner wall of the light guide plate positioning hole 19H, the light guide plate 19 is positioned relative to the chassis 15 with respect to the X-axis direction and the Y-axis direction. With the outer surfaces of the contact portion 28 in contact with the sides 27a and 27b of the light guide plate recess 19CO1, the rotation of the light guide plate 19 about the light guide plate positioning hole 19H and the positioning protrusion 26 is restricted. Namely, the rotation of the light guide plate 19 is restricted. Although the light guide plate 19 includes the light guide plate curved end surface 19C, the light guide plate 19 is positioned with sufficiently high accuracy.

When the optical sheets 20 are placed in the chassis 15, the positioning protrusion 26 is inserted in the optical sheet positioning holes 20H and the contact portion 28 is inserted in the optical sheet recesses 20CO1 (FIGS. 3 to 5). With the outer periphery of the positioning protrusion 26 in contact with the inner walls of the optical sheet positioning holes 20H, the optical sheets 20 are positioned relative to the chassis 15 with respect to the X-axis direction and the Y-axis direction. With the outer surfaces of the contact portion 28 in contact with the sides 27a and 27b of the optical sheet recesses 20CO1, the rotation of the optical sheets 20 about the optical sheet positioning holes 20H and the positioning protrusion 26 is restricted. Namely, the rotation of the optical sheets 20 is restricted. Although the optical sheets 20 include the optical sheet curved end surfaces 20C, the optical sheets 20 are positioned with sufficiently high accuracy.

Next, the fixing tape 32 will be attached. The fixing tape 32 is attached to the opening edge of the optical sheet positioning hole 20H of the second prism sheet 20c at the foremost of the optical member 16 and the distal end surface of the positioning protrusion 26. With the fixing tape 32, the opening edge of the second prism sheet 20c is fixed to the positioning protrusion 26 (FIGS. 3 to 5). The fixing tape 32 may be attached to the liquid crystal panel 11 in advance similar to the panel fixing tape 22, which will be described next.

Next, the front surface of the panel fixing tape 22 is attached to the back surface of the peripheral portion of the liquid crystal panel 11. Furthermore, the LED board 18 is attached to a short-side portion (a wider short-side portion) of the panel fixing tape 22. The liquid crystal panel 11 in the above condition is placed over the chassis 15 from the front side. The back surface of the panel fixing tape 22 is attached to the peripheral portion of the second prism sheet 20c at the foremost of the optical member 16. The LED board 18 and the LEDs 17 are placed inside the chassis 15. The liquid crystal panel 11 is fixed to the backlight unit 12. Then, the bezel 13 and the cap 33 are attached to the chassis 15. When the bezel 13 is attached, the peripheral portion of the liquid crystal panel 11 is pressed by the panel holding portion 13a from the front side. The outer covering portion 13b is attached to the side plate 15b of the chassis 15 with the holding structure, which is not illustrated, and held in this condition. When the cap 33 is attached, the opening edge of the panel through hole 30 of the liquid crystal panel 11 is pressed by the holding portion 33a from the front side. The inserting portion 33b in the panel through hole 30 and the communicating hole 29 of the positioning protrusion 26 is attached to the positioning protrusion 26 with the holding structure, which is not illustrated, and held in this condition. The liquid crystal display device 10 assembled as above is installed in a dashboard of a vehicle for use. As illustrated in FIGS. 3 and 3, when the liquid crystal display device 10 is installed in the dashboard, the positioning hole 25, the chassis through hole 15H, the communicating hole 29, the panel through hole 30, and the cap communicating hole 34 overlap the object O, which may be a mechanical instrument, when the liquid crystal display device 10 is viewed from the front side. Therefore, the object O is clearly and properly viewed through the positioning hole 25, the chassis through hole 15H, the communicating hole 29, the panel through hole 30, and the cap communicating hole 34.

When the liquid crystal display device 10 assembled as above is turned on, driving of the liquid crystal panel 11 is controlled by a panel control circuit, which is not illustrated, and driving of the LEDs 17 on the LED board 18 is controlled by an LED drive circuit. As illustrated in FIG. 3, the light from the LEDs 17 that are turned on enters the light guide plate 19 through the light entering surface 19a and exits through the light exiting surface 19b after transmitted through the light guide plate 19. The light may be reflected by the reflecting sheet 21 while traveling through the light guide plate 19. Predefined optical effects are added to the light exiting from the light guide plate 19 by the optical sheets 20 and uniformed planar light is obtained. The liquid crystal panel 11 is illuminated with the planar light and predefined images are displayed in the display area of the liquid crystal panel 11.

Light entering efficiency of light emitted by the LEDs 17 and entering the light guide plate 19 through the light entering surface 19a (the light guide plate linear end surface 19L) depends on a distance between the light entering surface 19a and the corresponding LED 17. The light guide plate 19 is positioned by the positioning portion 23 and the rotation restricting portion 24 with high accuracy. Therefore, the positional relationship between the light entering surface 19a and the LED 17 is defined with high accuracy. According to the configuration, the light entering efficiency of light emitted by the LEDs 17 and entering the light guide plate 19 through the light entering surface 19a is high and stable. Therefore, the exiting light through the light exiting surface 19b has high intensity and uneven brightness is less likely to occur in the exiting light. Specifically, in this embodiment having the configuration in which the light guide plate 19 includes the light guide plate curved end surface 19C, design of the light reflecting pattern to achieve even intensity for the exiting light through the light exiting surface 19b is complicated. If the distance (or the positional relationship) between the light entering surface 19a and the corresponding LED 17 varies from the designed value, evenness in intensity for the exiting light through the light exiting surface 19b may decrease. Namely, a tolerance is significantly small. As described above, the light guide plate 19 is positioned with high accuracy. Therefore, a value related to the distance between the light entering surface 19a and the corresponding LED 17 can be easily included in the tolerance. Therefore, the evenness in intensity for the exiting light through the light exiting surface 19b is less likely to decrease.

As described above, the optical sheets 20 are positioned by the positioning portion 23 and the rotation restricting portion 24 with high accuracy. Therefore, the light exiting from the light guide plate 19 through the light exiting surface 19b efficiently enters the optical sheets 20 and the light efficiently enters in sequence from the rear optical sheet 20 to the front optical sheet 20. According to the configuration, high light use efficiency is achieved and thus the intensity of the exiting light that illuminates the liquid crystal panel 11 is high. With the optical member 16 positioned by the positioning portion 23 and the rotation restricting portion 24 with high accuracy, a decrease in optical performance due to displacement is less likely to occur and original optical performance can be properly exerted.

The optical member 16 includes the positioning hole 25. Therefore, light may leak from the inner wall or the opening edge of the positioning hole 25. However, the fixing tape 32 having the light blocking property is attached to the opening edge of the optical sheet positioning hole 20H of the second prism sheet 20c arranged at the foremost. Therefore, the leak light can be absorbed by the fixing tape 32. According to the configuration, the portion around the positioning hole 25 is less likely to be recognized as a bright spot, that is, the uneven brightness is less likely to occur. Similarly, the liquid crystal panel 11 includes the panel through hole 30. Therefore, light may leak from the inner wall or the opening edge of the panel through hole 30. However, the opening edge of the panel through hole 30 is covered with the holding portion 33a of the cap 33 having the light blocking property from the front side. According to the configuration, the leak light can be blocked. Therefore, the portion around the panel through hole 30 is less likely to be recognized as a bright spot, that is, the uneven brightness is less likely to occur.

When the liquid crystal display device 10 is turned on and the LEDs 17 are turned on, heat may be produced and a temperature environment of the backlight unit 12 especially increases. When the liquid crystal display device 10 is turned off and the LEDs 17 are turned off, the temperature environment of the backlight unit 12 which has been increased decreases with time. When the temperature environment of the backlight unit 12 varies, the optical member 16 that is a resin component having a larger thermal expansion rate among the components of the backlight unit 12 expands or contracts according to thermal expansion of thermal contraction. Even if the optical member 16 contracts, displacement of the optical member 16 around the positioning hole 25 due to the contraction is restricted because the positioning protrusion 26 is in contact with the inner wall of the positioning hole 25. According to the configuration, warp or wrinkle is less likely to occur in the portion of the optical member 16 around the positioning hole 25 and friction is less likely to occur. If the warp or the wrinkle occurs in the optical member 16, the in-plane distribution of exiting light may be biased. By reducing the warp and the wrinkle, the uneven brightness is less likely to occur in the exiting light from the backlight unit 12. Furthermore, the optical member 16 is less likely to have the friction and thus the optical member 16 is less likely to be scratched. Therefore, uneven brightness due to scourings is less likely to occur. According to the configuration, high display quality is achieved for images displayed on the liquid crystal panel 11.

As described above, the backlight unit (the lighting device) 12 according to this embodiment includes the LEDs (the light source) 17, the optical member 16, the positioning portion 23, and the rotation restricting portion 24. The optical member 16 having the sheet shape is for adding the optical effects to the light from the LEDs 17. The optical member 16 includes the curved end surface 16C having the curved shape in a plan view at the periphery. The positioning portion 23 is for positioning the optical member 16 with respect to the direction along the plate surface of the optical member 16. The positioning portion 23 includes the positioning hole 25 that opens through the optical member 16 in the thickness direction of the optical member 16 and the positioning protrusion 26 that is inserted in the positioning hole 25 and in contact with the inner wall of the positioning hole 25. The rotation restricting portion 24 is for restricting the rotation of the optical member 16 about the positioning portion 23. The rotation restricting portion 24 includes the optical member recess 27 and the contact portion 28. The optical member recess 27 is formed by recessing a portion of the periphery of the optical member 16 in the circumferential direction. The contact portion is in contact with the optical member recess 27.

According to the configuration, the light emitted by the LEDs 17 with the optical effects added by the optical member 16 having the sheet shape exits to the outside. The optical member 16 is positioned relative to the direction along the plate surface of the optical member 16 with the positioning protrusion 26 inserted in the positioning hole 25 included in the positioning portion 23.

If the positioning hole 25 has a round shape or a clearance is produced between the positioning hole 25 and the positioning protrusion 26, the optical member may rotate about the positioning portion 23 resulting in displacement. However, the rotation of the optical member 16 about the positioning portion 23 is restricted with the contact portion 28 of the rotation restricting portion 24 is in contact with the optical member recess 27. Therefore, the displacement is less likely to occur.

The optical member 16 includes the curved end surface 16C at the periphery. It is difficult to use the curved end surface 16C as a reference for positioning of the optical member 16. Therefore, the accuracy of the positioning tends to be low. However, as described above, the optical member 16 is positioned using the positioning portion 23 and the rotation of the optical member 16 is restricted by the rotation restricting portion 24. Although the optical member 16 has the configuration that includes the curved end surface 16C at the periphery, a decrease in accuracy of the positioning is restricted.

The periphery of the optical member 16 includes the linear end surface 16L that has the linear shape in a plan view in addition to the curved end surface 16C. The positioning portion 23 and the rotation restricting portion 24 are arranged in the areas of the optical member 16 divided by the normal line NL that passes the middle of the linear end surface 16L with respect to the extending direction, respectively. In comparison to the configuration in which the positioning portion and the rotation restricting portion are both arranged in one of the areas of the optical member 16 divided by the normal line NL, the larger distance between the center of the positioning portion 23 and the rotation restricting portion 24 is achieved. According to the configuration, the rotation is by the rotation restricting portion can be performed with further high accuracy. Therefore, the decrease in accuracy of the positioning of the optical member 16 is further properly restricted.

The rotation restricting portion 24 is arranged at the end of the linear end surface 16L of the optical member 16. In comparison to the configuration in which the rotation restricting portion is arranged closer to the normal line NL than to the end of the linear end surface 16L of the optical member 16, the distance between the center of the positioning portion 23 and the rotation restricting portion 24 is larger. According to the configuration, the rotation is restricted by the rotation restricting portion 24 with further higher accuracy and thus the decrease in accuracy of the positioning of the optical member 16 is further properly restricted.

The positioning protrusion 26 includes the communicating hole 29 that is communicated with the positioning hole 25. Because the positioning protrusion 26 included in the positioning portion 23 includes the communicating hole 29 that is communicated with the positioning hole 25, the object O disposed on the side opposite from the light emitting side relative to the backlight unit 12 can be properly viewed through the positioning hole 25 that opens through the optical member 16 in the thickness direction of the optical member 16 and the communicating hole 29 that is communicated with the positioning hole 25.

The optical member 16 includes at least the light guide plate 19. The light guide plate 19 includes the light entering surface 19a and the light exiting surface 19b. The light entering surface 19a is included in the periphery of the optical member 16. The light from the LEDs 17 enters the light guide plate 19 through the light entering surface 19a. The light entering surface 19a has a linear shape in a plan view. The light exiting surface 19b is included in one of the plate surfaces of the light guide plate 19. The light exits from the light guide plate 19 through the light exiting surface 19b. The light guide plate includes the light guide plate positioning hole 19H (the positioning hole 25) and the light guide plate recess 19CO1 (the optical member recess 27). The positioning protrusion 26 is inserted in the light guide plate positioning hole 19H of the light guide plate 19 and the contact portion 28 is in contact with the light guide plate recess 19CO1 of the light guide plate 19. According to the configuration, the light guide plate 19 is positioned and the rotation of the light guide plate 19 is restricted. Therefore, the decrease in accuracy of positioning of the light guide plate 19 is restricted and thus the light entering efficiency of light entering the light guide plate 19 through the light entering surface 19a is stable and the uneven brightness is less likely to occur in the light exiting through the light exiting surface 19b.

The light guide plate 19 includes the light guide plate recess 19CO1 (the optical member recess 27) which is the recessed portion of the light entering surface 19a. Because the light guide plate recess 19CO1 (the optical member recess 27) which is the recessed portion of the light entering surface 19a is provided, the light entering surface 19a is positioned relative to the LEDs 17 with further higher accuracy. Therefore, the light entering efficiency of the light emitted by the LEDs 17 and entering efficiency of light entering the light guide plate 19 through the light entering surface 19a is stable.

The LEDs 17 are arranged at intervals along the extending direction of the light entering surface 19a. The light guide plate 19 includes the light guide plate recess 19CO1 (the optical member recess 27) formed by recessing the portion of the light entering surface 19a closer to the end with respect to the extending direction than the LED 17 located the closest to the end. With the light guide plate recess 19CO1, entrance of the light emitted by the LED the closest to the end among the LEDs 17 arranged at intervals along the extending direction of the light entering surface 19a to the light guide plate 19 through the light entering surface 19a is less likely to be restricted. Therefore, proper light use efficiency can be achieved. At the end of the light entering surface 19a of the light guide plate 19 with respect to the extending direction, the amount of light emitted by the LED 17 and entering through the light entering surface 19a tends to be small. With the proper efficiency in using the light emitted by the LED 17 the closest to the end and entering through the light entering surface 19a, a dark spot is less likely to be produced at the end with respect to the extending direction of the light entering surface 19a. Therefore, the uneven brightness is less likely to occur.

The optical member 16 includes at least the light guide plate 19 and the optical sheets 20. The light guide plate 19 includes the light entering surface 19a and the light exiting surface 19b. The light entering surface 19a is included in the periphery of the light guide plate 19. The light from the LEDs 17 enters the light guide plate 19 through the light entering surface 19*a*. The light exiting surface 19*b* is included in one of the plate surfaces of the light guide plate 19. The light exits from the light guide plate 19 through the light exiting surface 19*b*. The optical sheets 20 are placed over the light exiting surface 19*b* of the light guide plate 19. The light guide plate 19 includes the light guide plate positioning hole 19H and the light guide plate recess 19CO1. The optical sheets 20 includes the optical sheet positioning holes 20H (the positioning hole 25) and the optical sheet recesses 20CO1 (the optical member recess 27). The positioning protrusion 26 is inserted in the light guide plate positioning hole 19H of the light guide plate 19 and the optical sheet positioning holes 20H of the optical sheets 20. The contact portion 28 is in contact with the light guide plate recess 19CO1 of the light guide plate 19 and the optical sheet recesses 20CO1 of the optical sheets 20. According to the configuration, the light guide plate 19 and the optical sheets 20 are positioned and the rotations thereof are restricted. Because the decreases in accuracy of the positioning of the light guide plate 19 and the optical sheets 20 are less likely to occur, the efficiency in using the light emitted by the LEDs 17 and entering the light guide plate 19 through the light entering surface 19*a* is stable. Furthermore, the uneven brightness is less likely to occur in the light exiting through the light exiting surface 19*b*. The light efficiently enters the optical sheets 20. High light use efficiency is achieved.

The fixing tape (the fixing member) 32 is provided. The fixing tape 32 is for fixing the opening edge of the positioning hole 25 of the optical member 16 to the positioning protrusion 26. With the opening edge of the positioning hole 25 of the optical member 16 fixed to the positioning protrusion 26 with the fixing tape 32, even if the optical member 16 expands or contracts due to thermal expansion or thermal contraction, the warp or the wrinkle is less likely to occur in the portion of the optical member 16 around the positioning hole 25. According to the configuration, the uneven brightness is less likely to occur in the exiting light in the portion of the optical member 16 around the positioning hole 25.

The chassis (the holding member) 15 is provided. The chassis 15 holds the optical member 16 from the side opposite from the light exiting side. The chassis 15 includes the positioning protrusion 26 and the contact portion 28. The positioning protrusion 26 of the chassis 15 is inserted in the positioning hole 25 of the optical member 16 and the contact portion 28 of the chassis 15 is in contact with the optical member recess 27 of the optical member 16. According to the configuration, the optical member 16 is positioned relative to the chassis 15 and the rotation of the optical member 16 is restricted.

The liquid crystal display device (the display device) 10 according to this embodiment includes the backlight unit 12 and the liquid crystal panel (the display panel) 11. The liquid crystal panel 11 is disposed on the light exiting side relative to the backlight unit 12. The liquid crystal panel 11 is for displaying images using light from the backlight unit 12. According to the liquid crystal display device 10 having such a configuration, the decrease in accuracy of positioning of the optical member 16 included in the backlight unit 12 is restricted and thus the optical performance of the optical member 16 is properly exerted. Therefore, the images are displayed with high display quality.

The positioning protrusion 26 includes the communicating hole 29 that is communicated with the positioning hole 25. The liquid crystal panel 11 includes the panel through hole 30 that opens through the liquid crystal panel 11 in the thickness direction and is communicated with the positioning hole 25 and the communicating hole 29. Because the panel through hole 30 that opens through the liquid crystal panel 11 in the thickness direction is communicated with the positioning hole 25 of the optical member 16 of the backlight unit 12 and the communicating hole 29 of the positioning protrusion 26, the object O disposed on the side opposite from the liquid crystal panel 11 side relative to the backlight unit 12 can be viewed through from the light exiting side of the liquid crystal panel 11 through the panel through hole 30, the positioning hole 25, and the communicating hole 29.

The liquid crystal panel 11 includes at least a pair of the substrates 11*a* and 11*b* with the panel through hole 30, the liquid crystal layer 11*c*, the outer sealing member 11*d*, and the through hole-side sealing member 31. The liquid crystal layer 11*c* is sandwiched between the substrates 11*a* and 11*b*. The outer sealing member 11*d* is for sealing the liquid crystal layer 11*c*. The through hole-side sealing member 31 surrounds the panel through hole 30. The through hole-side sealing member 31 is disposed between the opening edges of the panel through hole 30 to seal the liquid crystal layer 11*c*. According to the configuration, the liquid crystal layer 11*c* sandwiched between the substrates 11*a* and 11*b* of the liquid crystal panel 11 is sealed with the outer sealing member 11*d* disposed between the peripheral portions of the substrates 11*a* and 11*b*. Although the panel through hole 30 is formed in the substrates 11*a* and 11*b*, the liquid crystal layer 11*c* is sealed with the through hole-side sealing member 31 disposed between the opening edges of the panel through hole 30 in the substrates 11*a* and 11*b*.

Furthermore, the bezel (the outer holding member) 13 and the cap (the through hole-side holding member) 33 are provided. The peripheral portion of the liquid crystal panel 11 is sandwiched between the backlight unit 12 and the bezel 13 and held therebetween. The opening edge of the panel through hole 30 in the liquid crystal panel 11 is sandwiched between the backlight unit 12 and the cap 33 and held therebetween. At least the surface of the cap 33 has the light blocking property. Because the peripheral portion of the liquid crystal panel 11 is sandwiched between the backlight unit 12 and the bezel 13 and the opening edge of the panel through hole 30 is sandwiched between the backlight unit 12 and the cap 33, the liquid crystal panel 11 is held. Furthermore, because at least the surface of the cap 33 has the light blocking property, the opening edge of the panel through hole 30 in the liquid crystal panel 11 is less likely to be viewed from the light exiting side. Therefore, defects are less likely to be produced in displayed images in the portion of the liquid crystal panel 11 around the panel through hole 30.

<Second Embodiment>

A second embodiment will be described with reference to FIG. 6. The second embodiment includes a positioning portion 123 that is at a different position from the first embodiment. Configurations, functions, and effects similar to those of the first embodiment will not be described.

Figure 6:
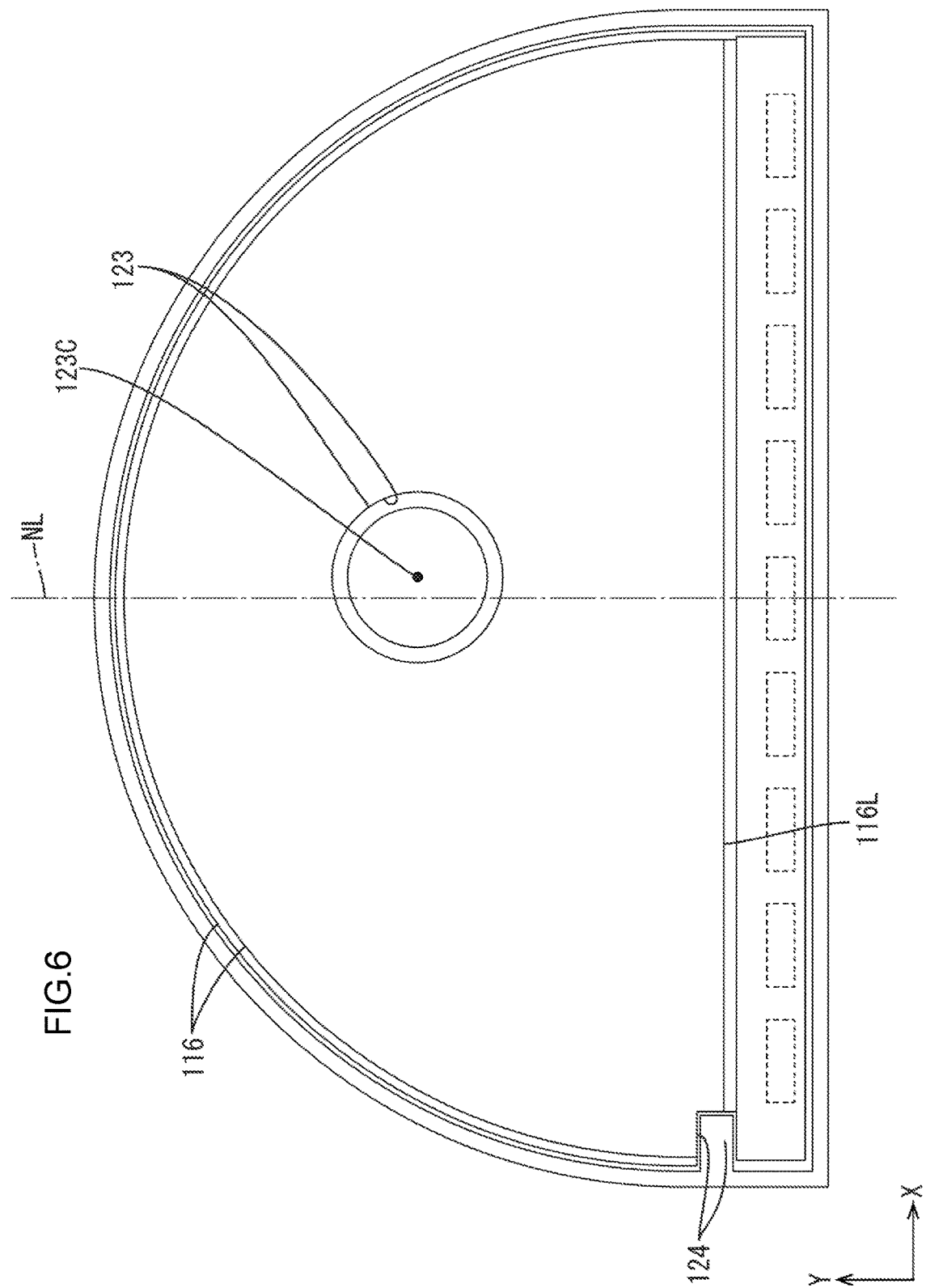
FIG. 6 is a plan view of a backlight unit according to a second embodiment of the present invention.

As illustrated in FIG. 6, the positioning portion 123 according to this embodiment is at a position overlapping a normal line NL in a plan view. The normal line NL passes the middle of a linear end surface 116L of the optical member 116 with respect to an extending direction in which the linear end surface 116L extends. Namely, the positioning portion 123 is arranged such that the normal line NL crosses the positioning portion 123. Specifically, the positioning portion 123 is arranged such that a center 123C thereof is on the right side relative to the normal line NL in FIG. 6, that is, on a side opposite from a rotation restricting portion 124. Similar to the first embodiment, the positioning portion 123 and the rotation restricting portion 124 are arranged in areas of the optical member 116 divided by the normal line NL, respectively. An optical member 116 is positioned by the positioning portion 123 and the rotation restricting portion 124 with sufficiently high accuracy. The arrangements of the chassis through hole, the panel through hole, and the cap (none of them are illustrated) are also altered along the alteration in arrangement of the positioning portion 123.

<Third Embodiment>

A third embodiment will be described with reference to FIG. 7. The third embodiment includes positioning portions 223, the number of which is different from that of the first embodiment. Configurations, functions, and effects similar to those of the second embodiment will not be described.

Figure 7:
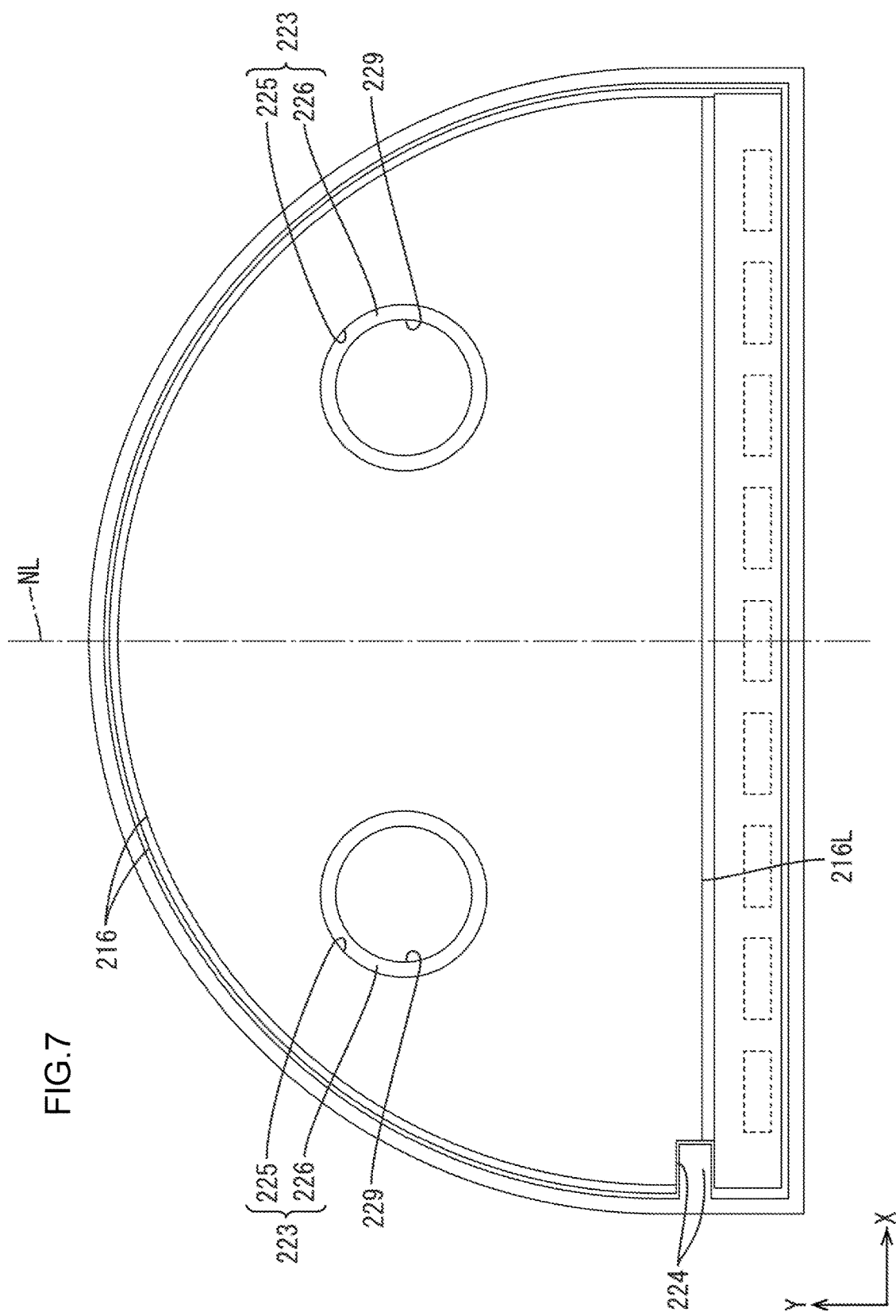
FIG. 7 is a plan view of a backlight unit according to a third embodiment of the present invention.

As illustrated in FIG. 7, the positioning portions 223 according this embodiment are arranged in areas of an optical member 216 divided by a normal line that crosses the middle of a linear end surface 216L of the optical member 216 with respect to an extending direction in which the linear end surface 216L extends, respectively. A total of two positioning portions 223 are provided. One of the positioning portions 223 is arranged on the left side relative to the normal line NL in FIG. 7, that is, on a rotation restricting portion 224 side. The other positioning portion 223 is arranged on the right side relative to the normal line NL in FIG. 7, that is, on a side opposite from the rotation restricting portion 224 side. The positioning portions 223 are symmetric with respect to the normal line NL. According to the configuration, the optical member 216 is positioned by two positioning portions 223 and a single rotation restricting portion 224 with high accuracy. Furthermore, if two objects such as mechanical instruments (not illustrated) are installed in an instrument panel of a vehicle, the objects can be viewed through positioning holes 225 and communicating holes 229 of positioning protrusions 226. Because the number of the positioning portions 223 is different from the first embodiment, different numbers of chassis through holes, panel through holes, and caps (all not illustrated) are provided.

<Fourth Embodiment>

A fourth embodiment will be described with reference to FIGS. 8 and 9. The fourth embodiment includes a rotation restricting portion 324 having a protrusion-recess relationship opposite from the first embodiment. Configurations, functions, and effects similar to those of the first embodiment or the second embodiment will not be described.

Figure 8:
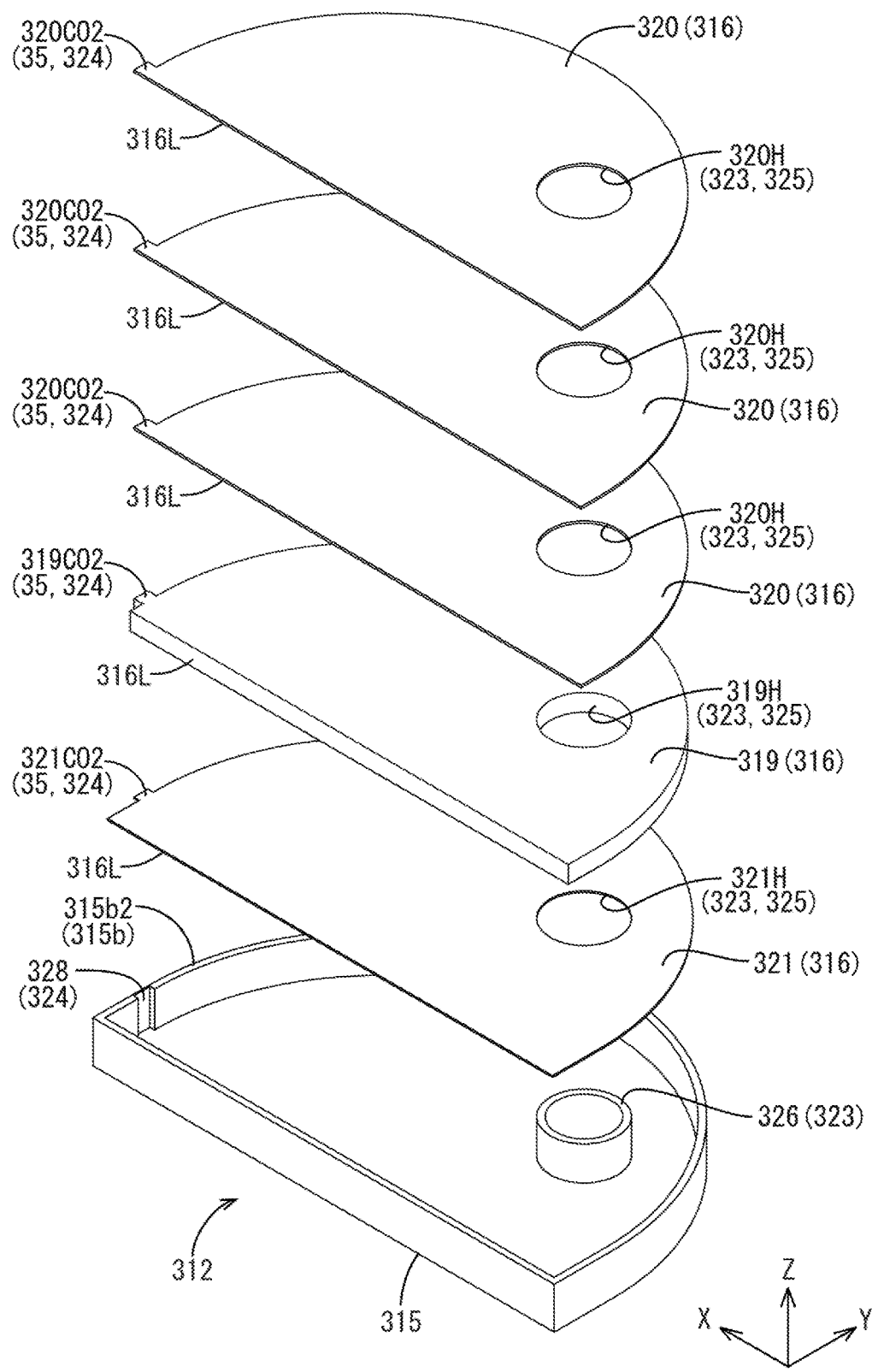
FIG. 8 is an exploded perspective view of a backlight unit according to a fourth embodiment of the present invention.
Figure 9:
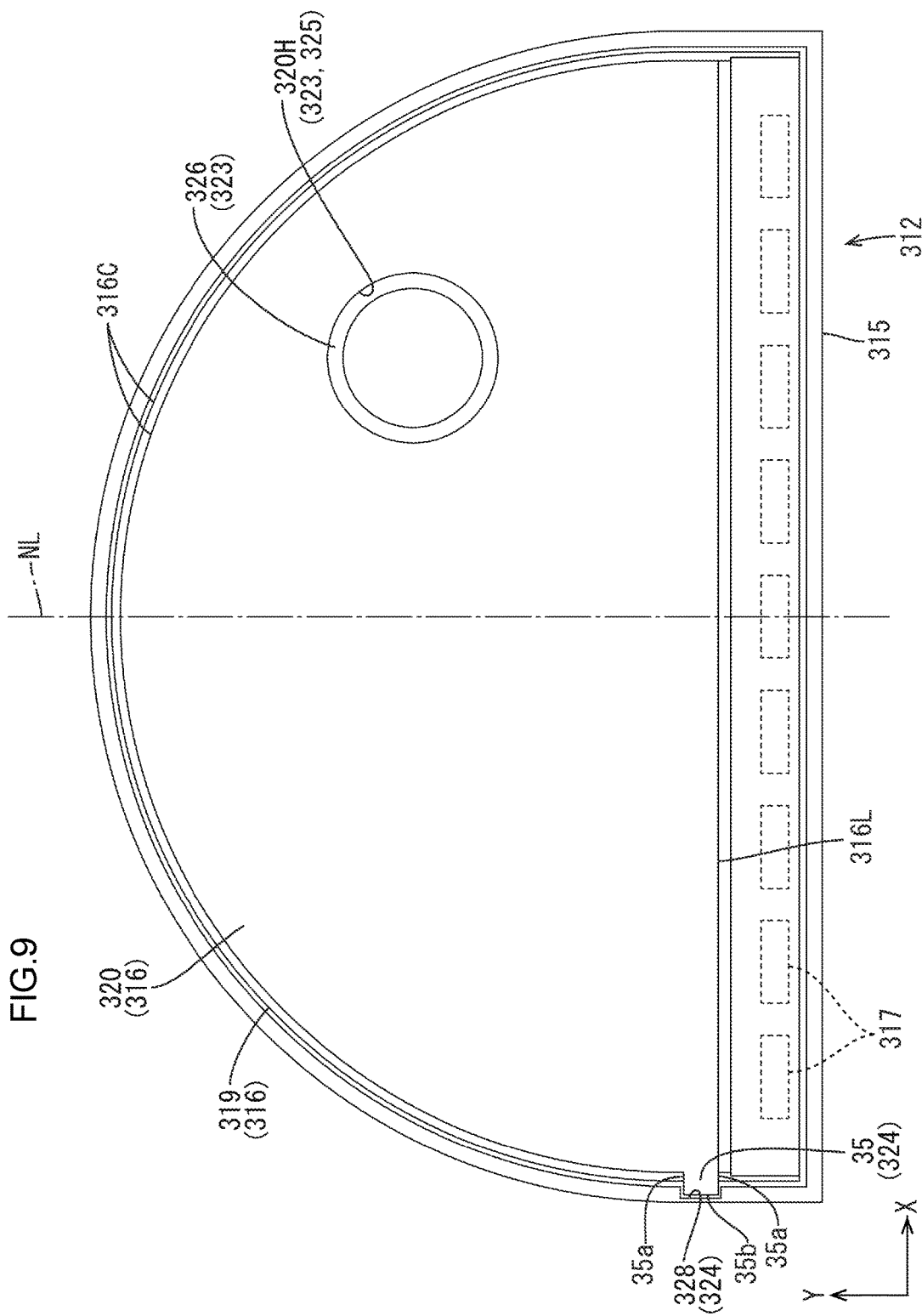
FIG. 9 is a plan view of the backlight unit.

As illustrated in FIGS. 8 and 9, the rotation restricting portion 324 includes an optical member projection 35 and a contact portion 328. The rotation restricting portion 324 is a portion of an optical member 316 protrudes from the periphery of the optical member 316 along a circumferential direction. The contact portion 328 is in contact with the optical member projection 35. The optical member projection 35 protrudes outward from a curved end surface 316C at a left corner of two corners of the optical member 316 in FIG. 9. The optical member projection 35 has a rectangular shape in a plan view. The optical member projection 35 includes a pair of first sides 35a and a second side 35b. The first sides 35a are parallel to a linear end surface 316L. The second side 35b is parallel to a normal line NL. The optical member projection 35 includes a light guide plate projection 319CO2, optical sheet projections 320CO2, and a reflecting sheet projection 321CO2. The light guide plate projection 319CO2 protrudes from a corner of a light guide plate 319. The optical sheet projections 320CO2 protrude from corners of optical sheets 320, respectively. The reflecting sheet projection 321CO2 protrudes from a corner of a reflecting sheet 321. When inner walls of positioning holes 319H, 320H, and 321H of the light guide plate 319, the optical sheets 320, and the reflecting sheet 321 are aligned, the light guide plate projection 319CO2, first sides 35a and second sides 35b of the optical sheet projections 320CO2, and the reflecting sheet projection 321CO2 are substantially on the same plane.

The contact portion 328 is formed in a recess shape by recessing a portion of an inner wall of a side plate 315b (a curved side plate 315b2) of a chassis 315 along the circumferential direction. The contact portion 328 is located close to the left end of the curved side plate 315b2 in FIG. 9. The contact portion 328 has a rectangular shape in a plan view. The contact portion 328 includes three inner surfaces parallel to the first sides 35a and the second side 35b of the optical member projection 35. When a positioning protrusion 326 is inserted in the positioning holes 319H, 320H, and 321H of the light guide plate 319, the optical sheets 320, and the reflecting sheet 321, the inner surfaces of a contact portion 329 are in contact with the sides 35a and 35b of the light guide plate projection 319CO2, the optical sheet projections 320CO2, and the reflecting sheet projection 321CO2. According to the configuration, rotations of the light guide plate 319, the optical sheets 320, and the reflecting sheet 321 about a positioning portion 323 are restricted. Especially in this embodiment, the first sides 35a are included in the outer surfaces of the optical member projection 35 and in contact with the contact portion 328. According to the configuration, rotations of the optical member 316 in a clockwise direction and in a counterclockwise direction about the positioning portion 323 are restricted.

A backlight unit (a lighting device) 312 according to this embodiment includes LEDs 317, the optical member 316, the positioning portion 323, and the rotation restricting portion 324. The optical member 316 has a sheet shape. The optical member 316 is for adding optical effects to light from the LEDs 317. The optical member 316 includes the periphery that includes at least a curved end surface 316C having a curved shape in a plan view. The positioning portion 323 is for positioning the optical member 316 relative to a direction along the plate surface of the optical member 316. The positioning portion 323 includes a positioning hole 325 and the positioning protrusion 326. The positioning hole 325 opens through the optical member 316 in the thickness direction of the optical member 316. The positioning protrusion 326 is inserted in the positioning hole 325 and in contact with the inner wall of the positioning hole 325. The rotation restricting portion 324 is for restricting the rotation of the optical member 316 about the positioning portion 323. The rotation restricting portion 324 includes the optical member projection 35 and the contact portion 328. The optical member projection 35 is a portion of the optical member 316 along the circumferential direction projecting from the periphery of the optical member 316. The contact portion 328 is in contact with the optical member projection 35.

According to the configuration, light emitted by the LEDs 317 exits to the outside after the optical effects are added thereto by the optical member 316 having the sheet shape. The optical member 316 is positioned relative to the direction along the plate surface thereof when the positioning protrusion 326 is inserted in the positioning hole 325 of the positioning portion 323.

If the positioning hole 325 has a round shape or a clearance is created between the positioning hole 325 and the positioning protrusion 326, the optical member 316 may rotate about the positioning portion 323 and displacement may occur. With the contact portion 328 of the rotation restricting portion 324 in contact with the optical member projection 35, the rotation of the optical member 316 about the positioning portion 323 is restricted. Therefore, the displacement is less likely to occur.

The periphery of the optical member 316 includes the curved end surface 316C. It is difficult to use the curved end surface 316C as a reference for the positioning. Therefore, the accuracy in positioning tends to be low. As described above, the optical member 316 is positioned using the positioning portion 323 and the rotation of the optical member 316 is restricted by the rotation restricting portion 324. Therefore, even though the periphery of the optical member 316 includes the curved end surface 316C, a decrease in accuracy of the positioning is less likely to occur.

<Fifth Embodiment>

A fifth embodiment will be described with reference to FIG. 10. The fifth embodiment is a combination of the third and the fourth embodiments. Configurations, functions, and effects similar to those of the third and the fourth embodiments will not be described.

Figure 10:
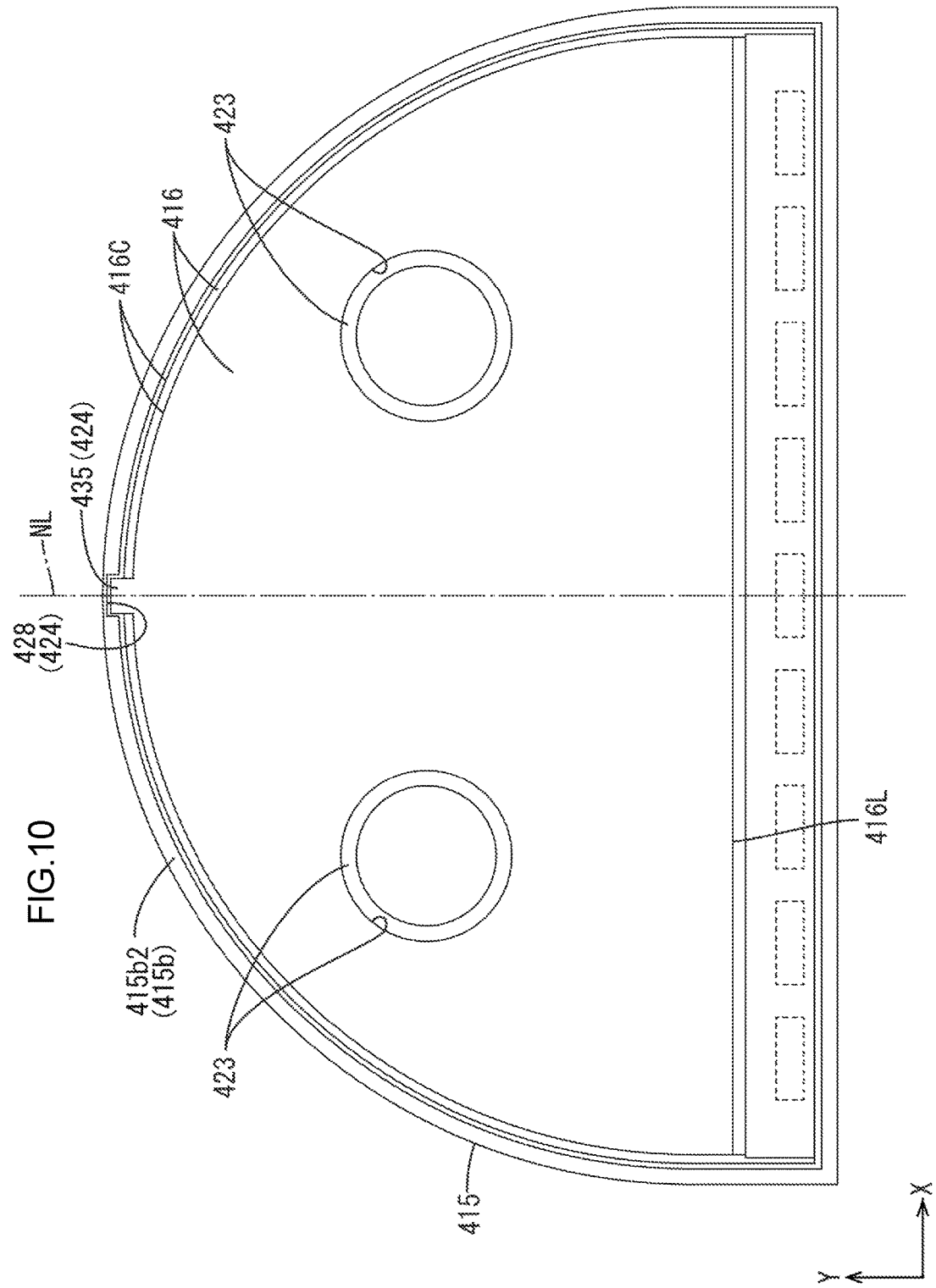
FIG. 10 is a plan view of a backlight unit according to a fifth embodiment of the present invention.

As illustrated in FIG. 10, this embodiment includes two positioning portions 423. The positioning portions 423 are arranged in areas of an optical member 416 divided by a normal line NL that crosses the middle a linear end surface 416L of the optical member 416 with respect to an extending direction in which the linear end surface 416L of the optical member 416, respectively. Optical member projections 435 included in a rotation restricting portion 424 protrude outward from a curved end surface 416C of the optical member 416 at the middle of the curved end surface 416C with respect to the circumferential direction. The optical member projections 435 overlap the normal line NL in a plan view. A contact portion 428 included in the rotation restricting portion 424 is formed by recessing a central portion of an inner surface of a curved side plate 415b2 of a side plate portion 415b of a chassis 415. The contact portion 428 overlaps the normal line NL in a plan view. According to the configuration, the optical member 416 can be positioned by two positioning portions 423 and a single rotation restricting portion 424 with higher accuracy as in the third and the fourth embodiments. Furthermore, rotations of the optical member in a clockwise direction and a counter-clockwise direction about the positioning portion 423 are restricted.

<Sixth Embodiment>

A sixth embodiment of the present invention will be described with reference to FIG. 11. The sixth embodiment includes two positioning portions 523 having sizes different from the third embodiment. Configurations, functions, and effects similar to those of the third embodiment will not be described.

Figure 11:
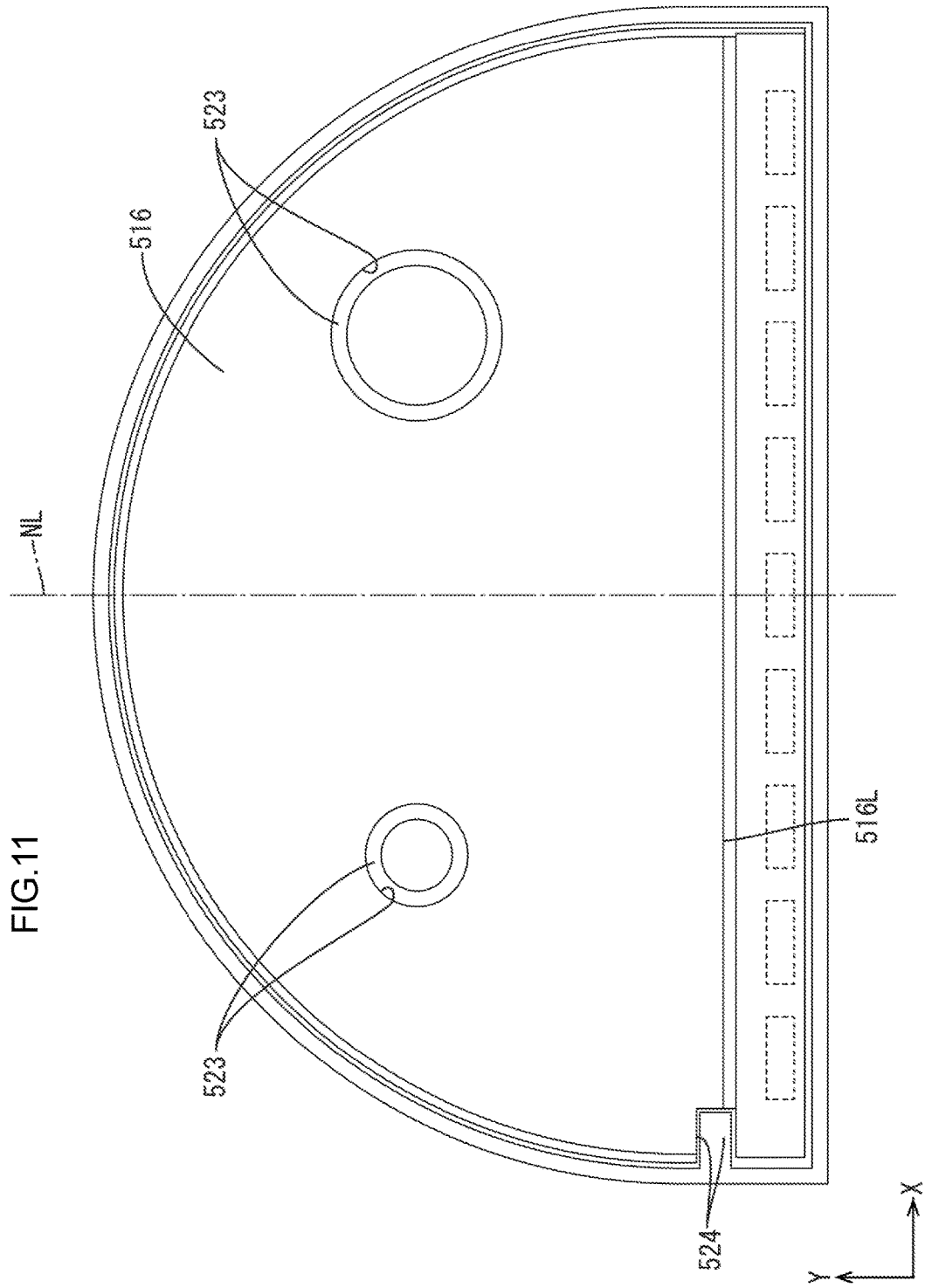
FIG. 11 is a plan view of a backlight unit according to a sixth embodiment of the present invention.

As illustrated in FIG. 11, the positioning portions 523 have different sizes. Specifically, the positioning portion 523 arranged on the right side in FIG. 11 relative to a normal line NL that crosses the meddle a linear end surface 516L of an optical member 516 with respect to an extending direction in which the linear end surface 516L extends has a diameter larger than the positioning portion 523 arranged on the left side in FIG. 11 relative to the normal line NL. According to the configuration, the optical member 516 can be positioned by two positioning portions 523 and a single rotation restricting portion 524 with higher accuracy as in the third embodiment.

<Seventh Embodiment>

A seventh embodiment of the present invention will be described with reference to FIG. 12. The seventh embodiment includes a light guide plate recess 619CO1 and a reflecting sheet recess 621CO1 having shapes different from the first embodiment. Configurations, functions, and effects similar to those of the first embodiment will not be described.

Figure 12:
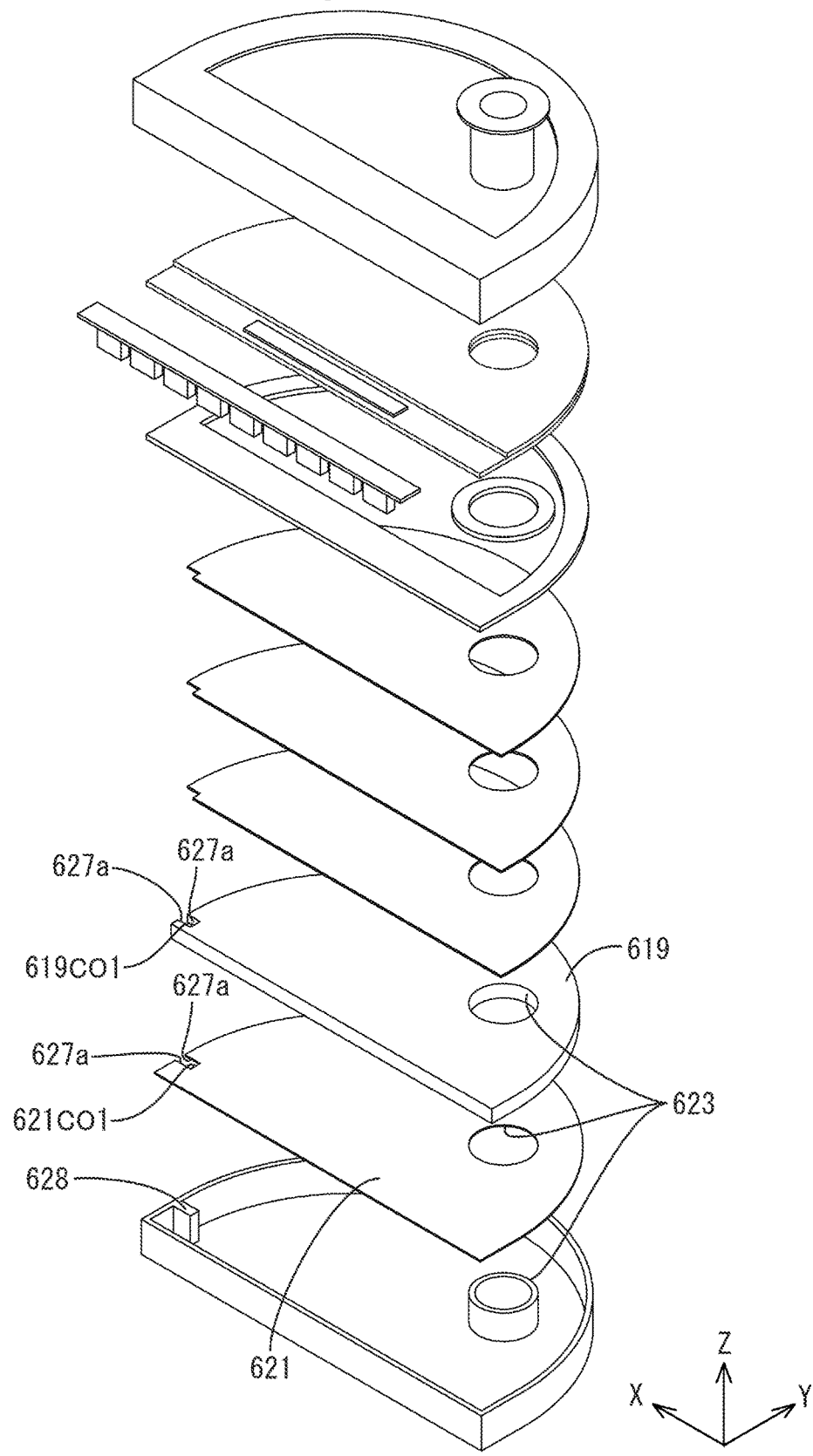
FIG. 12 is an exploded perspective view of a backlight unit according to a seventh embodiment of the present invention.

As illustrated in FIG. 12, the light guide plate recess 619CO1 and the reflecting sheet recess 621CO1 opens through alight guide plate 619 and a reflecting sheet 621 in the thickness direction (the Z-axis direction), respectively. The light guide plate recess 619CO1 and the reflecting sheet recess 621CO1 open with respect to the X-axis direction but do not open with respect to the Y-axis direction. The light guide plate recess 619CO1 and the reflecting sheet recess 621CO1 include pairs of first sides 627a, respectively. With the first sides 627a of the light guide plate recess 619CO1 and the reflecting sheet recess 621CO1 in contact with outer surfaces of a contact portion 628, rotations of the light guide plate 619 and the reflecting sheet 621 in a clockwise direction and in a counter-clockwise direction are restricted.

<Eighth Embodiment>

An eighth embodiment of the present invention will be described with reference to FIG. 13. The eighth embodiment includes a different number of rotation restricting portions 724 from the first embodiment. Configurations, functions, and effects similar to those of the first embodiment will not be described.

Figure 13:
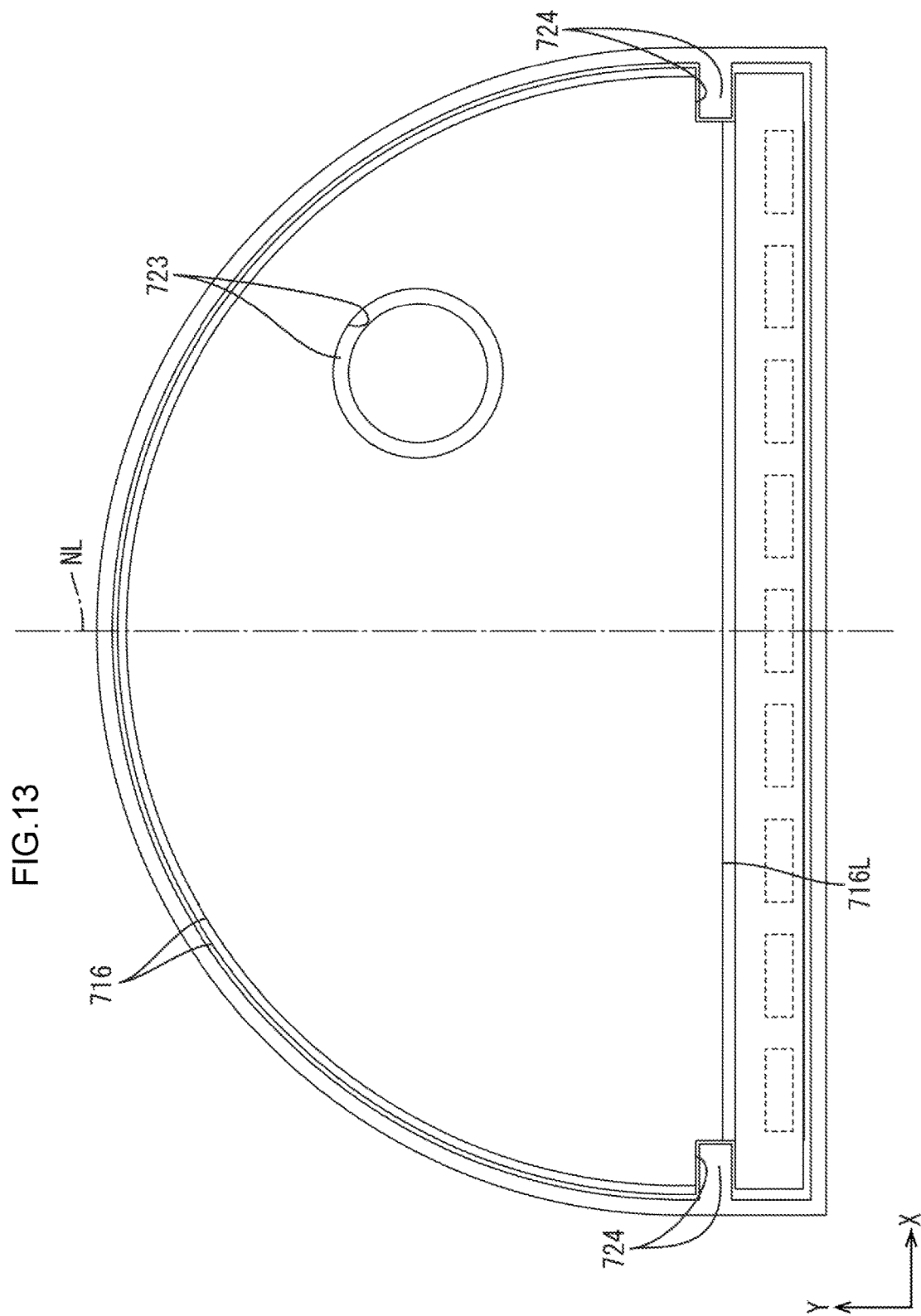
FIG. 13 is a plan view of a backlight unit according to an eighth embodiment of the present invention.

As illustrated in FIG. 13, this embodiment includes two rotation restricting portions 724 arranged in areas of an optical member 716 divided by a normal line NL that crosses the middle of a linear end surface 716L of the optical member 716 with respect to an extending direction in which the linear end surface 716L extends, respectively. One of the rotation restricting portions 724 is arranged on the left side in FIG. 13 relative to the normal line NL, that is, on a side opposite from the positioning portion 723. The other rotation restricting portion 724 is arranged on the right side in FIG. 13 relative to the normal line NL, that is, on a positioning portion 723 side. The rotation restricting portions 724 are arranged close to corners of the optical member 716, respectively. The rotation restricting portions 724 are symmetric with respect to the normal line NL. Therefore, the rotation of the optical member 716 about the positioning portion 723 in a counter-clockwise direction is restricted by the left rotation restricting portion 724 in FIG. 13. The rotation of the optical member 716 about the positioning portion 723 in a clockwise direction is restricted by the right rotation restricting portion 724 in FIG. 13.

<Ninth Embodiment>

A ninth embodiment of the present invention will be described with reference to FIGS. 14 to 16. The ninth embodiment includes mechanisms for positioning a liquid crystal panel 811 and restricting a rotation of the liquid crystal panel 811 in addition to an optical member 816. Configurations, functions, and effects similar to those of the first embodiment will not be described.

Figure 14:
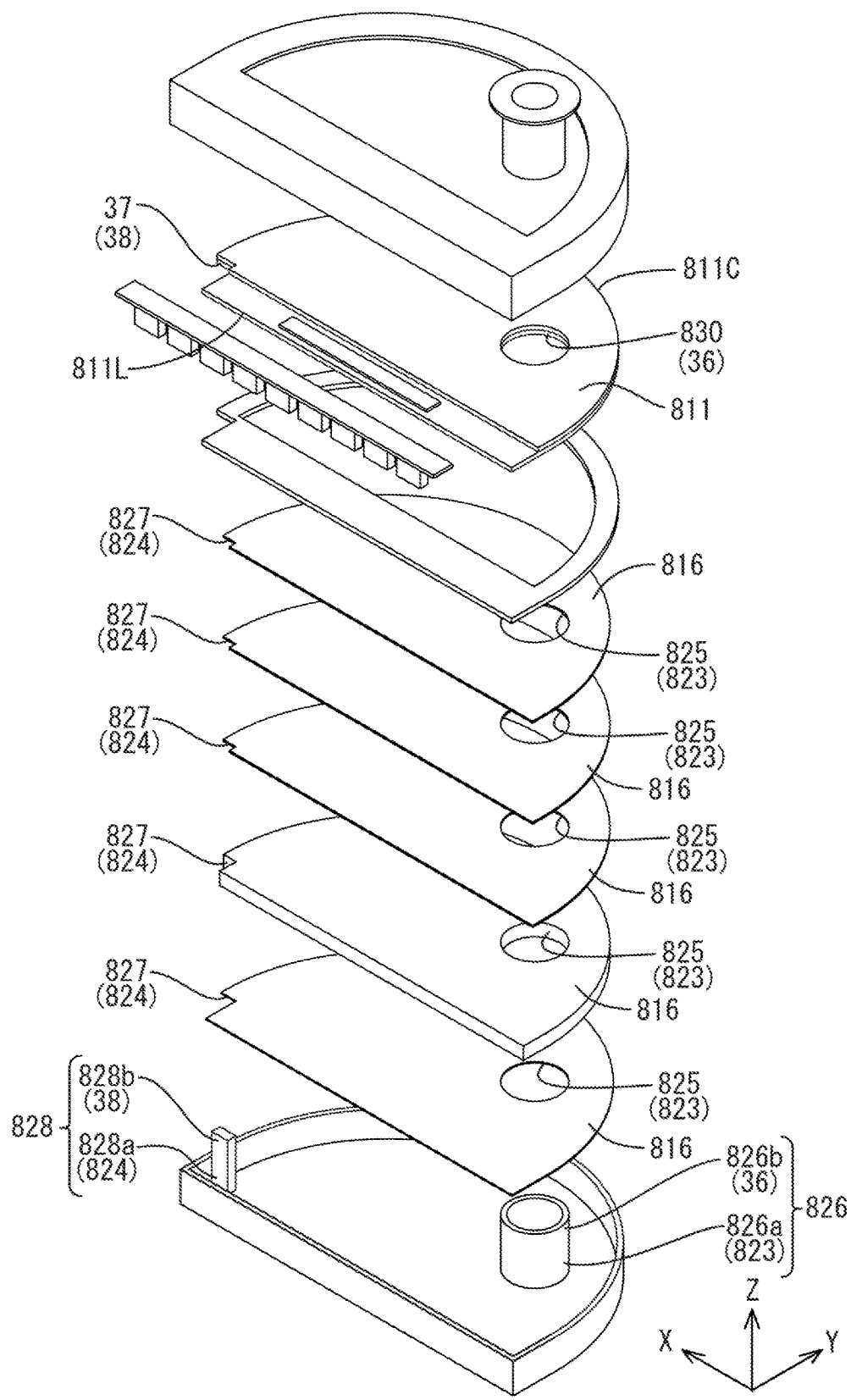
FIG. 14 is an exploded perspective view of a backlight unit according to a ninth embodiment of the present invention.
Figure 15:
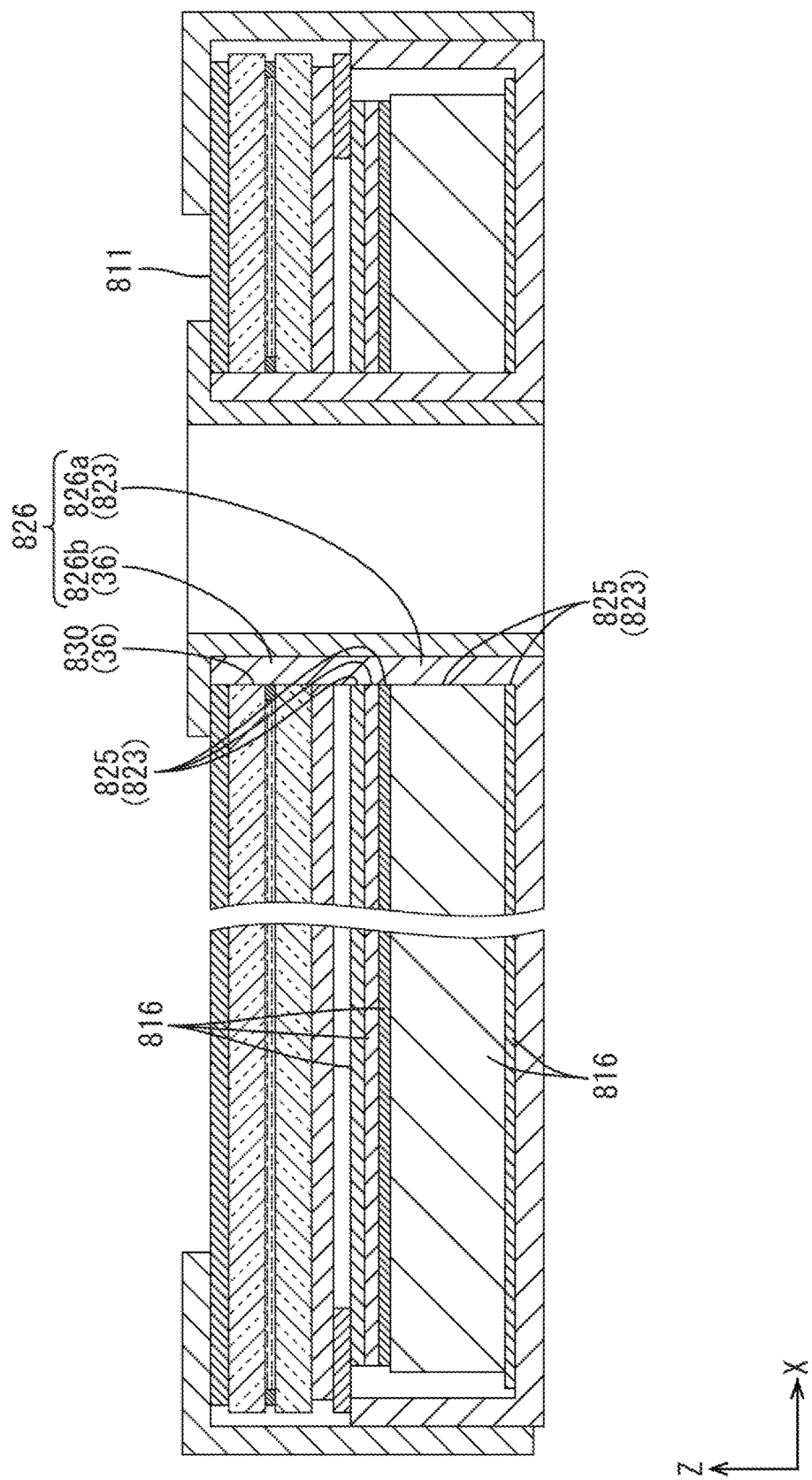
FIG. 15 is a cross-sectional view of a liquid crystal display device along a section line that crosses a positioning portion and along the X-axis direction.

As illustrated in FIGS. 14 and 15, this embodiment includes a positioning protrusion 826 that is inserted not only in a positioning hole 825 of the optical member 816 but also in a panel through hole 830 of the liquid crystal panel 811. The positioning protrusion 826 includes an optical member-side inserting portion 826a and a panel-side inserting portion 826b. The optical member-side inserting portion 826a is inserted in the positioning hole 825 of the optical member 816. The panel-side inserting portion 826b is inserted in the panel through hole 830 of the liquid crystal panel 811. The positioning protrusion 826 has a height such that a distal end surface of the positioning protrusion 826 is flush with a front plate surface of the liquid crystal panel 811. When the positioning protrusion 826 is inserted in the positioning hole 825 and the panel through hole 830, a periphery of the optical member-side inserting portion 826a is in contact with an inner wall of the positioning hole 825 and a periphery of the panel-side inserting portion 826b is in contact with an inner wall of the panel through hole 830. According to the configuration, the optical member 816 and the liquid crystal panel 811 are positioned with respect to the X-axis direction and the Y-axis direction. Namely, the optical member-side inserting portion 826a of the positioning protrusion 826 and the positioning hole 825 are components of a positioning portion 823 for positioning the optical member 816. The panel-side inserting portion 826b of the positioning protrusion 826 and the panel through hole 830 are components of a panel positioning portion 36 for positioning the liquid crystal panel 811.

Figure 16:
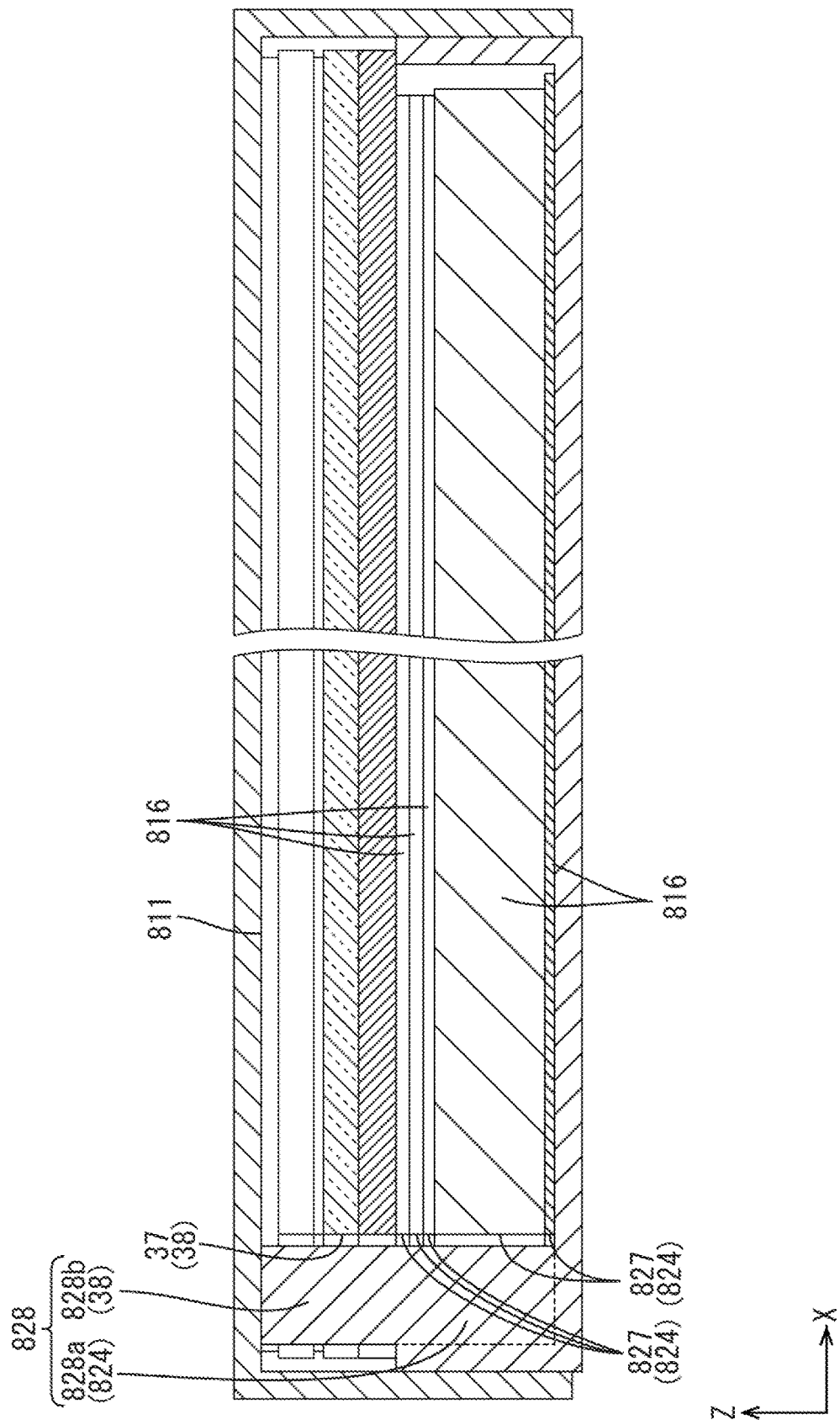
FIG. 16 is a cross-sectional view of a liquid crystal display device along a section line that crosses a rotation restricting portion and along the X-axis direction.

As illustrated in FIGS. 14 and 16, the liquid crystal panel 811 includes a panel recess 37 that is a portion of a periphery of the liquid crystal panel 811 recessed along the circumferential direction. The liquid crystal panel 811 includes two corners defined by edges of a linear end surface 811L and edges of a curved end surface 811C. The panel recess 37 is formed by cutting one of the corners of the liquid crystal panel 811 on a side opposite from the panel through hole 830. The panel recess 37 overlaps an optical member recess 827 of the optical member 816 in a plan view. A contact portion 828 is in contact with not only the optical member recess 827 of the optical member 816 but also the panel recess 37 of the liquid crystal panel 811. The contact portion 828 includes an optical member contact portion 828a and a panel contact portion 828b. The optical member contact portion 828a is in contact with the optical member recess of the optical member 816. The panel contact portion 828b is in contact with the panel recess 37 of the liquid crystal panel 811. The contact portion 828 has a height such that a distal end surface thereof is flush with the front plate surface of the liquid crystal panel 811. With the contact portion 828 inserted in the optical member recess 827 and the panel recess 37, an outer surface of the optical member contact portion 828a is in contact with an inner wall of the optical member recess 827 and an outer surface of the panel contact portion 828b is in contact with an inner wall of the panel recess 37. According to the configuration, the rotations of the optical member 816 and the liquid crystal panel 811 about the positioning portion 823 are restricted. The optical member contact portion 828a of the contact portion 828 and the optical member recess 827 are components of a rotation restricting portion 824 for restricting the rotation of the optical member 816. The panel contact portion 828b of the contact portion 828 and the panel recess 37 are components of a panel rotation restricting portion 38 for restricting the rotation of the liquid crystal panel 811.

As described above, the liquid crystal panel 811 according to this embodiment includes the panel recess 37 to overlap the optical member recess 827 in a plan view. The contact portion 828 includes the optical member contact portion 828a that is in contact with the optical member recess 827 and the panel contact portion 828b that is in contact with the panel recess 37. The positioning protrusion 826 includes the optical member-side inserting portion 826a that is inserted in the positioning hole 825 and the panel-side inserting portion 826b that is inserted in the panel through hole 830. With the optical member-side inserting portion 826a of the positioning protrusion 826 inserted in the positioning hole 825 of the optical member 816 and the panel-side inserting portion 826b of the positioning protrusion 826 inserted in the panel through hole 830 of the liquid crystal panel 811, the optical member 816 and the liquid crystal panel 811 are positioned. With the optical member contact portion 828a of the contact portion 828 in contact with the optical member recess 827 and the panel contact portion 828b of the contact portion 828 in contact with the panel protrusion or the panel recess 37, the rotations of the optical member 816 and the liquid crystal panel 811 are restricted. Therefore, decreases in accuracy of positioning of the optical member 816 and the liquid crystal panel 811 are less likely to occur and thus light with optical effects added by the optical member 816 efficiently enters the liquid crystal panel 811. According to the configuration, proper display quality is achieved.

<Tenth Embodiment>

A tenth embodiment of the present invention will be described with reference to FIGS. 17 and 18. This embodiment includes locks 39 formed on a positioning protrusion 926 instead of the fixing tape in the first embodiment. Configurations, functions, and effects similar to those of the first embodiment will not be described.

Figure 17:
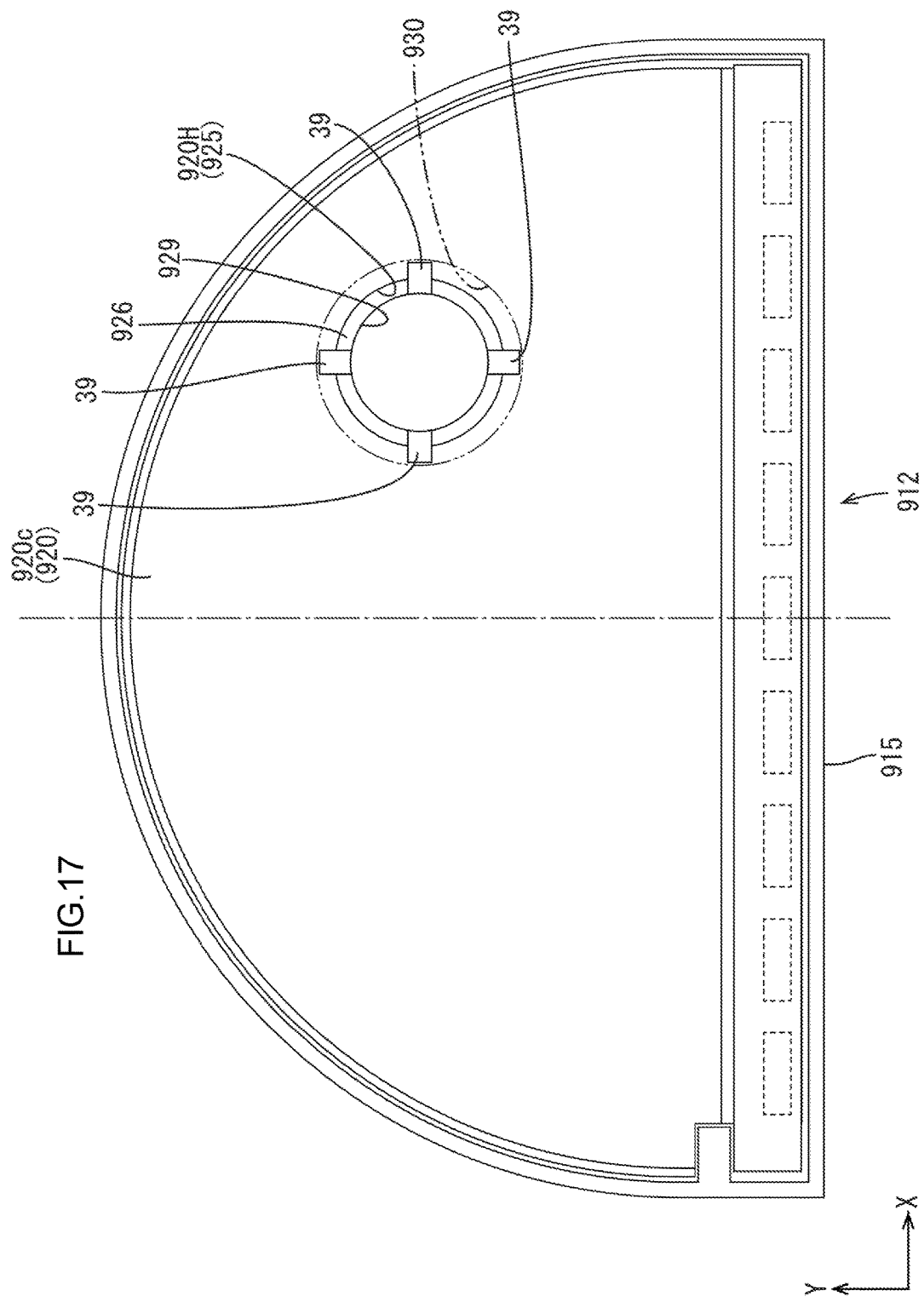
FIG. 17 is a plan view of a backlight unit according to a tenth embodiment of the present invention.
Figure 18:
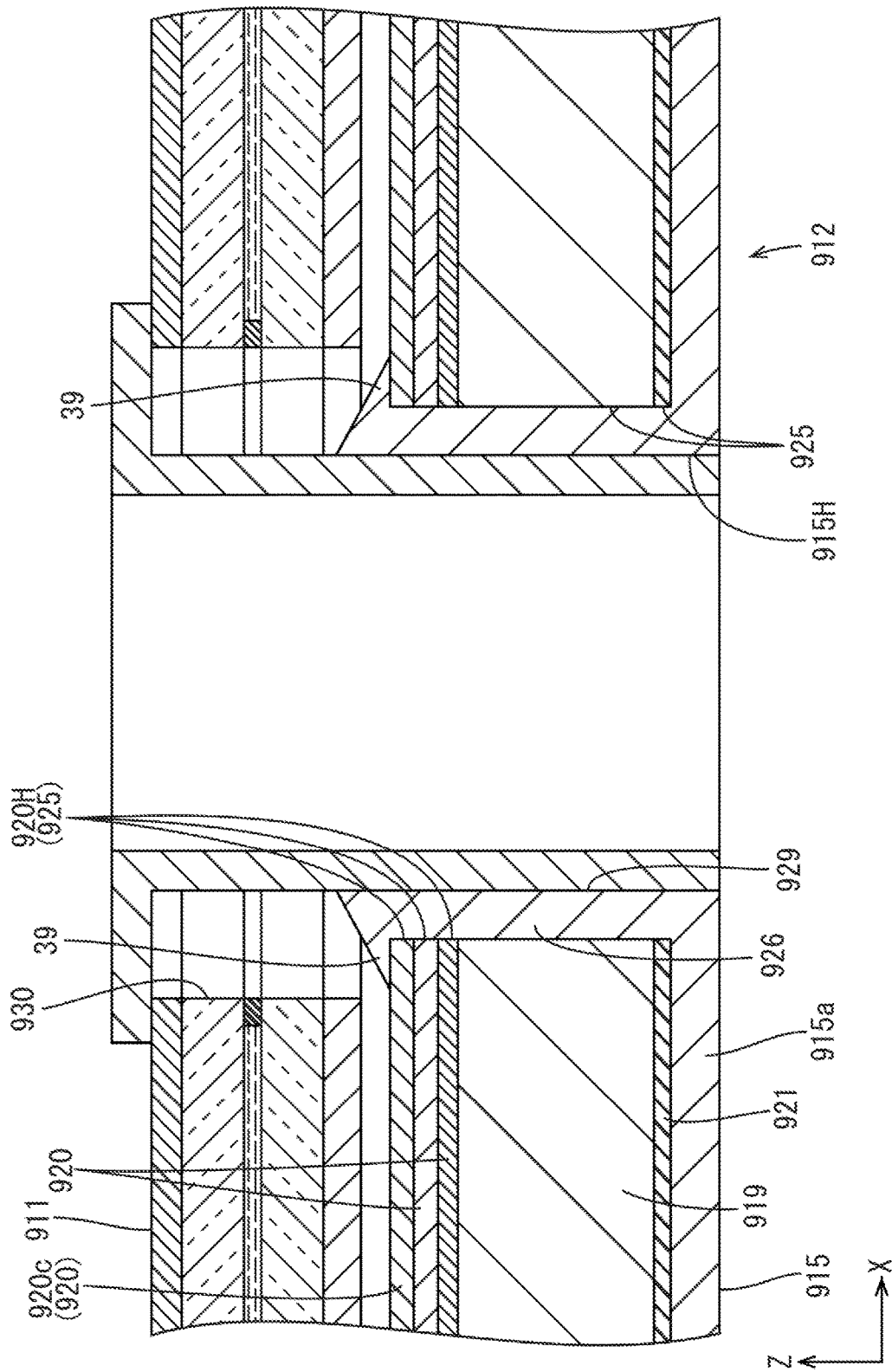
FIG. 18 is a cross-sectional view of a liquid crystal display device along a section line that crosses a positioning portion and along the X-axis direction.

As illustrated in FIGS. 17 and 18, the locks (fixing portions) 39 are integrally formed with the positioning protrusion 926 according to this embodiment. The locks 39 are held on an opening edge of optical sheet positioning holes 920H (a positioning hole 925) of optical sheets 920 from the front side (the light exiting side). In comparison to the first embodiment, the number of components and the number of steps in an assembly process are reduced. The locks 39 are formed at a distal end of the positioning protrusion 926 that extends from a bottom plate 915a of a chassis 915. The locks 39 project outer than a periphery of the positioning protrusion 926. Four locks 39 are arranged at intervals of about 90 degrees. The locks 39 are held on the opening edge of the optical sheet positioning hole 920H of a second prism sheet 920c at the foremost among optical sheets 920 from the front side. According to the configuration, the optical sheets 920, a light guide plate 919, and a reflecting sheet 921 that are laid in layers are fixed. A liquid crystal panel 911 includes a panel through hole 930 that is formed in an area overlapping not only the positioning hole 925 of a backlight unit 912 but also the locks 39, respectively. In FIG. 17, the panel through hole 930 is indicated with a two-dot chain line.

As described above, this embodiment includes the chassis 915 that holds the optical sheets (an optical member) 920 from a side opposite from the light exiting side. The chassis 915 includes a chassis through hole (a supporting member through hole) 915H that is communicated with the positioning hole 925. The positioning protrusion 926 is formed on the chassis 915 such that a communicating hole 929 is communicated with the chassis through hole 915H. The fixing portion includes the locks 39 formed on the positioning protrusion 926 are held on the opening edges of the optical member positioning holes 920H of the optical sheets 920. According to the configuration, the optical sheets 920 are held by the chassis 915 from the side opposite from the light exiting side and the locks 39 included in the fixing portion formed on the positioning protrusion 926 formed on the chassis 915 are held on the opening edges of the optical sheet positioning holes 920H from the light exiting side. In comparison to a configuration that includes a fixing portion as a component separate from the positioning protrusion 926, the number of components can be reduced and steps in the production of the backlight unit 912 can be reduced. Therefore, the production cost can be reduced.

<Eleventh Embodiment>

An eleventh embodiment of the present invention will be described with reference to FIG. 19. The eleventh embodiment includes a positioning protrusion 1026 having a shape different from the ninth embodiment. Configurations, functions, and effects similar to those of the ninth embodiment will not be described.

Figure 19:
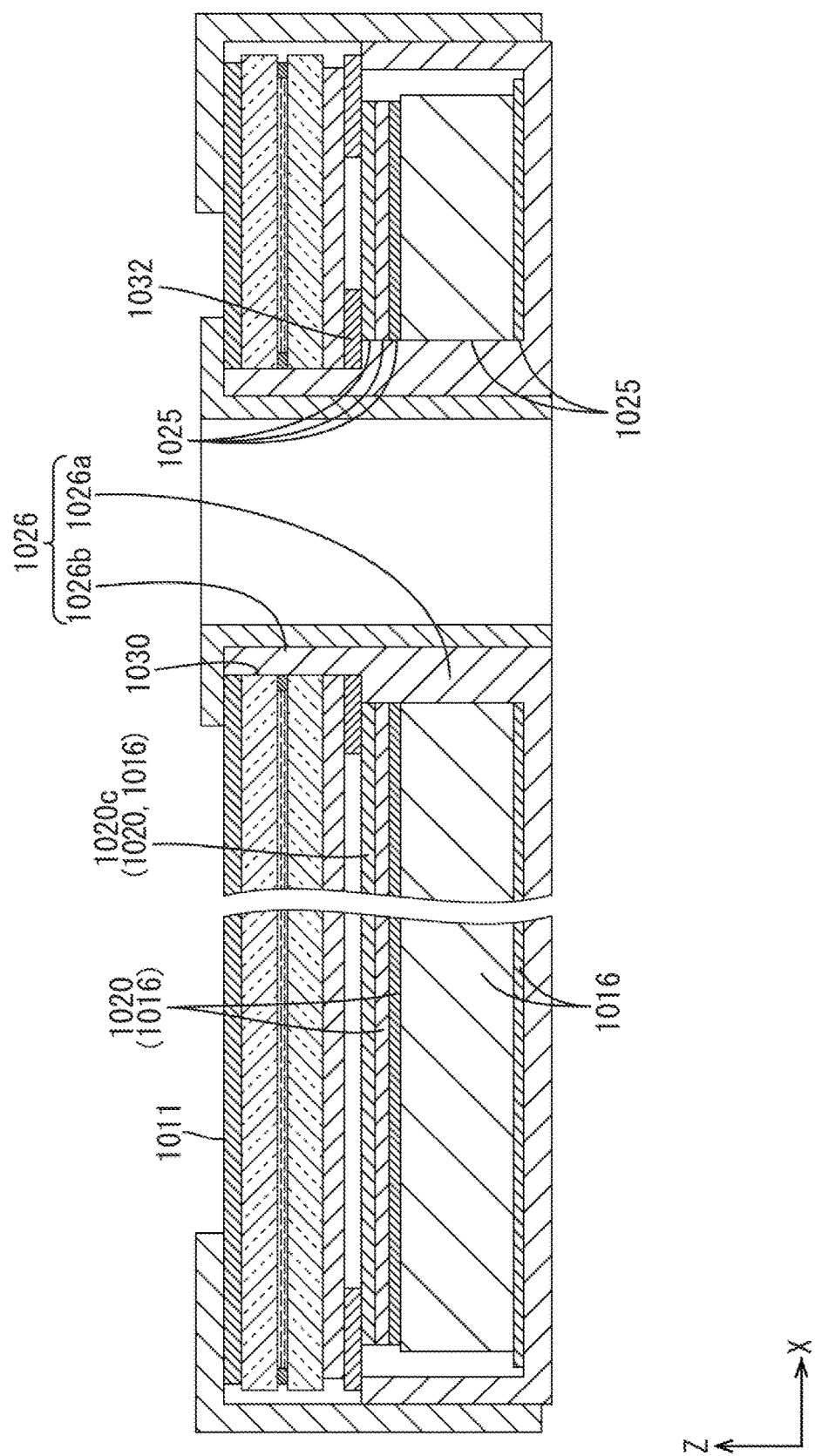
FIG. 19 is a cross-sectional view of a liquid crystal display device according to an eleventh embodiment of the present invention along a section line that crosses a positioning portion and along the X-axis direction.

As illustrated in FIG. 19, the positioning protrusion 1026 according to this embodiment includes two portions with different diameters. Specifically, the positioning protrusion 1026 includes an optical member-side inserting portion 1026a and a panel-side inserting portion 1026b. The optical member-side inserting portion 1026a is inserted in a positioning hole 1025 of an optical member 1016. The panel-side inserting portion 1026b is inserted in a panel through hole 1030 of a liquid crystal panel 1011. The optical member-side inserting portion 1026a has a larger diameter and the panel-side inserting portion 1026b has a smaller diameter. The positioning holes 1025 of the optical member 1016 have diameters slightly smaller than the diameter of the optical member-side inserting portion 1026a but larger than the diameter of the panel through hole 1030 of the liquid crystal panel 1011. A front surface of the optical member-side inserting portion 1026a is flush with a plate surface of a second prism sheet 1020c at the foremost among optical sheets 1020. A fixing tape 1032 is fixed to the front surface of the optical member-side inserting portion 1026a. According to the configuration, the optical member 1016 is fixed.

<Twelfth Embodiment>

A twelfth embodiment of the present invention will be described with reference to FIG. 20. The twelfth embodiment includes an optical member 1116 having an outline different from the first embodiment. Configurations, functions, and effects similar to those of the first embodiment will not be described.

Figure 20:
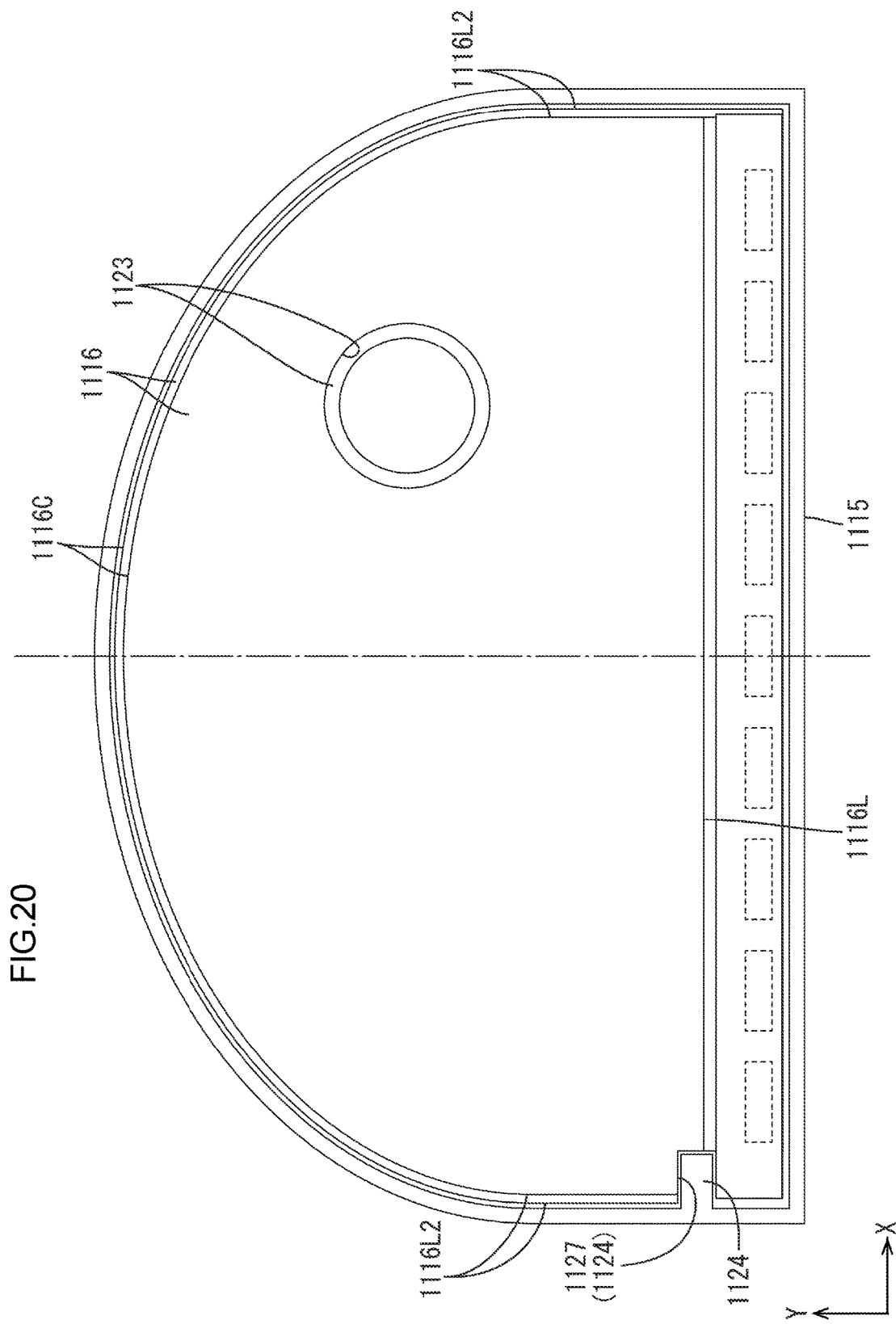
FIG. 20 is a plan view of a backlight unit according to a twelfth embodiment of the present invention.

As illustrated in FIG. 20, the optical member 1116 according to this embodiment includes a periphery that includes a linear end surface 1116L, a curved end surface 1116C, and a pair of second linear end surfaces 1116L2. The linear end surface 1116L extends along the X-axis direction. A curved end surface 116C extends in a curve. The second linear end surfaces 1116L2 linearly extend along the Y-axis direction. The extending direction of the second linear end surfaces 1116L2 is perpendicular to the extending direction of the linear end surface 1116L. One of the ends of each second linear end surface 1116L2 with respect to the extending direction continues to the linear end surface 116L and the other end continues to the curved end surface 1116C. Namely, the second linear end surfaces 1116L2 are arranged between the linear end surface 1116L and the linear end surface 1116L. A rotation restricting portion 1124 is arranged close to a corner of the optical member 1116 defined by an end portion of the second linear end surface 1116L2 and an end portion of the linear end surface 1116L on a side opposite from a positioning portion 1123. The rotation restricting portion 1124 includes an optical member recess 1127 that is formed by recessing a portion of the second linear end surface 1116L2 of the optical member 1116 along the circumferential direction on the side opposite from the positioning portion 1123. A chassis 1115, a liquid crystal panel, and a bezel, which are not illustrated, have similar outlines to the outline of the optical member 1116.

<Thirteenth Embodiment>

A thirteen embodiment of the present invention will be described with reference to FIG. 21. The thirteenth embodiment includes a panel through hole 1230 formed in an area of a liquid crystal panel 1211 different from the first embodiment. Configurations, functions, and effects similar to those of the first embodiment will not be described.

Figure 21:
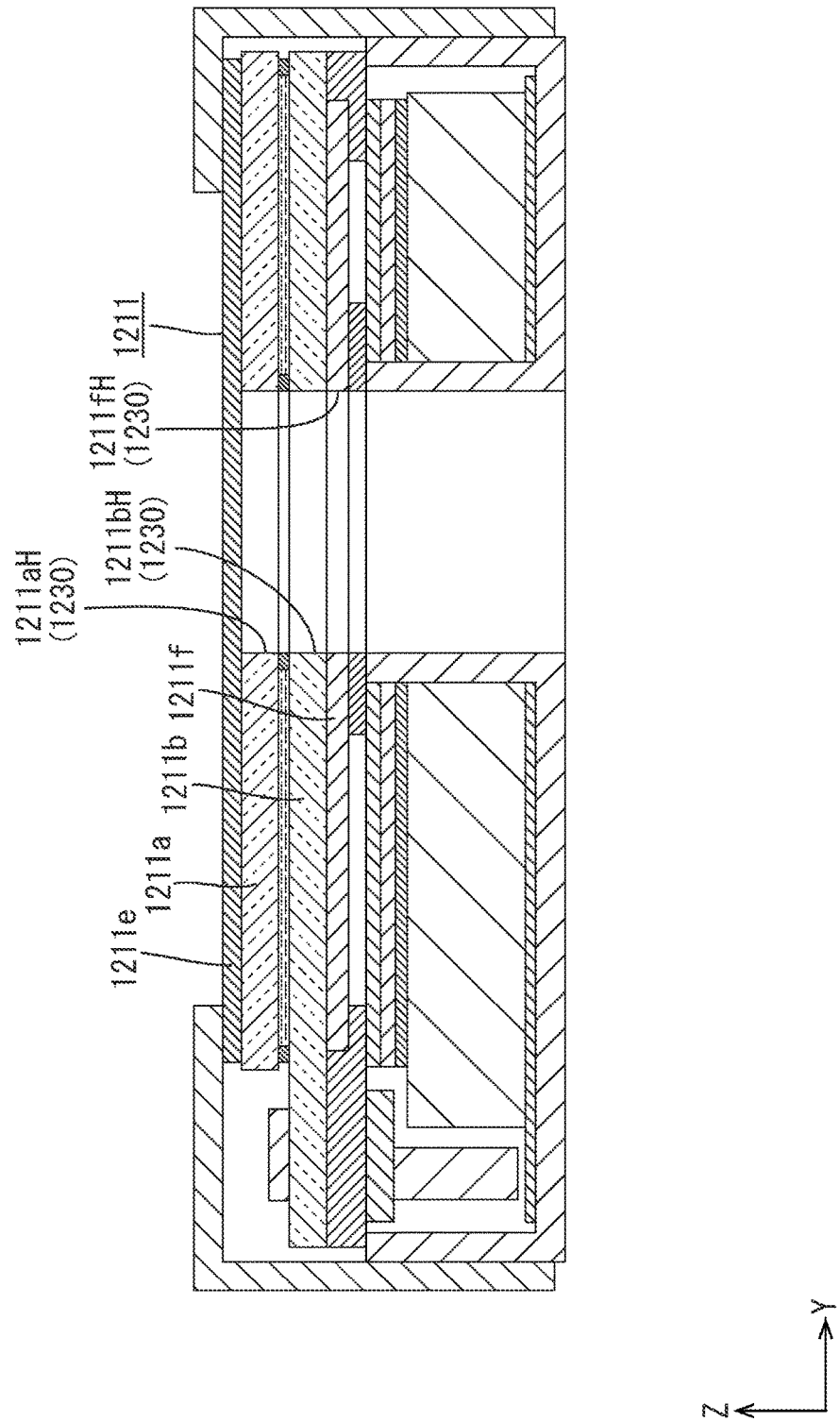
FIG. 21 is a cross-sectional view of a liquid crystal display device according to a thirteenth embodiment of the present invention along a section line that crosses a positioning portion and along the Y-axis direction.

As illustrated in FIG. 21, the liquid crystal panel 1211 according to this embodiment includes the panel through hole 1230 formed in substrates 1211a and 1211b, and a rear polarizing plate 1211f. Namely, the panel through hole 1230 is not formed in a front polarizing plate 1211e. The panel through hole 1230 includes substrate through holes 1211aH and 1211bH that open through the substrates 1211a and 1211b, respectively, and a polarizing plate through hole 1211fH that opens through the rear polarizing plate 1211f. The substrate through holes 1211aH and 1211bH and polarizing plate through hole 1211fH are communicated with one another.

<Fourteenth Embodiment>

A fourteenth embodiment of the present invention will be described with reference to FIG. 22. The fourteenth embodiment includes a panel through hole 1330 formed in an area of a liquid crystal panel 1311 different from the first embodiment. Configurations, functions, and effects similar to those of the first embodiment will not be described.

Figure 22:
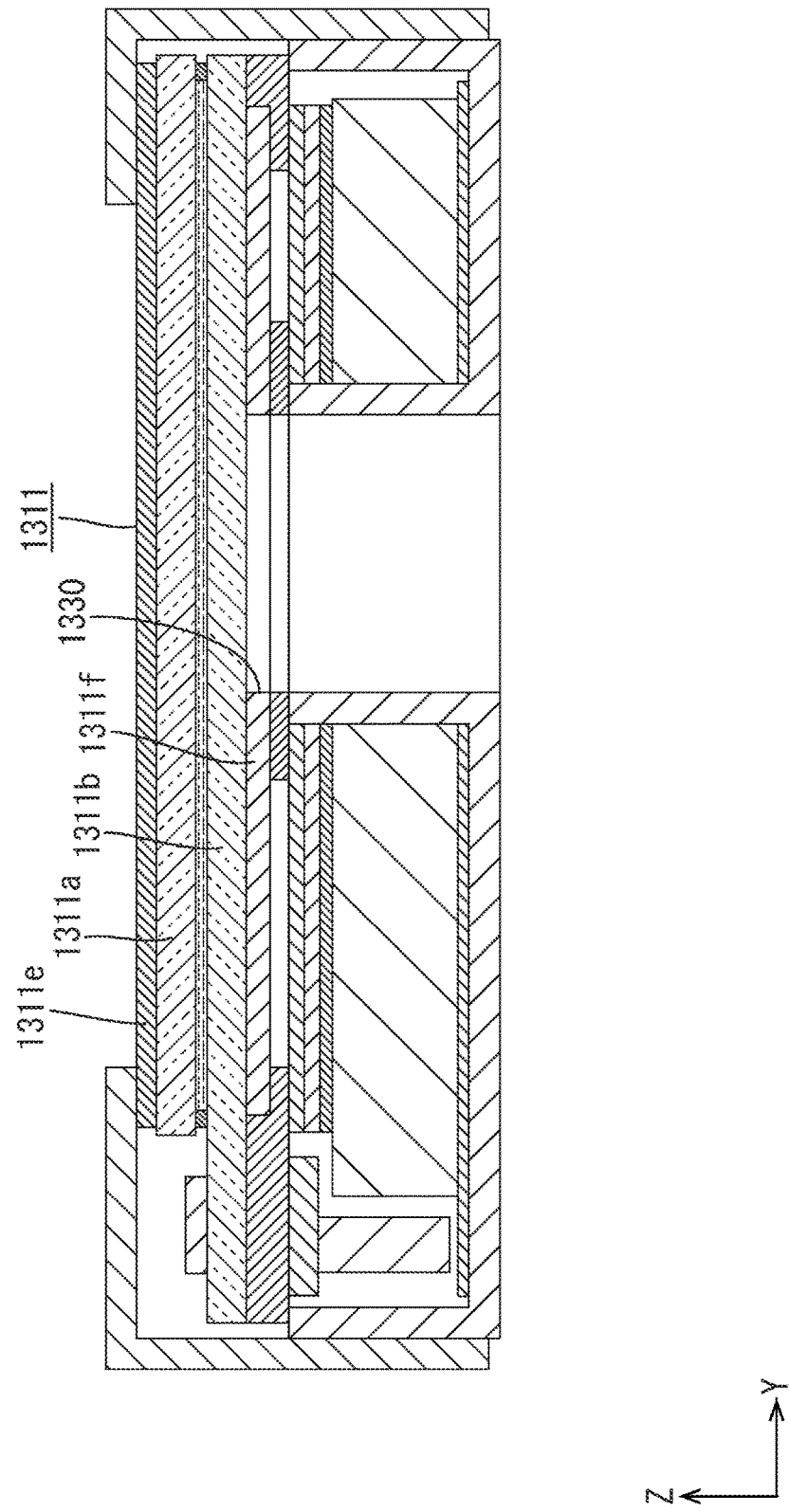
FIG. 22 is a cross-sectional view of a liquid crystal display device according to a fourteenth embodiment of the present invention along a section line that crosses a positioning portion and along the Y-axis direction.

As illustrated in FIG. 22, the thirteenth embodiment includes the panel through hole 1330 formed in a rear polarizing plate 1311f. Namely, the panel through hole 1330 is not formed in substrates 1311a and 1311b and a front polarizing plate 1311e. Because the panel through hole is not formed in the substrates 1311a and 1311b of the liquid crystal panel 1311, the through hole sealing member included in the first embodiment is not included. Therefore, the production cost is reduced.

<Fifteenth Embodiment>

A fifteenth embodiment of the present invention will be described with reference to FIG. 23. The fifteenth embodiment includes a liquid crystal panel 1411 that does not the panel through hole included in the first embodiment. Configurations, functions, and effects similar to those of the first embodiment will not be described.

Figure 23:
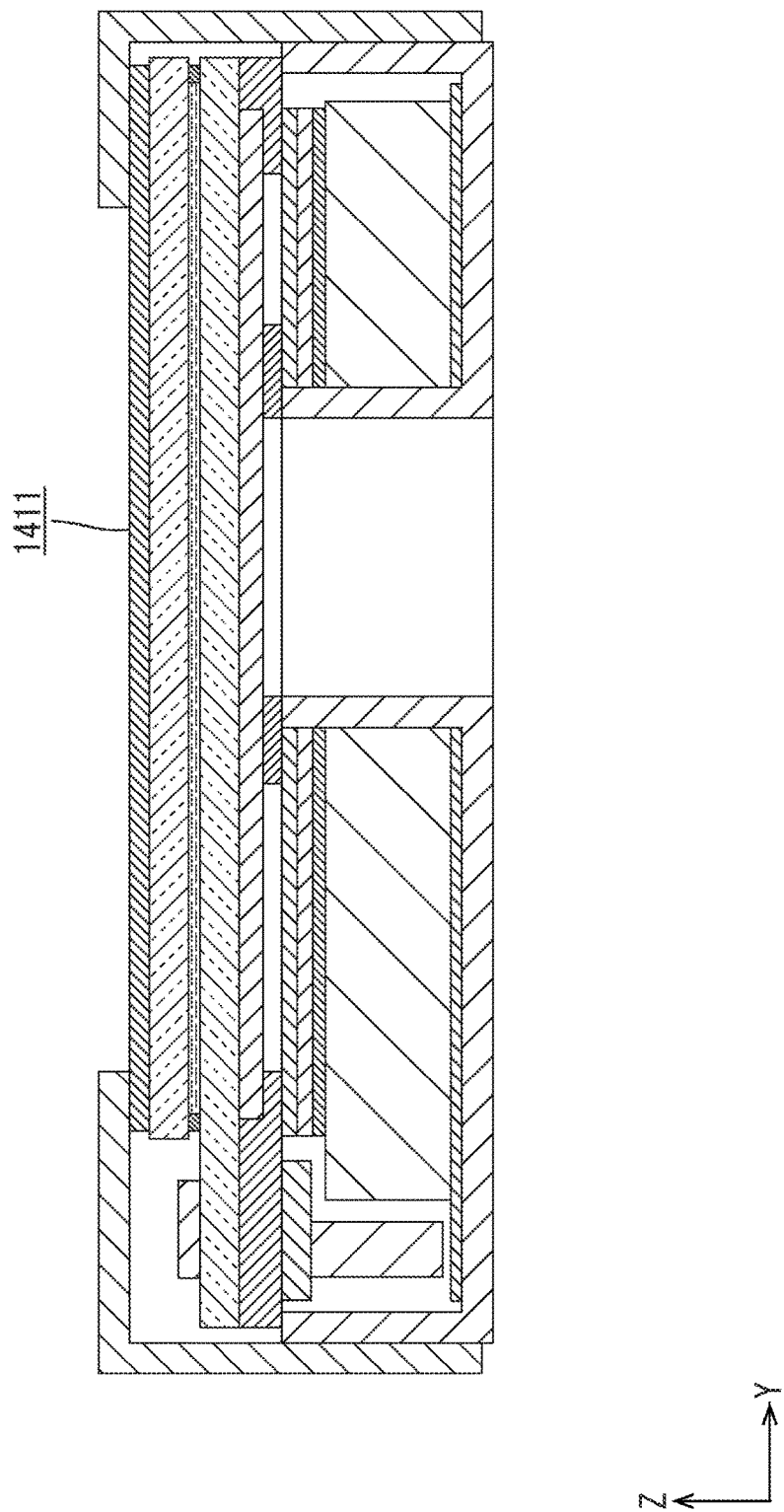
FIG. 23 is a cross-sectional view of a liquid crystal display device according to a fifteenth embodiment of the present invention along a section line that crosses a positioning portion and along the Y-axis direction.

As illustrated in FIG. 23, the liquid crystal panel 1411 according to this embodiment does not include the panel through hole included in the first embodiment.

<Other Embodiments>

The present invention is not limited to the embodiments, which have been described using the foregoing descriptions and the drawings. For example, embodiments described below are also included in the technical scope of the present invention.

Figure 24:
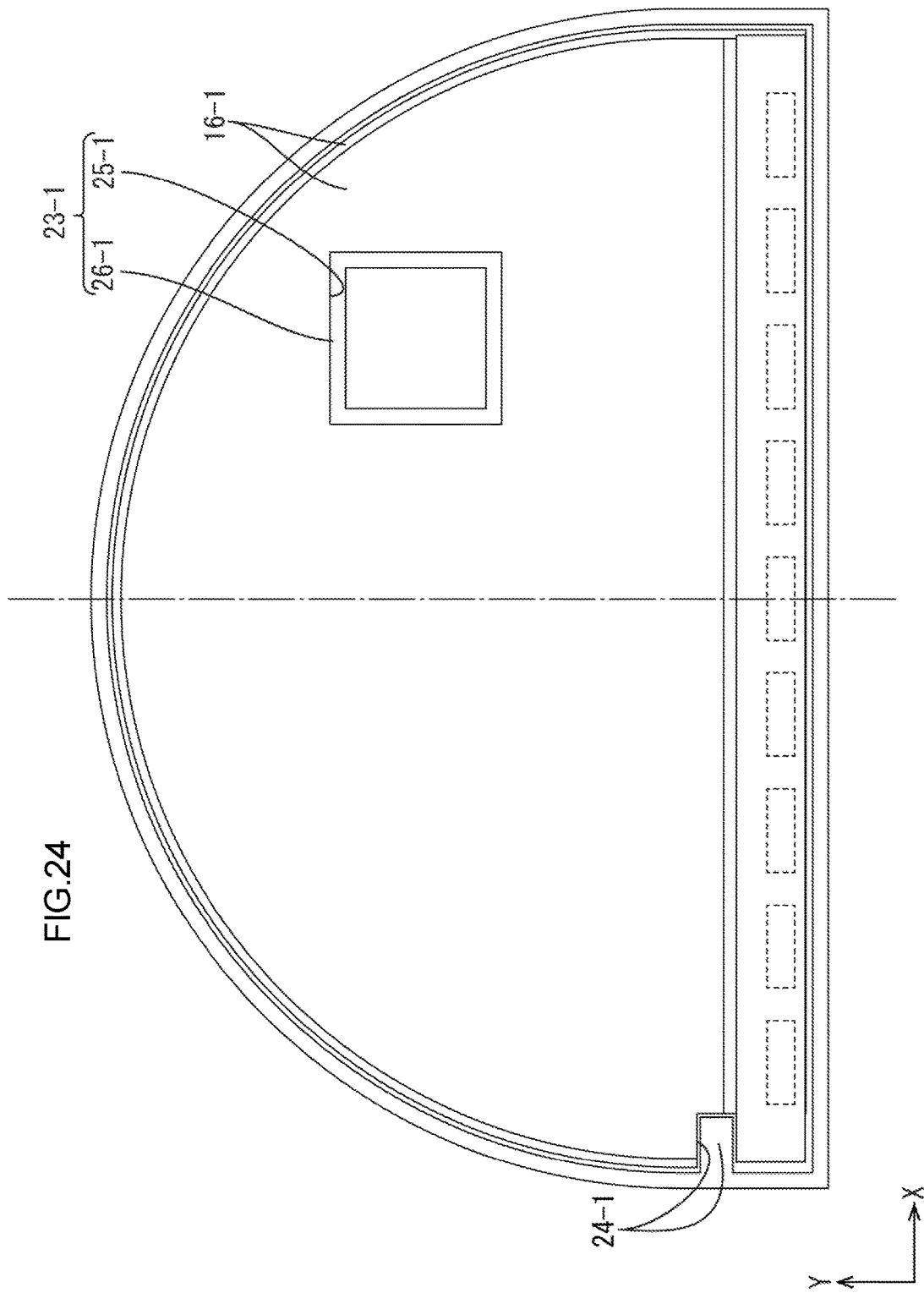
FIG. 24 is a plan view of a backlight unit according to another embodiment (1) of the present invention.

(1) In each of the above embodiments, the positioning portion has the round shape in a plan view. However, the shape of the positioning portion in a plan view may be altered as appropriate. For example, the shape may be a rectangle such as a positioning portion 23-1 illustrated in FIG. 24. According to the configuration, sides of outer surfaces of a positioning protrusion 26-1 included in the positioning portion 23-1 are in contact with sides of inner walls of a positioning hole 25-1 and thus an optical member 16-1 is less likely to rotate. Even if the optical member 16-1 rotates due to a clearance created between the positioning hole 25-1 and the positioning protrusion 26-1, the rotation is restricted by a rotation restricting portion 24-1.

Figure 25:
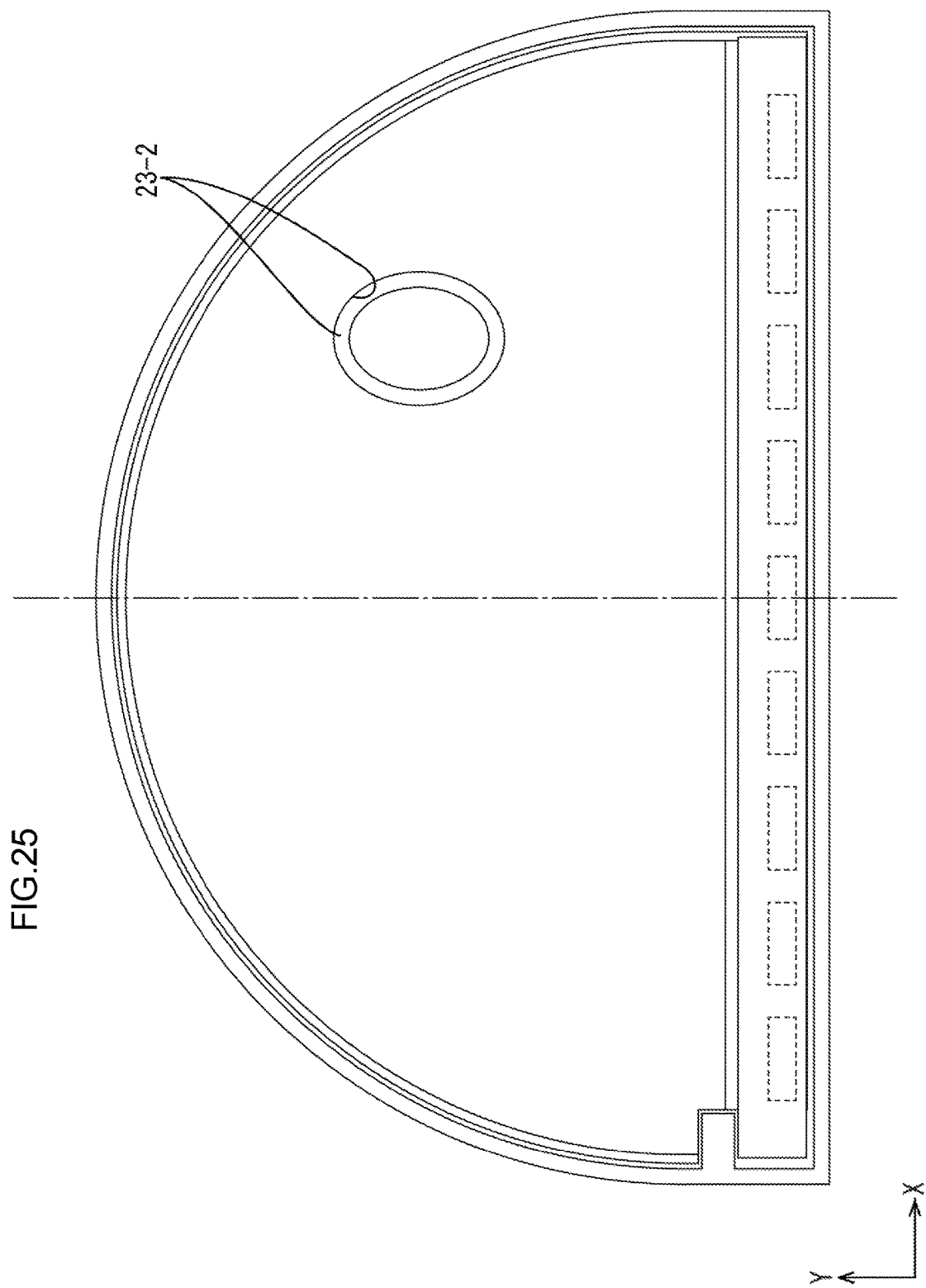
FIG. 25 is a plan view of a backlight unit according to another embodiment (2) of the present invention.

(2) Other than the above embodiment (1), the shape of the positioning portion may be an ellipse such as a positioning portion 23-2 illustrated in FIG. 25. Furthermore, the shape may be a semicircle or an oval.

Figure 26:
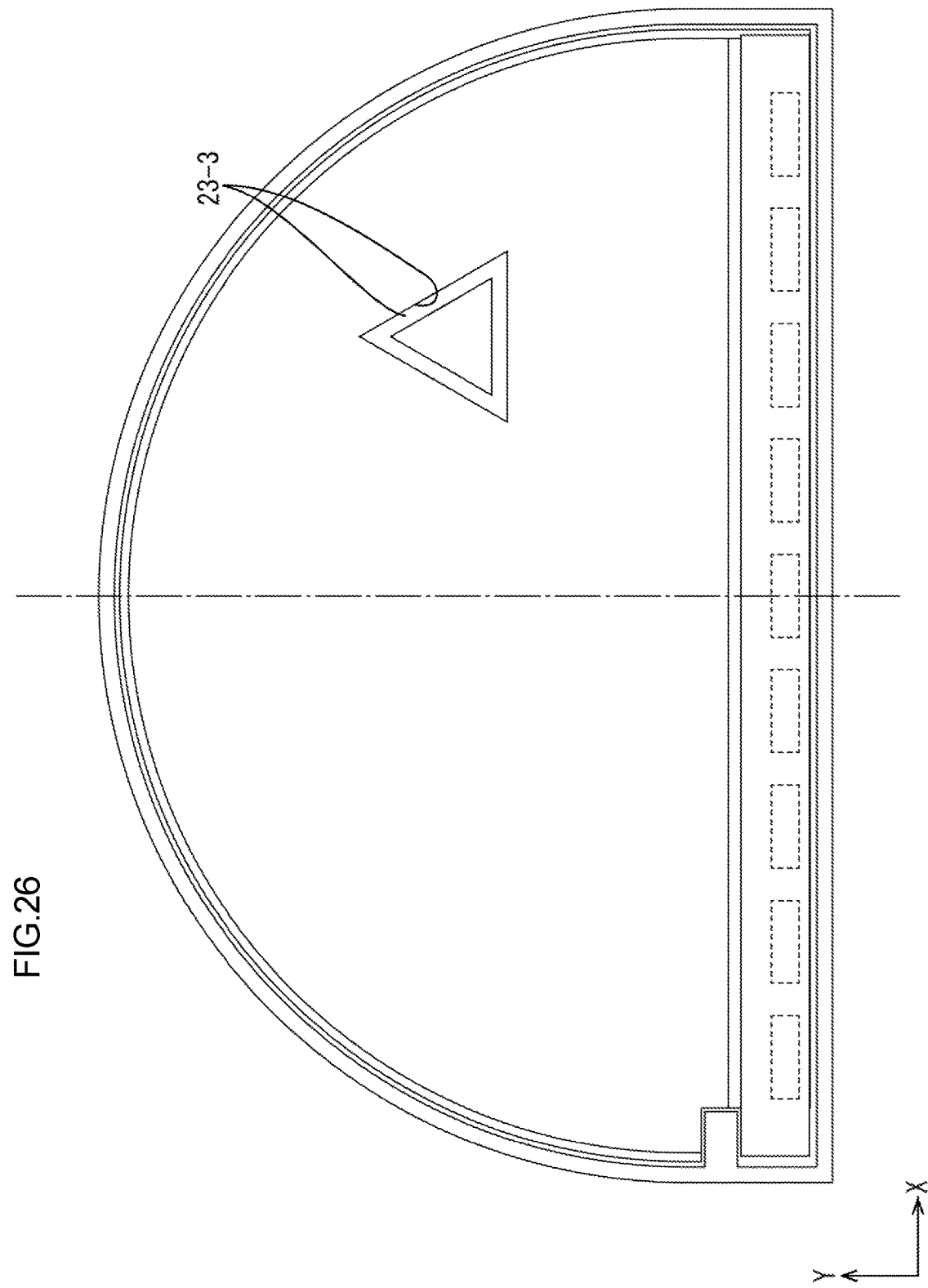
FIG. 26 is a plan view of a backlight unit according to another embodiment (3) of the present invention.

(3) Other than the above embodiments (1) and (2), the shape may be a triangle such as a positioning portion 23-3 illustrated in FIG. 26. Furthermore, the shape may be a trapezoid, a parallelogram, a diamond, a pentagon, or a polygon.

(4) In each of the above embodiments, the shape of the rotation restricting portion in a plan view is a rectangle. However, the shape of the rotation restricting portion in a plan view may be altered as appropriate. For example, the shape of the rotation restricting portion in a plan view may be a triangle, a trapezoid, a parallelogram, a semicircle, a semi-ellipse, a semi-oval, a diamond, a pentagon, or a polygon.

(5) In each of the above embodiment, the positioning portion is arranged such that the center thereof does not overlap the normal line that passes the meddle with respect to the extending direction of the liner end surface of the optical member. However, the positioning portion may be arranged such that the center thereof overlaps the normal line. Furthermore, the positioning portion and the rotation restricting portion may be arranged on the same side relative to the normal line. Still furthermore, the arrangement of the positioning portion in a plan view may be altered as appropriate.

(6) In each of the above embodiments (except for the fourth and the fifth embodiments), the rotation restricting portion is arranged closer to the end than the LED at the end among the LEDs. However, the rotation restricting portion may be arranged in line with the LED at the end with respect to the extending direction of the linear end surface. The rotation restricting portion may be arranged between the adjacent LEDs.

(7) In each of the above embodiments, the rotation restricting portion is arranged close to the corner of the optical member or at the meddle of the curved end surface. However, the rotation restricting portion may be arranged at any position between the corner of the optical member and the meddle of the curved end surface.

(8) In each of the above embodiments (except for the fourth and the fifth embodiments), the optical member recess included in the rotation restricting portion is formed by recessing the linear end surface and the curved end surface of the periphery of the optical member. However, the optical member recess may be formed by recessing the linear end surface of the optical member. Alternatively, the optical member recess may be formed by recessing the curved end surface of the optical member.

(9) In each of the fourth and the fifth embodiments, the optical member projection included in the rotation restricting portion projects from the curved end surface of the periphery of the optical member. However, the optical member projection may project from the linear end surface of the periphery of the optical member. Alternatively, the optical member projection may project from the curved end surface of the optical member and another optical member projection may project from the linear end surface.

(10) The arrangement of the rotation restricting portion in a plan view may be altered from the above embodiments (6) to (9).

(11) In each of the above embodiments, one or two positioning portions are provided. However, three or more positioning portions in the same size or different sizes may be provided. Alternatively, two or more of the positioning portions may be in the same size.

(12) In each of the above embodiments, one or two rotation restricting portions are provided. However, three or more rotation restricting portions may be provided.

(13) In each of the above embodiments, the fixing tape is fixed to the positioning protrusion and the opening edge of the positioning hole of the optical sheet. The fixing tape includes the front and the back surfaces having the light blocking properties. However, a fixing tape including a front surface and a back surface having different optical properties may be used. Specifically, a fixing tape including a surface fixed to the positioning protrusion and the optical configured as a reflecting surface for reflecting light and an opposite surface fixed to the liquid crystal panel configured as a light blocking surface for blocking light. In this case, the reflecting surface may be in white with high light reflectivity and the light blocking surface may be in black with high light blocking effect. With the fixing tape having such a configuration, even if light leaks through the inner wall of the positioning hole of the optical member, the light is reflected by the reflecting surface of the fixing tape to return the light to the optical member for reuse. Furthermore, with the light blocking surface of the fixing tape, the opening edge of the positioning hole of the optical member is less likely to be directly viewed.

(14) As a modification of the sixth embodiment, the positioning portion on the rotation restricting portion side relative to the normal line that crosses the meddle of the linear end surface of the optical member with respect to the extending direction of the linear end surface may be larger and the positioning portion on the side opposite form the rotation restricting portion side relative to the normal line may be smaller.

(15) As a modification of the seventh embodiment, the optical sheet recess may be formed in the same shape in a plan view as the light guide plate recess and the reflecting sheet recess.

(16) In the eighth embodiment, the rotation restricting portions have the same shape in a plan view. However, the rotation restricting portions may have plan-view shapes different from each other. If three or more rotation restricting portions are provided, the rotation restricting portions may include those having the same plan-view shape or may all have different shapes.

(17) As a modification of the eighth embodiment, the rotation restricting portions may be asymmetrically arranged. Alternatively, the rotation restricting portions may be symmetrically arranged close to the corners of the optical member.

(18) As a modification of the ninth embodiment, the optical member may include an optical member projection similar to the fourth embodiment and the liquid crystal panel may include a panel projection. The panel projection may protrude from a portion of the periphery of the liquid crystal panel along the circumferential direction. With the optical member projection and the panel projection in contact with the contact portion, the rotations of the optical member and the liquid crystal panel are restricted.

(19) The number, the plane arrangement, the plan-view shape, the cross-sectional shape of the locks on the positioning protrusion included in the positioning portion may be altered from those of the tenth embodiment.

(20) The technical features of the above embodiments may be used in combinations as appropriate. For example, the fourth embodiment and the ninth embodiment may be combined. Specifically, a panel projection (a rotation restricting portion) may be formed to project from a portion of a periphery of a liquid crystal panel along the circumferential direction. The panel projection may be arranged to overlap the optical member projection of the optical member in a plan view. A panel contact portion (a rotation restricting portion) may be formed by recessing a portion of the inner surface of the outer covering portion of the bezel along the circumferential direction. The panel projection may be in contact with the panel contact portion. According to the configuration, the rotations of the optical member and the liquid crystal panel can be restricted. As a modification of the panel contact portion having a recessed shape, the inner surface of the side plate of the chassis may be extended to face the outer end surface of the liquid crystal panel and a panel contact portion having a recessed shape may be formed in the inner surface of the extended portion.

(21) In each of the above embodiments, the positioning protrusion of the positioning portion is the tube with the communicating hole therein. However, the positioning protrusion may be a column without the communicating hole.

(22) The plan-view shapes of the optical member and the liquid crystal panel may be altered as appropriate from those of the above embodiments. For example, the optical member and the liquid crystal panel may be in semi-ellipse or flattened semicircular shapes. Alternatively, the plan-view shapes of the optical member and the liquid crystal panel may be a fan with a central angle smaller than 180 degrees or larger than 180 degrees. When the plan-view shapes of the optical member and the liquid crystal panel are altered, the plan-view shapes of related components including the chassis and the bezel may be altered in the same manner.

(23) Each of the above embodiments includes the optical sheets, the light guide plate, and the reflecting sheet all including the positioning holes and the optical member recess (or the optical member projections). However, the positioning holes and the optical member recess (or the optical member projections) may not be formed in the optical sheets or in some optical sheets (e.g., the second prism sheet at the foremost).

(24) In each of the above embodiments, the positioning protrusion is inserted in the positioning hole of the optical member from the rear side. However, the positioning protrusion may be inserted in the positioning hole from the front side. Specifically, the positioning protrusion of the chassis in each embodiment may be omitted and the cap may be inserted in the positioning hole of the optical members. In this case, the cap may be referred to as "the positioning protrusion."

(25) The number, the kind, and the sequence of the optical sheets may be altered as appropriate from the above embodiments. For example, the number of optical sheets may be two or smaller or four or larger. Only one prism sheet may be included in the optical sheets. Three or more prism sheets may be included in the prism sheets. Two or more diffusing sheets may be included in the optical sheets. A reflective polarizing sheet may be used as the optical sheet.

(26) Each of the above embodiments includes the cap inserted in the panel through hole. However, the cap may be omitted. In this case, a light blocking tape having an annular shape may be attached to the opening edge of the panel through hole from the front side to block the opening edge of the panel through hole from light.

(27) The bezel, the cap, and the chassis in each of the above embodiments are made of metal. However, some of or all of the bezel, the cap, and the chassis may be made of synthetic resin.

(28) The LED board in each of the above embodiments includes the film-shaped base. However, the base of the LED board may be a board having a specific thickness.

(29) Each of the above embodiments includes the LEDs as light sources. However, an organic EL may be used as a light source.

(30) In each of the above embodiments, the colors of the color portions of the color filters in the liquid crystal panel are red, green, and blue. However, the color portions may include four or more colors.

(31) The liquid crystal display in each of the above embodiment is a device installed in a dashboard of a vehicle. However, the scope of the present invention can be applied to a liquid crystal display device for different purposes. For example, the scope of the present invention may be applied to a liquid crystal display device in a slot machine, which is a kind of game machines. Specifically, a liquid crystal display device may be disposed in front of a reel of the slot machine (closer to a player) and a positioning hole of an optical member and a panel through hole of a liquid crystal panel may be arranged to correspond with the reel. According to the configuration, the player can clearly and properly sees the reel through the positioning hole and the panel through hole.

(32) The scope of the present invention may be applied to liquid crystal display devices including touchscreens, parallax barrier panels, and cover glasses other than the above embodiments.

(33) The liquid crystal display device in each of the above embodiments is a transmissive type. However, the scope of the present invention may be applied to semitransmissive type liquid crystal display devices.

(34) Each of the above embodiments includes the TFTs used for the switching components of the liquid crystal display device. However, a liquid crystal display device including switching components other than the TFTs (e.g., thin film diodes (TFDs)) may be included in the scope of the present invention. The present invention may be applied to a liquid crystal display device configured to display color images or a liquid crystal display device configured to display black-and-white images.

(35) In each of the above embodiments, the pixel electrodes are disposed on the array substrate of the liquid crystal panel and the counter electrode is disposed on the CF substrate. However, a liquid crystal panel having a configuration in which pixel electrodes and a counter electrode are disposed on an array substrate may be used. Such a liquid crystal panel may be preferably in a fringe field switching (FFS) mode.

(36) In each of the above embodiments, the liquid crystal panel is used as a display panel. However, a micro electro mechanical system (MEMS) display panel for displaying images using light from a backlight unit may be used. The MEMS display panel includes a large number of micro mechanical shutters included in display pixels arranged in a matrix in a plan view. Open and close of the mechanical shutter are individually controlled to adjust amounts of transmitting light regarding the backlight unit per display pixel. According to the configuration, predefined tone images can be displayed.

EXPLANATION OF SYMBOLS

10: liquid crystal display device (display device), 11, 811, 1011, 1211, 1311, 1411: liquid crystal panel (display panel), 11a, 1211a, 1311: CF substrate (substrate), 11b, 1211b, 1311b: array substrate (substrate), 11c: liquid crystal layer, 11d: outer sealing member, 12, 312, 912: backlight unit (lighting unit), 13: bezel (outer holding member), 15, 315, 415, 915, 1115: chassis (holding member), 16, 116, 216, 316, 416, 516, 716, 816, 1016, 1116, 16-1: optical member, 16C, 316C, 416C, 1116C: curved end surface, 16L, 116L, 216L, 316L, 416L, 516L, 716L, 1116L: linear end surface, 17, 317: LED (light source), 19, 319, 619, 919: light guide plate (optical member), 19a: light entering surface, 19b: light exiting surface, 19C: light guide plate curved end surface (curved end surface), 10CO1, 619CO1: light guide plate recess (optical member recess), 19H, 319H: light guide plate positioning hole (positioning hole), 19L: light guide plate linear end surface (linear end surface), 20, 320, 920, 1020: optical sheet (optical member), 20a: defusing sheet (optical sheet, optical member), 20b: first prism sheet (optical sheet, optical member), 20c, 920c, 1020c: second prism sheet (optical sheet, optical member), 20C: optical sheet curved end surface (curved end surface), 20CO1: optical sheet recess (optical member recess), 20H, 320H, 920H: optical sheet positioning hole (positioning hole), 20L: optical sheet linear end surface (linear end surface), 21, 321, 621, 921: reflecting sheet (optical member), 21C: reflecting sheet curved end surface (curved end surface), 21CO1, 621CO1: optical sheet recess (optical member recess), 21H, 321H: reflecting sheet positioning hole (positioning hole), 21L: reflecting sheet linear end surface (linear end surface), 23, 123, 223, 323, 423, 523, 623, 723, 823, 1123, 23-1, 23-2, 23-3: positioning portion, 24, 124, 224, 324, 424, 524, 724, 824, 1124, 24-1: rotation restricting portion, 25, 225, 325, 825, 925, 1025, 25-1: positioning hole, 26, 226, 326, 826, 926, 1026, 26-1: positioning protrusion, 27, 827, 1127: optical member recess, 28, 328, 428, 628, 828: contact portion, 29, 229, 929: communicating hole, 30, 830, 930, 1030, 1230, 1330: panel through hole, 31: through hole-side sealing member, 32, 1032: fixing tape (fixing member), 33: cap (through hole-side holding member), 35, 435: optical member projection, 29: lock, (fixing member), 319CO2: light guide plate projection (optical member projection), 320CO2: optical sheet projection (optical member projection), 32CO2: reflecting sheet projection (optical member projection), 826a, 1026a: optical member-side inserting portion, 826b, 1026b: panel-side inserting portion, 828a: optical member contact portion, 828b: panel contact portion, NL: normal line

The invention claimed is:

1. A display device, comprising:
    a lighting device including:
        light source;
        an optical member for adding an optical effect to light from the light source and having a sheet shape, the optical member including a periphery including at least a curved end surface having a curved shape in a plan view;
        a positioning portion for positioning the optical member relative to a direction along a plate surface of the optical member, the positioning portion including a positioning hole and a positioning protrusion, the positioning hole opening through the optical member in a thickness direction of the optical member, the positioning protrusion being inserted in the positioning hole and in contant with an inner wall of the positioning hole; and
        a rotation restricting portion for restricting a rotation of the optical member about the postioning portion, the rotation restricting portion including an optical member recess or an optical member projection, the optical member recess being a portion of the periphery of the optical member recessed along a circumferential direction, the optical member projection projecting from the periphery of the optical member along the circumferential direction, the rotation restricting portion further including a contact portion being in contact with the optical member recess or the optical member projection; and
    a display panel for displaying images using light from the lighting device, the display panel being disposed on the light exiting side relative to the lighting device; wherein
    the positioning protrusion includes a communicating hole that is communicated with the positioning hole, and
    the display panel includes a panel through hole that opens through the display panel in a thickness direction of the display panel, the panel through hole being communicated with the positioning hole and the communicating hole.

2. The display device according to claim 1, wherein the periphery of the optical member includes a linear end surface having a linear shape in a plan view in addition to the curved end surface, and
    the positioning portion and the rotation restricting portion are arranged in areas of the optical member divided by a normal line that crosses a middle of the linear end surface with respect to an extending direction in which the linear end surface extends, respectively.

3. The display device according to claim 2, wherein the rotation restricting portion is arranged at an end of the linear end surface of the optical member.

4. The display device according to claim 1, wherein the positioning protrusion includes a communicating hole that is communicated with the positioning hole.

5. The display device according to claim 1, wherein the optical member includes at least a light guide plate that includes a light entering surface and a light exiting surface,
    the light entering surface is included in the periphery of the optical member and the light from the light source enters through the light entering surface,
    the light entering surface has a linear shape in a plan view,
    the light exiting surface is included in one of plate surfaces of the optical member and the light exits through the light exiting surface, and
    the light guide plate includes the positioning hole and the optical member recess or the optical member projection.

6. The disply device according to claim 5, wherein the light guide plate includes the optical member recess that is a recessed portion of the light entering surface.

7. The display device according to claim 6, wherein the light source includes light sources arranged at intervals along an extending direction of the light entering surface, and
    the light guide plate includes the optical member recess that is a portion of the light entering surface located closer to an end with respect to the extending direction than the light source at an end and recessed.

8. The display device according to claim 1, wherein the optical member includes at least:
    a light guide plate including a light entering surface and a light exiting surface, the light entering surface being included in the periphery of the optical member and through which the light from the light source enters, the light exiting surface being included in one of plate surfaces of the light guide plate and through which the light exits; and an optical sheet disposed to overlap the light guide plate on the light exiting side, and the light guide plate and the optical sheet include the optical member recess or the optical member projection.

9. The display device according to claim 1, further comprising a fixing portion for fixing an opening edge of the positioning hole of the optical member to the positioning protrusion.

10. The display device according to claim 1, further comprising a holding member for holding the optical member from a side opposite from the light exiting side, wherein the holding member includes the positioning protrusion and the contact portion.

11. The display device according to claim 1, wherein the display panel includes at least:
   a pair of substrates including the panel through hole;
   a liquid crystal layer held between the substrates;
   an outer sealing member surrounding the liquid crystal layer, the outer sealing member being disposed between peripheral portions of the substrates to seal the liquid crystal layer; and
   a through hole-side sealing member surrounding the panel through hole, the through hole-side sealing member being disposed between opening edges of the panel through hole to seal the liquid crystal layer.

12. The display device according to claim 1, further comprising:
   an outer holding member for sandwiching a peripheral portion of the display panel between the lighting device and the outer holding member and holding; and
   a through hole-side holding member for sandwiching the opening edge of the panel through hole of the display panel between the lighting device and the through hole-side holding member, wherein
   the through hole-side holding member includes at least a surface having a light blocking property.

13. The display device according to claim 1, wherein
   the display panel includes a panel protrusion or a panel recess at a position overlapping the optical member projection or the optical member recess in a plan view,
   the contact portion includes an optical member contact portion and a panel contact portion, the optical member contact portion being in contact with the optical member projection or the optical member recess, the panel contact portion being in contact with the panel protrusion or the panel recess, and
   the positioning protrusion includes an optical member-side inserting portion and a panel-side inserting portion, the optical member-side inserting portion being inserted in the positioning hole, the panel-side inserting portion being inserted in the panel through hole.

* * * * *